US010515447B2

(12) United States Patent
Bolstad et al.

(10) Patent No.: US 10,515,447 B2
(45) Date of Patent: Dec. 24, 2019

(54) ANALYSIS OF DATA OBTAINED FROM MICROARRAYS

(71) Applicant: Affymetrix, Inc., Santa Clara, CA (US)

(72) Inventors: Benjamin M. Bolstad, Kensington, CA (US); Harry Zuzan, Concord, CA (US)

(73) Assignee: Affymetrix, Inc., Santa Clara, CA (US)

( * ) Notice: Subject to any disclaimer, the term of this patent is extended or adjusted under 35 U.S.C. 154(b) by 724 days.

(21) Appl. No.: 13/689,027

(22) Filed: Nov. 29, 2012

(65) Prior Publication Data

US 2013/0230221 A1 Sep. 5, 2013

Related U.S. Application Data

(60) Provisional application No. 61/564,754, filed on Nov. 29, 2011.

(51) Int. Cl.
*G06F 19/00* (2018.01)
*G06T 7/00* (2017.01)

(52) U.S. Cl.
CPC .................. *G06T 7/0012* (2013.01)

(58) Field of Classification Search
CPC ......... G06T 2207/30072; G06T 11/006; G06T 2211/424; G06T 7/0002; G06F 19/20; G06F 19/18; G06F 19/24; G06F 19/345; G06F 19/22; G06F 17/30705; G06F 19/12; G06F 19/28; G06F 19/3437; G06F 19/00; G06F 17/18; C12C 2600/158; G06K 9/6256; G06K 9/6277; G06K 9/6282; G06K 2209/05; G06K 9/6212; G06N 99/005; G06N 20/00; G06N 3/0445; G06N 3/084; G06N 20/10; G06N 20/20; G06N 5/003; C12Q 2600/158; C12Q 1/68; G16B 40/00; G16B 25/00; G16B 20/00; G16B 40/20; G16B 25/10; G16B 5/00; G16B 30/00; G16B 40/10; G16B 45/00; G16B 50/00; G16B 40/30; G16H 50/20; G16H 10/40; G16H 40/63; G16H 50/30; G16H 15/00; G16H 20/00; G16H 20/10; G16H 20/30; G16H 50/70; G16H 20/17; G16H 50/50; G16Z 99/00
See application file for complete search history.

(56) References Cited

PUBLICATIONS

Rao, Y. et al. Statistical Applications in Genetics and Molecular Biology, 2008 vol. 7, issue 1, p. 1-18.*

(Continued)

*Primary Examiner* — Mary K Zeman
(74) *Attorney, Agent, or Firm* — Mauriel Kapeuytian Woods LLP; Andrew A. Noble; Michael Mauriel

(57) ABSTRACT

Disclosed are methods and software for biological data analysis. Specifically, provided are methods, computer programs and systems for analyzing data in the form of various intensity measurements obtained from an oligonucleotides microarray experiment. Such data may be microarray data obtained from an experiment conducted to determine copy number of a human genetic sample. The data are corrected by application of one or more covariate adjusters which may be applied simultaneously and which may be selected by a user. Further, the present application provides methods of filtering image data and signal restoration of image data using $\log_2$ ratio data.

29 Claims, 35 Drawing Sheets

(56) References Cited

PUBLICATIONS

Eklund, A. et al. Genome Biology 2008, vol. 9:R:26 pp. 1-8.*
Zeisel et al. BMC Bioinformatics 2010 vol. 11: 400, p. 1-15. Intensity dependent estimation of noise in microarrays improves detection of differentially expressed genes.*
Geller, S. C. et al. Bioinformatics 2003 vol. 19, No. 14, p. 1817-1823.*

* cited by examiner

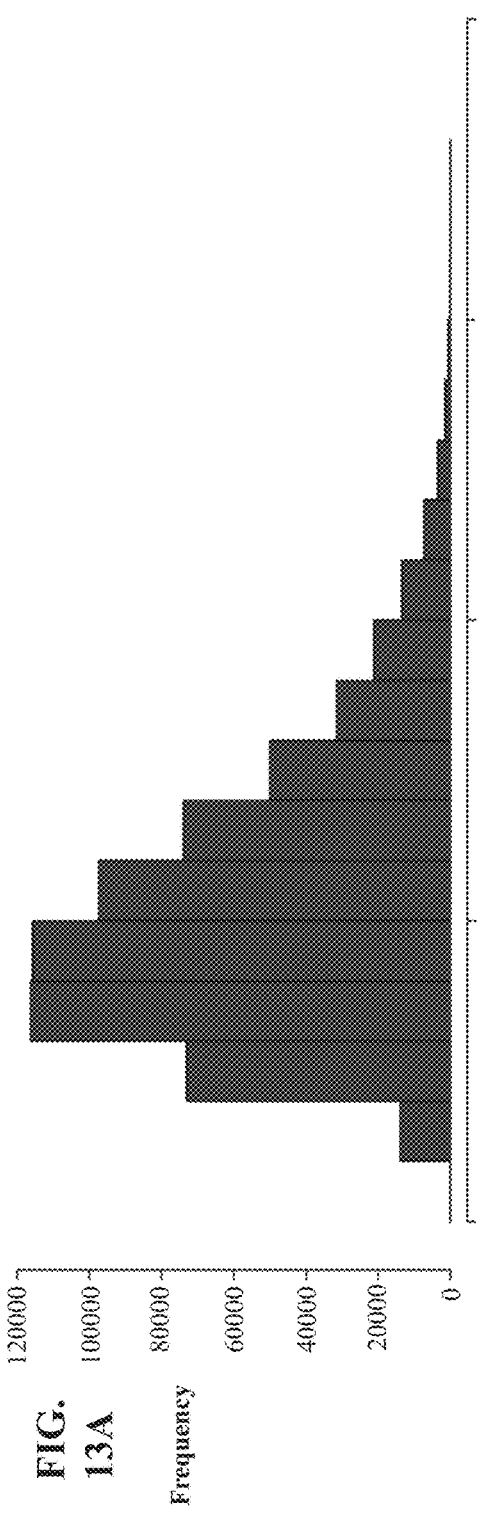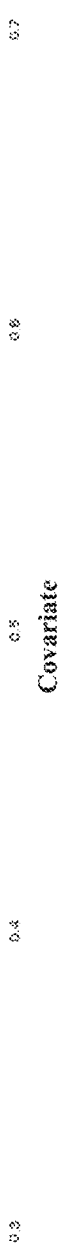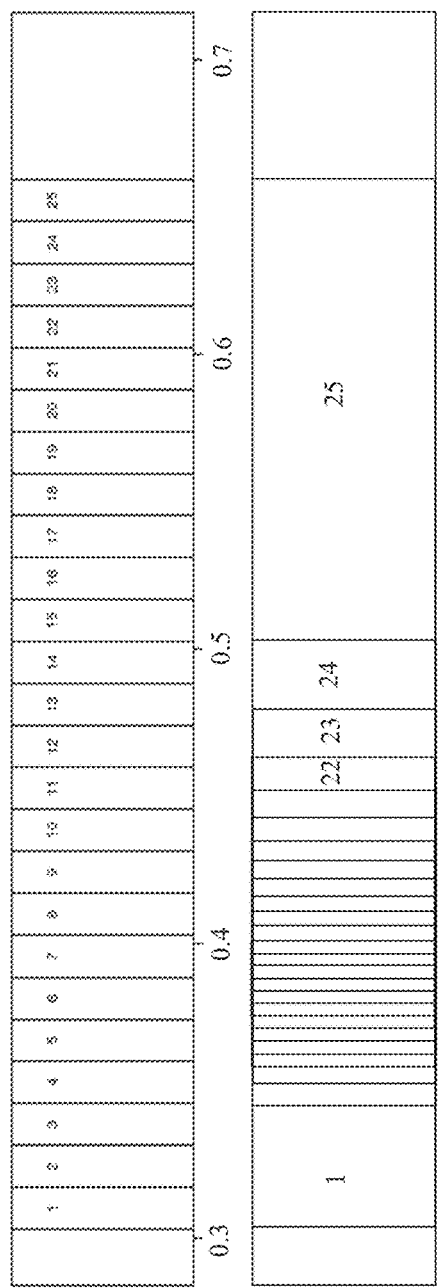
FIG. 13A
FIG. 13B Equal Spacing
FIG. 13C Equal Counts

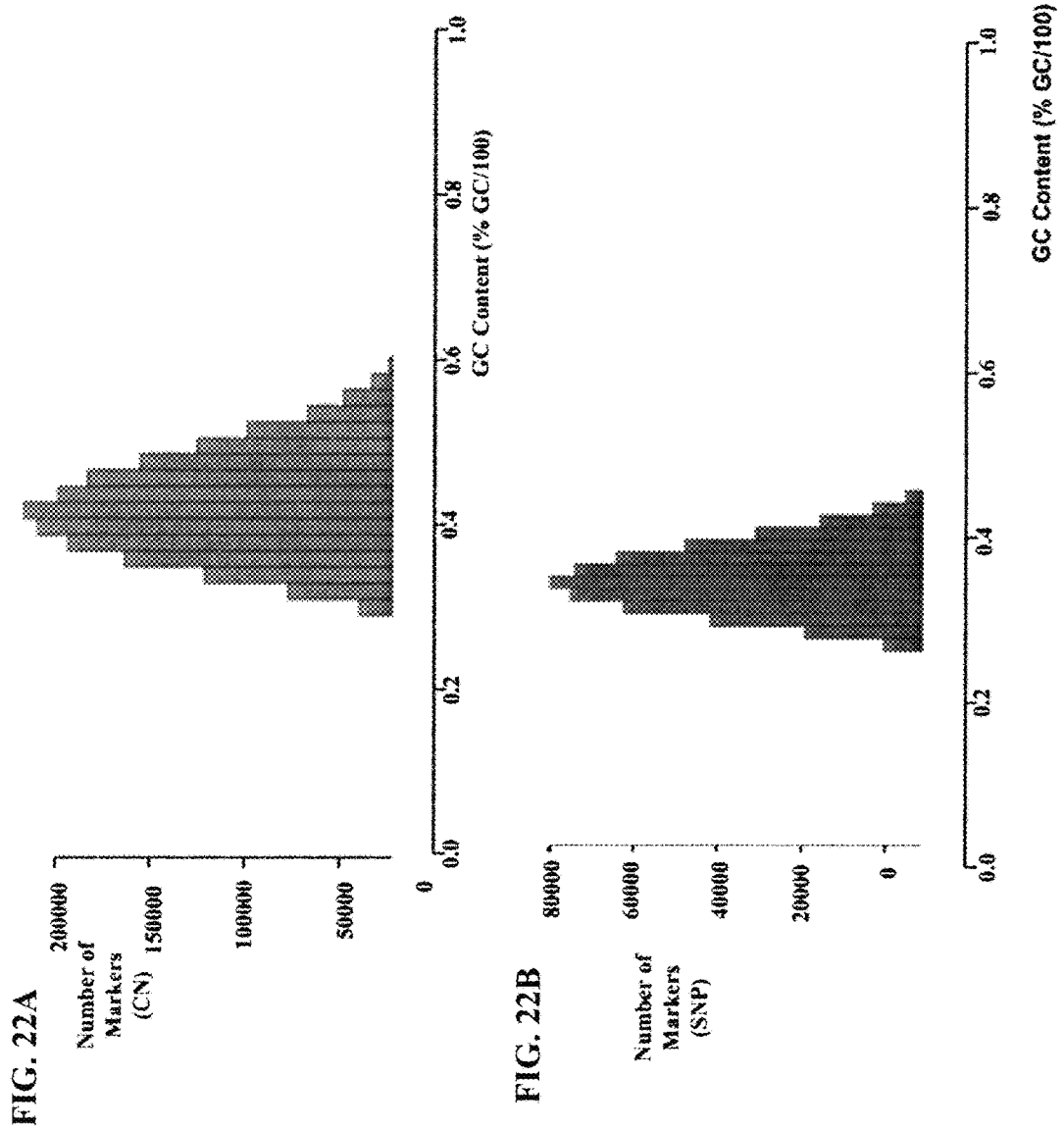

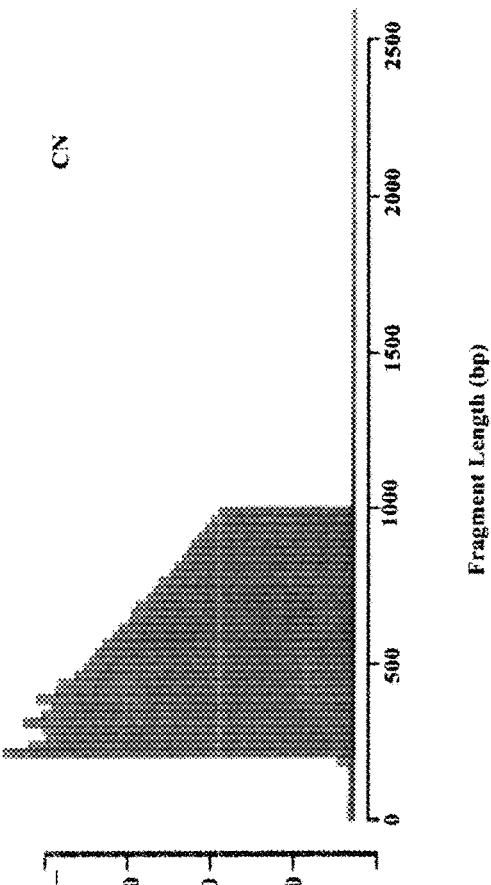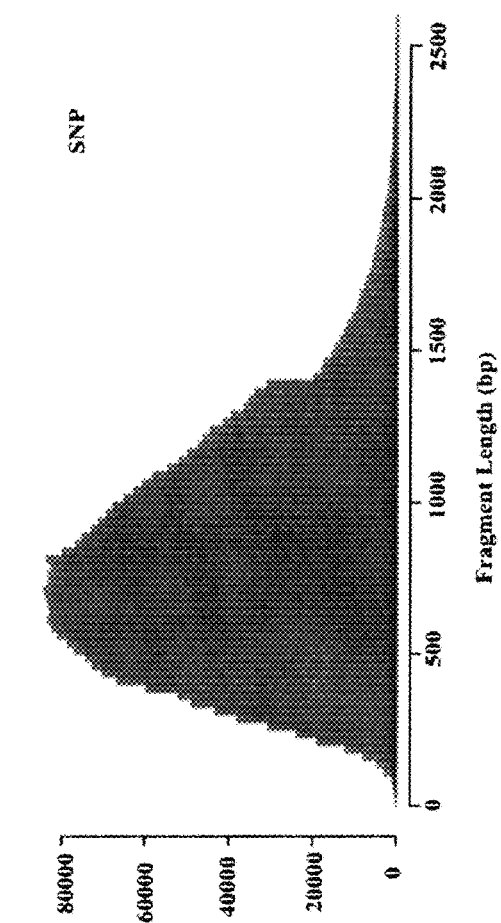
FIG. 23A
Number of Markers (Copy Number)
FIG. 23B
Number of Markers (Copy Number) SNP

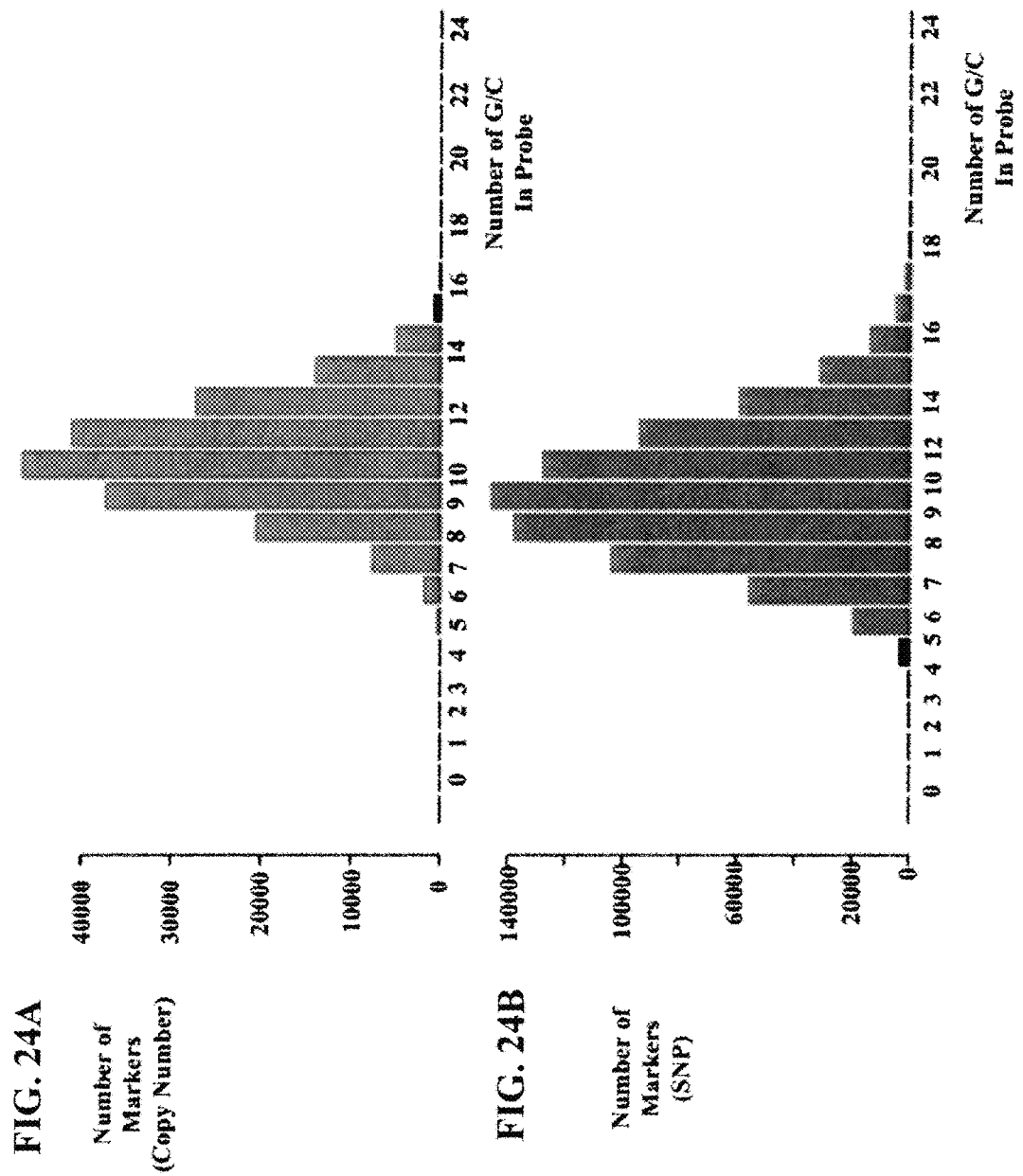

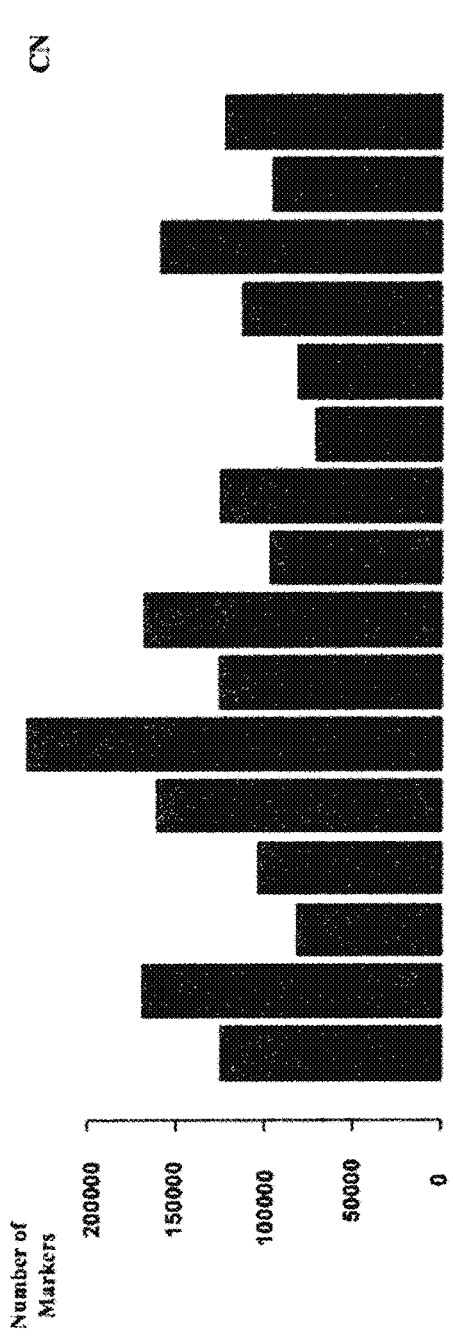
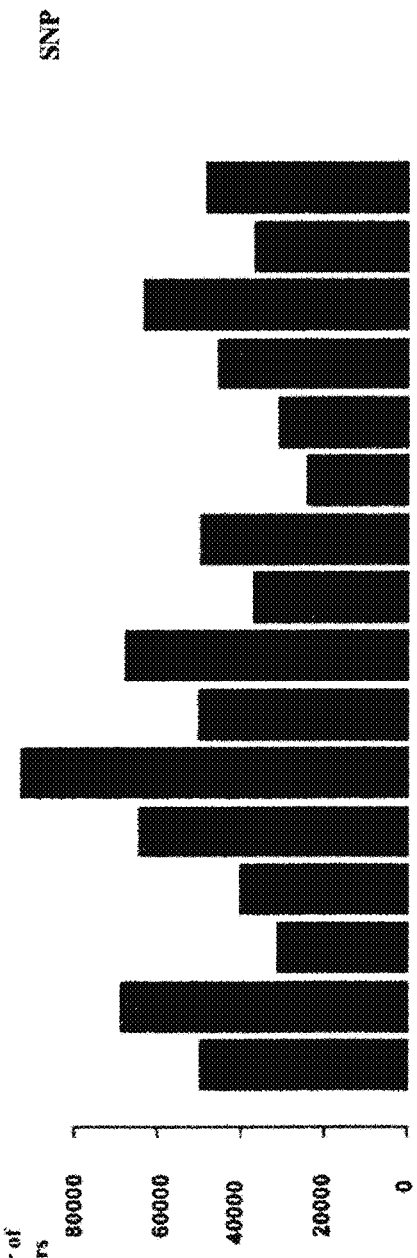

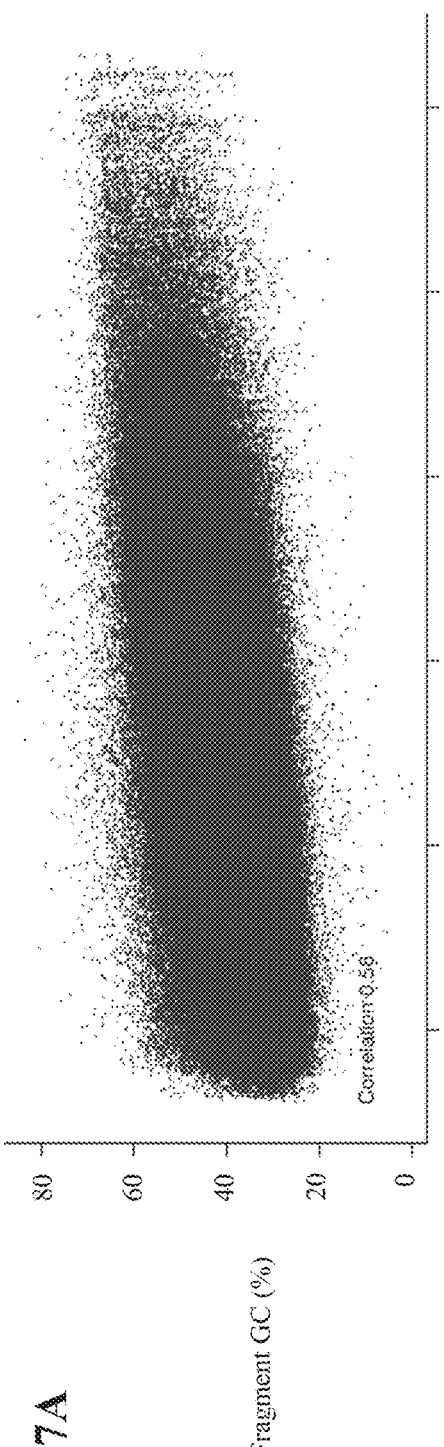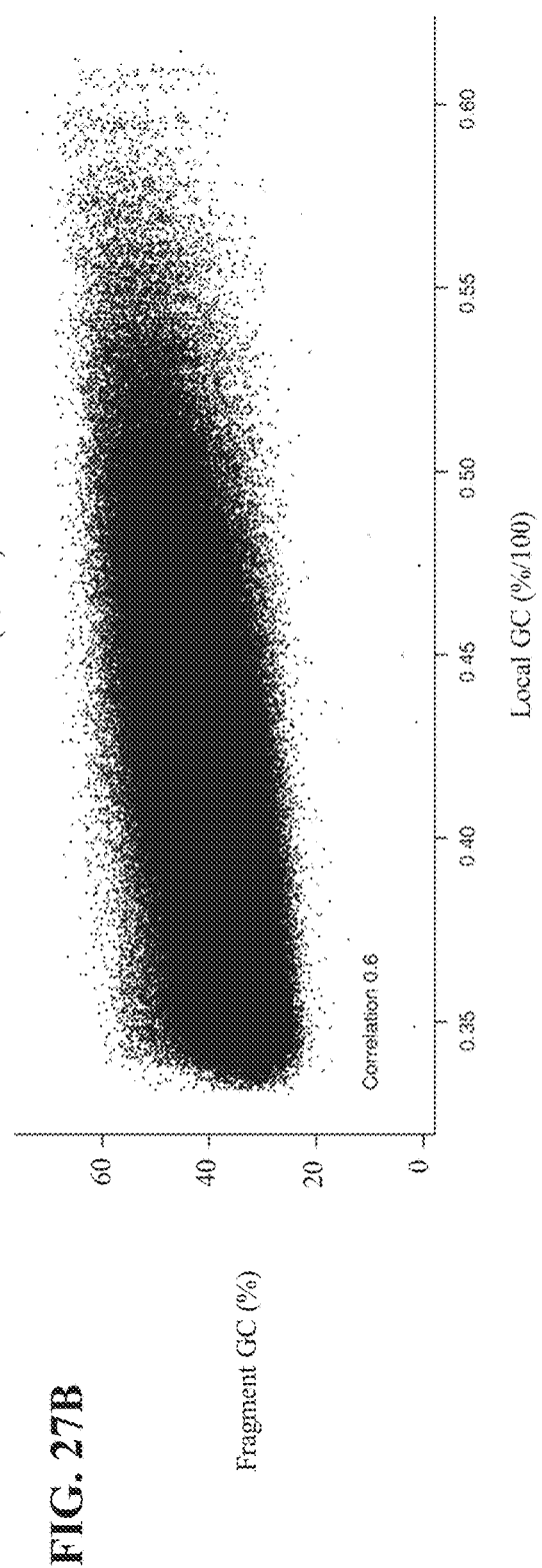

ANALYSIS OF DATA OBTAINED FROM MICROARRAYS

RELATED APPLICATIONS

The present application claims priority from U.S. Provisional Patent Application No. 61/564,754, filed Nov. 29, 2011 which is hereby incorporated herein in its entirety for all purposes.

FIELD OF THE INVENTION

The presently disclosed methods and software are related to bioinformatics and data analysis including methods, computer programs and systems for analyzing intensity measurements obtained from an oligonucleotide microarray experiments. Included are methods of transforming and displaying intensity data read from microarrays. Transformations include the application of various covariate adjustors. Further included are methods of adjusting and refining display parameters of intensity data. Intensity data includes, for instance, fluorescence intensity measured from labeled genetic material hybridized to a microarray using a scanner.

BACKGROUND OF THE INVENTION

Single nucleotide polymorphism (SNP) and genetic copy number (CN) have been used extensively for genetic analysis. Fast and reliable hybridization-based SNP/CN assays have been developed. (See, Wang et al., *Science*, 280:1077-1082, 1998; Gingeras, et al., *Genome Research*, 8:435-448, 1998; Halushka, et al., *Nature Genetics*, 22:239-247, 1999; Korbel et al., "Systematic prediction and validation of breakpoints associated with copy-number variants in the human genome," *PNAS USA*, 104(24):10110-10115, 2007; and Nigel P. Carter, "Methods and strategies for analyzing copy number variation using DNA microarrays," *Nature Genetics*, 30:S16-S21, 2007, incorporated herein by reference in their entireties). Computer-implemented methods for discovering polymorphism and determining genotypes are disclosed in, for example, U.S. Pat. No. 5,858,659 (incorporated herein by reference in its entirety for all purposes). However, there is still need for additional methods for determining genotypes and displaying the large amount of genetic information obtained from such experiments in a user-friendly interactive computer application.

Data can be statistically manipulated to eliminate independent variables by use of covariate adjusters. Sample data obtained from microarray experiments is in the form of intensity values. Intensity values correspond to the hybridization of labeled genetic material to a probe mounted on a microarray. Such intensity values can have many intrinsic independent variables that are unrelated to the variable being studied, and which can confound the result, i.e. mask the result to yield unpredictable results. Strides have been made in the past to remove these independent variables so that genetic sample analyses on microarrays may be more consistent and of a higher quality, i.e. more reliable and determinative when studying disease. However, many variables still plague data and sample analyses. Likewise, display of such intensity measurements in genomic microarray studies can be influenced by many independent variables. Much can be done to eliminate these variables to reveal underlying patterns and signals impacting data interpretation. Various image data filters and data manipulations strategies may be employed to remove these independent variables to again improve consistency and quality of data presentation and analysis. The discovery of new ways of increasing the quality of these data and of the scanning, measuring and displaying of these intensities are in dire need to keep pace with the rapid advancement of the application of diagnostic utilities associated with microarray-based genetic tests.

BRIEF SUMMARY OF THE INVENTION

Methods of analyzing and manipulating intensity value data are disclosed. The methods include normalization of intensity value data to remove independent variables by use of various covariate adjusters. Other methods, including methods of filtering intensity value data which is visually displayed, are also disclosed as well as methods of genetic copy number signal restoration. Various algorithms and computer programs are disclosed for carrying out the methods.

BRIEF DESCRIPTION OF THE DRAWINGS

The above and further features will be more clearly appreciated from the following detailed description when taken in conjunction with the accompanying drawings. In functional block diagrams, rectangles generally indicate functional elements and parallelograms generally indicate data. In method flow charts, rectangles generally indicate method steps and diamond shapes generally indicate decision elements. All of these conventions, however, are intended to be typical or illustrative, rather than limiting.

FIG. 13A illustrates a covariate that is turned into a discrete variable by means of binning. FIGS. 13B-C illustrate two exemplary alternatives for binning a covariate variable using either equal counts or equal spacing to determine which data is allotted to which bins and the effects of each method on the spread of the bins across the data.

FIG. 19A represents the initial transformed space. The space is then divided into equally populated bins by using linear separators, as depicted in FIG. 19B. Each of these bins is then further divided, as in FIG. 19C. A further round of partitioning occurs, as shown in FIG. 19D.

FIG. 21A displays the relationship between fragment length and copy number markers and FIG. 21B displays the relationship between fragment length and SNP markers. FIGS. 21C-D display the relationship between fragment length and chromosome number.

FIGS. 22A-B provide exemplary values of a local GC content, broken down by CN or SNP marker. FIG. 22A displays copy number markers and FIG. 22B displays SNP markers.

FIGS. 23A-B provide exemplary values of a fragment length covariate, broken down by CN or SNP. FIG. 23A displays copy number markers and FIG. 23B displays SNP markers.

FIGS. 24A-D provide exemplary values of a probe GC, broken down by CN or SNP marker and also by chromosome. FIG. 24A displays the relationship between probe GC content and copy number markers and FIG. 24B displays the relationship between probe GC content and SNP markers. FIG. 24C displays the relationship between chromosome number and copy number markers and FIG. 24D displays the relationship between chromosome number and SNP markers.

FIGS. 25A-B provide exemplary values of an adapter type GC, broken down by CN or SNP marker. FIG. 25A displays copy number markers and FIG. 25B displays SNP markers.

FIG. 26A displays copy number markers and FIG. 26B displays SNP markers.

FIGS. 27A-B show pair-wise comparison of fragment GC and local GC covariate adjusters. FIG. 27A displays copy number markers and FIG. 27B displays SNP markers.

FIG. 28A displays copy number markers and FIG. 28B displays SNP markers.

FIG. 29A displays copy number markers and FIG. 29B displays SNP markers.

DETAILED DESCRIPTION

I. General Description

Figure 1:
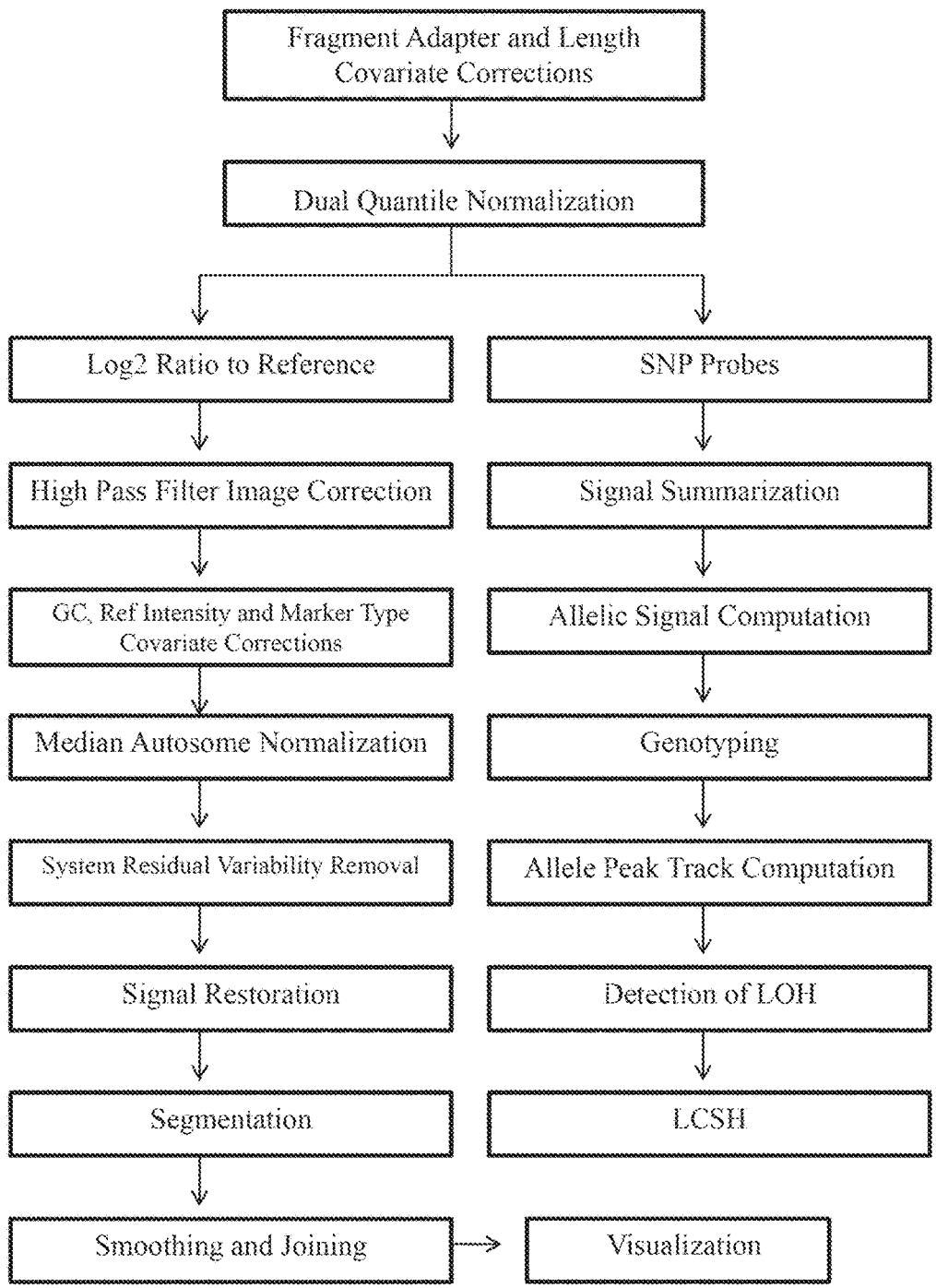
FIG. 1 provides an exemplary flow chart for statistical analysis of microarray data. Steps related to probes used for copy number determination run down the left side of the flow chart and steps related to SNP detection are along the right side of the flow chart.

Reference will now be made in detail to exemplary embodiments of the invention. While the invention will be described in conjunction with the exemplary embodiments, it will be understood that they are not intended to limit the invention to these embodiments. On the contrary, the invention is intended to encompass alternatives, modifications and equivalents, which may be included within the spirit and scope of the invention.

The invention relates to diverse fields impacted by the nature of molecular interaction, including chemistry, biology, medicine and diagnostics. Methods disclosed herein are advantageous in various scientific, medical and diagnostic fields, such as those in which genetic information is required quickly, as in clinical diagnostic laboratories or in large-scale undertakings such as the Human Genome Project.

The invention described herein has many embodiments and relies on many patents, applications and other references for details known to those of the art. Therefore, when a patent, application, or other reference is cited or repeated below, it should be understood that the entire disclosure of the document cited is incorporated by reference in its entirety for all purposes as well as for the proposition that is recited. All documents, e.g., publications and patent applications, cited in this disclosure, including the foregoing, are incorporated herein by reference in their entireties for all purposes to the same extent as if each of the individual documents were specifically and individually indicated to be so incorporated herein by reference in its entirety.

As used in this application, the singular form "a," "an," and "the" include plural references unless the context clearly dictates otherwise. For example, the term "an agent" includes a plurality of agents, including mixtures thereof.

An individual is not limited to a human being but may also be other organisms including, but not limited to, mammals, plants, bacteria, or cells derived from any of the above.

Throughout this disclosure, various aspects of this invention can be presented in a range format. It should be understood that when a description is provided in range format, this is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6, for example, as well as individual numbers within that range, for example, 1, 2, 3, 4, 5, and 6. This applies regardless of the breadth of the range.

The practice of the invention described herein may employ, unless otherwise indicated, conventional techniques and descriptions of organic chemistry, polymer technology, molecular biology (including recombinant techniques), cell biology, biochemistry, and immunology, which are within the skill of one of skill in the art. Such conventional techniques include polymer array synthesis, hybridization, ligation, and detection of hybridization using a detectable label. Specific illustrations of suitable techniques are provided by reference to the examples hereinbelow. However, other equivalent conventional procedures may also be employed. Such conventional techniques and descriptions may be found in standard laboratory manuals, such as *Genome Analysis: A Laboratory Manual Series (Vols. I-IV), Using Antibodies: A Laboratory Manual, Cells: A Laboratory Manual, PCR Primer: A Laboratory Manual,* and *Molecular Cloning: A Laboratory Manual* (all from Cold Spring Harbor Laboratory Press), Stryer, L. (1995), *Biochemistry*, 4th Ed., Freeman, New York, Gait, *Oligonucleotide Synthesis: A Practical Approach*, (1984), IRL Press, London, Nelson and Cox (2000), Lehninger, *Principles of Biochemistry*, $3^{rd}$ Ed., W.H. Freeman Pub., New York, N.Y., and Berg et al. (2002), *Biochemistry*, $5^{th}$ Ed., W.H. Freeman Pub., New York, N.Y., all of which are herein incorporated in their entirety by reference for all purposes.

The invention may employ solid substrates, including arrays in some embodiments. Methods and techniques applicable to polymer (including protein) array synthesis have been described in U.S. Ser. No. 09/536,841 (abandoned), WO 00/58516, U.S. Pat. Nos. 5,143,854, 5,242,974, 5,252,743, 5,324,633, 5,384,261, 5,405,783, 5,424,186, 5,451,683, 5,482,867, 5,491,074, 5,527,681, 5,550,215, 5,571,639, 5,578,832, 5,593,839, 5,599,695, 5,624,711, 5,631,734, 5,795,716, 5,831,070, 5,837,832, 5,856,101, 5,858,659, 5,936,324, 5,968,740, 5,974,164, 5,981,185, 5,981,956, 6,025,601, 6,033,860, 6,040,193, 6,090,555, 6,136,269, 6,269,846 and 6,428,752, and in PCT Applications Nos. PCT/US99/00730 (International Publication No. WO 99/36760) and PCT/US01/04285 (International Publication No. WO 01/58593), which are all incorporated herein by reference in their entirety for all purposes.

Patents that describe synthesis techniques in specific embodiments include U.S. Pat. Nos. 5,412,087, 6,147,205, 6,262,216, 6,310,189, 5,889,165, and 5,959,098. Nucleic acid arrays are described in many of the above patents, but the same techniques are applied to polypeptide arrays.

Nucleic acid arrays that are useful in the described invention include, but are not limited to, those that are commercially available from Affymetrix (Santa Clara, Calif.) under the brand name GENECHIP®. Example arrays are shown on the Affymetrix website at the URL affymetrix.com.

Many uses for polymers attached to solid substrates have been reported. These uses include, but are not limited to, gene expression monitoring, profiling, library screening, genotyping and diagnostics. Methods of gene expression monitoring and profiling are described in U.S. Pat. Nos. 5,800,992, 6,013,449, 6,020,135, 6,033,860, 6,040,138, 6,177,248 and 6,309,822. Genotyping methods, and uses thereof, are disclosed in U.S. patent application Ser. No. 10/442,021 (abandoned) and U.S. Pat. Nos. 5,856,092, 6,300,063, 5,858,659, 6,284,460, 6,361,947, 6,368,799, 6,333,179, and 6,872,529. Other uses are described in U.S. Pat. Nos. 5,871,928, 5,902,723, 6,045,996, 5,541,061, and 6,197,506.

Also reported in the literature are various sample preparation methods. Prior to, or concurrent with, genotyping, the genomic sample may be amplified by a variety of mechanisms, some of which may employ PCR. (See, for example, *PCR Technology: Principles and Applications for DNA Amplification*, Ed. H. A. Erlich, Freeman Press, NY, N.Y., 1992; *PCR Protocols: A Guide to Methods and Applications*, Eds. Innis, et al., Academic Press, San Diego, Calif., 1990; Mattila et al., *Nucleic Acids Res.*, 19:4967, 1991; Eckert et al., *PCR Methods and Applications*, 1:17, 1991; PCR, Eds. McPherson et al., IRL Press, Oxford, 1991; and U.S. Pat. Nos. 4,683,202, 4,683,195, 4,800,159 4,965,188, and 5,333,675, each of which is incorporated herein by reference in their entireties for all purposes. The sample may also be amplified on the array. (See, for example, U.S. Pat. No. 6,300,070 and U.S. patent application Ser. No. 09/513,300 (abandoned), all of which are incorporated herein by reference).

Other suitable amplification methods include the ligase chain reaction (LCR) (see, for example, Wu and Wallace, *Genomics*, 4:560 (1989), Landegren et al., *Science*, 241:1077 (1988) and Barringer et al., *Gene*, 89:117 (1990)), transcription amplification (Kwoh et al., *Proc. Natl. Acad. Sci. USA*, 86:1173 (1989) and WO 88/10315), self-sustained sequence replication (Guatelli et al., *Proc. Nat. Acad. Sci. USA*, 87:1874 (1990) and WO 90/06995), selective amplification of target polynucleotide sequences (U.S. Pat. No. 6,410,276), consensus sequence primed polymerase chain reaction (CP-PCR) (U.S. Pat. No. 4,437,975), arbitrarily primed polymerase chain reaction (AP-PCR) (U.S. Pat. Nos. 5,413,909 and 5,861,245) and nucleic acid based sequence amplification (NABSA). (See also, U.S. Pat. Nos. 5,409,818, 5,554,517, and 6,063,603, each of which is incorporated herein by reference). Other amplification methods that may be used are described in, for instance, U.S. Pat. Nos. 6,582,938, 5,242,794, 5,494,810, and 4,988,617, each of which is incorporated herein by reference.

Additional sample preparation methods and techniques for reducing the complexity of a nucleic sample are described in Dong et al., Genome Research, 11:1418 (2001), U.S. Pat. Nos. 6,361,947, 6,391,592, 6,632,611, 6,872,529 and 6,958,225, and in U.S. patent application Ser. No. 09/916,135 (abandoned).

Methods for conducting polynucleotide hybridization assays have been well developed. Hybridization assay procedures and conditions will vary depending on the application and are selected in accordance with known general binding methods, including those referred to in Maniatis et al., Molecular Cloning: A Laboratory Manual, 2$^{nd}$ Ed., Cold Spring Harbor, N.Y., (1989); Berger and Kimmel, Methods in Enzymology, Guide to Molecular Cloning Techniques, Vol. 152, Academic Press, Inc., San Diego, Calif. (1987); Young and Davism, Proc. Nat'l. Acad. Sci., 80:1194 (1983). Methods and apparatus for performing repeated and controlled hybridization reactions have been described in, for example, U.S. Pat. Nos. 5,871,928, 5,874,219, 6,045,996, 6,386,749, and 6,391,623 each of which are incorporated herein by reference.

Signal detection of hybridization between ligands has been reported. (See, U.S. Pat. Nos. 5,143,854, 5,578,832, 5,631,734, 5,834,758, 5,936,324, 5,981,956, 6,025,601, 6,141,096, 6,185,030, 6,201,639, 6,218,803, and 6,225,625, U.S. patent application Ser. No. 10/389,194 (U.S. Patent Application Publication No. 2004/0012676, allowed) and PCT Application PCT/US99/06097 (published as WO 99/47964), each of which is hereby incorporated by reference in its entirety for all purposes).

Methods and apparatus for signal detection and processing of intensity data are disclosed in, for example, U.S. Pat. Nos. 5,143,854, 5,547,839, 5,578,832, 5,631,734, 5,800, 992, 5,834,758; 5,856,092, 5,902,723, 5,936,324, 5,981, 956, 6,025,601, 6,090,555, 6,141,096, 6,185,030, 6,201, 639; 6,218,803; and 6,225,625, in U.S. Patent Pub. Nos. 2004-0012676 2005-0057676 and in PCT Application PCT/US99/06097 (published as WO99/47964), each of which also is hereby incorporated by reference in its entirety for all purposes.

The practice of the inventions herein may also employ conventional biology methods, software and systems. Computer software products of the invention typically include, for instance, computer readable medium having computer-executable instructions for performing the logic steps of the method of the invention thereon. Suitable computer readable medium include, but are not limited to, a floppy disk, CD-ROM/DVD/DVD-ROM, hard-disk drive, flash memory, ROM/RAM, magnetic tapes, and others commonly used in the computer arts. The computer executable instructions may be written in a suitable computer language or combination of several computer languages. Basic computational biology methods which may be employed in the invention are described in, for example, Setubal and Meidanis et al., Introduction to Computational Biology Methods, PWS Publishing Company, Boston, (1997); Salzberg, Searles, Kasif, (Ed.), Computational Methods in Molecular Biology, Elsevier, Amsterdam, (1998); Rashidi and Buehler, Bioinformatics Basics: Application in Biological Science and Medicine, CRC Press, London, (2000); and Ouelette and Bzevanis Bioinformatics: A Practical Guide for Analysis of Gene and Proteins, Wiley & Sons, Inc., 2$^{nd}$ ed., (2001). (See also, U.S. Pat. No. 6,420,108).

Various computer program products and software exist for a variety of purposes, such as probe design, management of data, analysis, and instrument operation. (See, U.S. Pat. Nos. 5,593,839, 5,795,716, 5,733,729, 5,974,164, 6,066,454, 6,090,555, 6,185,561, 6,188,783, 6,223,127, 6,229,911 and 6,308,170). Computer methods related to genotyping using high density microarray analysis may also be used in the present methods, see, for example, US Patent Pub. Nos. 20050250151, 20050244883, 20050108197, 20050079536 and 20050042654.

Methods for analysis of genotype array data are described, for example, in Di, X., et al. (2005) Bioinformatics, 21, 1958-1963, Liu, W., et al. (2003) Bioinformatics, 19, 2397-2403 and Rabbee and Speed (2006) Bioinformatics 22:7-12. Methods for copy number analysis based on hybridization to arrays of oligonucleotides have been disclosed, for example, in US Patent Pub. Nos. 20040157243, 20060134674, 20050130217, and 20050064476.

Additionally, the invention encompasses embodiments that may include methods for providing genetic information over networks such as the internet, as disclosed in, for instance, U.S. patent application Ser. No. 10/197,621 (U.S. Patent Application Publication No. 20030097222), Ser. No. 10/063,559 (U.S. Patent Application Publication No. 20020183936, abandoned), Ser. No. 10/065,856 (U.S. Patent Application Publication No. 20030100995, abandoned), Ser. No. 10/065,868 (U.S. Patent Application Publication No. 20030120432, abandoned), Ser. No. 10/328,818 (U.S. Patent Application Publication No. 20040002818, abandoned), Ser. No. 10/328,872 (U.S. Patent Application Publication No. 20040126840, abandoned), Ser. No. 10/423,403 (U.S. Patent Application Publication No. 20040049354, abandoned), and 60/482,389.

II. Definition of Selected Terms

The term "array" or "microarray" as used herein refers to an intentionally created collection of molecules which can be prepared either synthetically or biosynthetically. The molecules in the array can be identical or different from each other. The array can assume a variety of formats, e.g., libraries of soluble molecules; libraries of compounds tethered to resin beads, silica chips, or other solid supports. Preferred arrays typically comprise a plurality of different nucleic acid probes that are coupled to a surface of a substrate in different, known locations. These arrays, also described as "microarrays" or colloquially "chips" have been generally described in the art, for example, U.S. Pat. Nos. 5,143,854, 5,445,934, 5,744,305, 5,677,195, 5,800, 992, 6,040,193, 5,424,186 and Fodor et al., Science, 251: 767-777 (1991). Each of which is incorporated by reference in its entirety for all purposes.

Arrays may generally be produced using a variety of techniques, such as mechanical synthesis methods or light directed synthesis methods that incorporate a combination of photolithographic methods and solid phase synthesis methods. Techniques for the synthesis of these arrays using mechanical synthesis methods are described in, e.g., U.S. Pat. Nos. 5,384,261, and 6,040,193, which are incorporated herein by reference in their entirety for all purposes. Although a planar array surface is preferred, the array may be fabricated on a surface of virtually any shape or even a multiplicity of surfaces. Arrays may be nucleic acids on beads, gels, polymeric surfaces, fibers such as optical fibers, glass or any other appropriate substrate. (See U.S. Pat. Nos.

5,770,358, 5,789,162, 5,708,153, 6,040,193 and 5,800,992, which are hereby incorporated by reference in their entirety for all purposes.)

Many arrays are commercially available from Affymetrix under the brand name GENECHIP® and are directed to a variety of purposes, including genotyping and gene expression monitoring for a variety of eukaryotic and prokaryotic species. (See Affymetrix Inc., Santa Clara and their website at affymetrix.com.) Methods for preparing a genetic sample for hybridization to an array and conditions for hybridization are disclosed in the manuals provided with the arrays, for example, for expression arrays the GENECHIP® Expression Analysis Technical Manual (PN 701021 Rev. 5) provides detailed instructions for 3' based assays and the GENECHIP® Whole Transcript (WT) Sense Target Labeling Assay Manual (PN 701880 Rev. 2) provides whole transcript based assays. The GENECHIP® Mapping 100K Assay Manual (PN 701694 Rev. 3) provides detailed instructions for sample preparation, hybridization and analysis using genotyping arrays. Each of these manuals is incorporated herein by reference in its entirety.

An "allele" refers to one specific form of a genetic sequence (such as a gene) within a cell, an individual or within a population, the specific form differing from other forms of the same gene in the sequence of at least one, and frequently more than one, variant sites within the sequence of the gene. The sequences at these variant sites that differ between different alleles are termed "variances", "polymorphisms", or "mutations". At each autosomal specific chromosomal location or "locus" an individual possesses two alleles, one inherited from one parent and one from the other parent, for example one from the mother and one from the father. An individual is "heterozygous" at a locus if it has two different alleles at that locus. An individual is "homozygous" at a locus if it has two identical alleles at that locus.

The term "chromosome" refers to the heredity-bearing gene carrier of a living cell which is derived from chromatin and which comprises DNA and protein components (especially histones). The conventional internationally recognized individual human genome chromosome numbering system is employed herein. The size of an individual chromosome can vary from one type to another with a given multichromosomal genome and from one genome to another. In the case of the human genome, the entire DNA mass of a given chromosome is usually greater than about 100,000,000 base pairs (bp). For example, the size of the entire human genome is about $3\times10^9$ bp. The largest chromosome, chromosome no. 1, contains about $2.4\times10^8$ bp while the smallest chromosome, chromosome no. 22, contains about $5.3\times10^7$ bp.

The term "complementary" as used herein refers to the hybridization or base pairing between nucleotides or nucleic acids, such as, for instance, between the two strands of a double stranded DNA molecule or between an oligonucleotide primer and a primer binding site on a single stranded nucleic acid to be sequenced or amplified. Complementary nucleotides are, generally, A and T (or A and U), or C and G. Two single stranded RNA or DNA molecules are said to be complementary when the nucleotides of one strand, optimally aligned and compared and with appropriate nucleotide insertions or deletions, pair with at least about 80% of the nucleotides of the other strand, usually at least about 90% to 95%, and more preferably from about 98 to 100%. Alternatively, complementarity exists when an RNA or DNA strand will hybridize under selective hybridization conditions to its complement. Typically, selective hybridization will occur when there is at least about 65% complementary over a stretch of at least 14 to 25 nucleotides, preferably at least about 75%, more preferably at least about 90% complementary. (See, M. Kanehisa Nucleic Acids Res. 12:203 (1984), incorporated herein by reference).

The term "complex population or mixed population" as used herein refers to any sample containing both desired and undesired nucleic acids. As a non-limiting example, a complex population of nucleic acids may be total genomic DNA, total genomic RNA or a combination thereof. Moreover, a complex population of nucleic acids may have been enriched for a given population but include other undesirable populations. For example, a complex population of nucleic acids may be a sample which has been enriched for desired messenger RNA (mRNA) sequences but still includes some undesired ribosomal RNA sequences (rRNA).

The term "effective amount" as used herein refers to an amount sufficient to induce a desired result.

The term "genome" as used herein is all the genetic material in the chromosomes of an organism. DNA derived from the genetic material in the chromosomes of a particular organism is genomic DNA. A genomic library is a collection of clones made from a set of randomly generated overlapping DNA fragments representing the entire genome of an organism.

The term "genotyping" refers to the determination of the genetic information an individual carries at one or more positions in the genome. For example, genotyping may comprise the determination of which allele or alleles an individual carries for a single SNP or the determination of which allele or alleles an individual carries for a plurality of SNPs. For example, a particular nucleotide in a genome may be an A in some individuals and a C in other individuals. Those individuals who have an A at the position have the A allele and those who have a C have the C allele. In a diploid organism the individual will have two copies of the sequence containing the polymorphic position so the individual may have an A allele and a C allele or alternatively two copies of the A allele or two copies of the C allele. Those individuals who have two copies of the C allele are homozygous for the C allele, those individuals who have two copies of the A allele are homozygous for the C allele, and those individuals who have one copy of each allele are heterozygous. The array may be designed to distinguish between each of these three possible outcomes. A polymorphic location may have two or more possible alleles and the array may be designed to distinguish between all possible combinations.

The term "hybridization conditions" as used herein will typically include salt concentrations of less than about 1M, more usually less than about 500 mM and preferably less than about 200 mM. Hybridization temperatures can be as low as 5° C., but are typically greater than 22° C., more typically greater than about 30° C., and preferably in excess of about 37° C. Longer fragments may require higher hybridization temperatures for specific hybridization. As other factors may affect the stringency of hybridization, including base composition and length of the complementary strands, presence of organic solvents and extent of base mismatching, the combination of parameters is more important than the absolute measure of any one alone.

The term "hybridization" as used herein refers to the process in which two single-stranded polynucleotides bind non-covalently to form a stable double-stranded polynucleotide; triple-stranded hybridization is also theoretically possible. The resulting (usually) double-stranded polynucleotide is a "hybrid." The proportion of the population of polynucleotides that forms stable hybrids is referred to herein as the "degree of hybridization." Hybridizations are usually performed under stringent conditions, for example, at a salt concentration of no more than 1 M and a temperature of at least 25° C. For example, conditions of 5×SSPE (750 mM NaCl, 50 mM NaPhosphate, 5 mM EDTA, pH 7.4) and a temperature of 25-30° C. are suitable for allele-specific probe hybridizations. For stringent conditions, see, for example, Sambrook, Fritsche and Maniatis, "Molecular Cloning A laboratory Manual" $2^{nd}$ Ed. Cold Spring Harbor Press (1989), which is hereby incorporated by reference in its entirety for all purposes above. Hybridizations, e.g., allele-specific probe hybridizations, are generally performed under stringent conditions. For example, conditions where the salt concentration is no more than about 1 Molar (M) and a temperature of at least 25° C., e.g., 750 mM NaCl, 50 mM Sodium Phosphate, 5 mM EDTA, pH 7.4 (5×SSPE) and a temperature of from about 25 to about 30° C.

The term "hybridization probes" as used herein are oligonucleotides capable of binding in a base-specific manner to a complementary strand of nucleic acid. Such probes include peptide nucleic acids, as described in Nielsen et al., Science, 254, 1497-1500 (1991), and other nucleic acid analogs and nucleic acid mimetics.

The term "hybridizing specifically to" as used herein refers to the binding, duplexing, or hybridizing of a molecule only to a particular nucleotide sequence or sequences under stringent conditions when that sequence is present in a complex mixture (e.g., total cellular) DNA or RNA.

The term "isolated nucleic acid" as used herein mean an object species invention that is the predominant species present (e.g., on a molar basis it is more abundant than any other individual species in the composition). Preferably, an isolated nucleic acid comprises at least about 50, 80 or 90% (on a molar basis) of all macromolecular species present. Most preferably, the object species is purified to essential homogeneity (contaminant species cannot be detected in the composition by conventional detection methods).

The term "ligand" as used herein refers to a molecule that is recognized by a particular receptor. The agent bound by or reacting with a receptor is called a "ligand," a term which is definitionally meaningful only in terms of its counterpart receptor. The term "ligand" does not imply any particular molecular size or other structural or compositional feature other than that the substance in question is capable of binding or otherwise interacting with the receptor. Also, a ligand may serve either as the natural ligand to which the receptor binds, or as a functional analogue that may act as an agonist or antagonist. Examples of ligands that can be investigated by this invention include, but are not restricted to, agonists and antagonists for cell membrane receptors, toxins and venoms, viral epitopes, hormones (e.g., opiates, steroids, and other similar compounds), hormone receptors, peptides, enzymes, enzyme substrates, substrate analogs, transition state analogs, cofactors, drugs, proteins, and antibodies.

The term "linkage disequilibrium" or "allelic association" as used herein refers to the preferential association of a particular allele or genetic marker with a specific allele, or genetic marker at a nearby chromosomal location more frequently than expected by chance for any particular allele frequency in the population. For example, if locus X has alleles a and b, which occur equally frequently, and linked locus Y has alleles c and d, which occur equally frequently, one would expect the combination ac to occur with a frequency of 0.25. If ac occurs more frequently, then alleles a and c are in linkage disequilibrium. Linkage disequilibrium may result from natural selection of certain combination of alleles or because an allele has been introduced into a population too recently to have reached equilibrium with linked alleles.

The term "mixed population" as used herein refers to a complex population.

The term "monomer" as used herein refers to any member of the set of molecules that can be joined together to form an oligomer or polymer. The set of monomers useful in this invention includes, but is not restricted to, for the example of (poly)peptide synthesis, the set of L-amino acids, D-amino acids, or synthetic amino acids. As used herein, "monomer" refers to any member of a basis set for synthesis of an oligomer. For example, dimers of L-amino acids form a basis set of 400 "monomers" for synthesis of polypeptides. Different basis sets of monomers may be used at successive steps in the synthesis of a polymer. The term "monomer" also refers to a chemical subunit that can be combined with a different chemical subunit to form a compound larger than either subunit alone.

The term "mRNA" or "mRNA transcripts" as used herein, include, but not limited to pre-message RNA transcript(s), transcript processing intermediates, mature mRNA(s) ready for translation and transcripts of the gene or genes, or nucleic acids derived from the mRNA transcript(s). Transcript processing may include splicing, editing and degradation. As used herein, a nucleic acid derived from an mRNA transcript refers to a nucleic acid for whose synthesis the mRNA transcript or a subsequence thereof has ultimately served as a template. Thus, a cDNA reverse transcribed from an mRNA, an RNA transcribed from that cDNA, a DNA amplified from the cDNA, an RNA transcribed from the amplified DNA, for example, are all derived from the mRNA transcript and detection of such derived products is indicative of the presence and/or abundance of the original transcript in a sample. Thus, mRNA derived samples include, but are not limited to, mRNA transcripts of the gene or genes, cDNA reverse transcribed from the mRNA, cRNA transcribed from the cDNA, DNA amplified from the genes, RNA transcribed from amplified DNA, and the like.

The term "nucleic acid library or array" as used herein refers to an intentionally created collection of nucleic acids which can be prepared either synthetically or biosynthetically and screened for biological activity in a variety of different formats (e.g., libraries of soluble molecules; and libraries of oligos tethered to resin beads, silica chips, or other solid supports). Additionally, the term "array" is meant to include those libraries of nucleic acids which can be prepared by spotting nucleic acids of essentially any length (e.g., from 1 to about 1000 nucleotide monomers in length) onto a substrate. The term "nucleic acid" as used herein refers to a polymeric form of nucleotides of any length, either ribonucleotides, deoxyribonucleotides, locked nucleic acids (LNAs) or peptide nucleic acids (PNAs), that comprise purine and pyrimidine bases, or other natural, chemically or biochemically modified, non-natural, or derivatized nucleotide bases. The backbone of the polynucleotide can comprise sugars and phosphate groups, as may typically be found in RNA or DNA, or modified or substituted sugar or phosphate groups. A polynucleotide may comprise modified nucleotides, such as methylated nucleotides and nucleotide analogs. The sequence of nucleotides may be interrupted by non-nucleotide components. Thus the terms nucleoside, nucleotide, deoxynucleoside and deoxynucleotide generally include analogs such as those described herein. These analogs are those molecules having some structural features in common with a naturally occurring nucleoside or nucleotide such that when incorporated into a nucleic acid or oligonucleoside sequence, they allow hybridization with a naturally occurring nucleic acid sequence in solution. Typically, these analogs are derived from naturally occurring nucleosides and nucleotides by replacing and/or modifying the base, the ribose or the phosphodiester moiety. The changes can be tailor made to stabilize or destabilize hybrid formation or enhance the specificity of hybridization with a complementary nucleic acid sequence as desired.

The term "nucleic acids" as used herein may include any polymer or oligomer of pyrimidine and purine bases, preferably cytosine, thymine, and uracil, and adenine and guanine, respectively. (See, Albert L. Lehninger, "Principles of Biochemistry," at 793-800, Worth Pub. 1982). Indeed, the invention contemplates any deoxyribonucleotide, ribonucleotide or peptide nucleic acid component, and any chemical variants thereof, such as methylated, hydroxymethylated or glucosylated forms of these bases, and the like. The polymers or oligomers may be heterogeneous or homogeneous in composition, and may be isolated from naturally-occurring sources or may be artificially or synthetically produced. In addition, the nucleic acids may be DNA or RNA, or a mixture thereof, and may exist permanently or transitionally in single-stranded or double-stranded form, including homoduplex, heteroduplex, and hybrid states.

The term "oligonucleotide" or "polynucleotide" as used interchangeably herein refers to a nucleic acid ranging from at least 2, preferable at least 8, and more preferably at least 20 nucleotides in length or a compound that specifically hybridizes to a polynucleotide. Polynucleotides of the invention include sequences of deoxyribonucleic acid (DNA) or ribonucleic acid (RNA) which may be isolated from natural sources, recombinantly produced or artificially synthesized and mimetics thereof. A further example of a polynucleotide of the invention may be locked nucleic acids (LNAs) or peptide nucleic acid (PNA). The invention also encompasses situations in which there is a nontraditional base pairing such as Hoogsteen base pairing which has been identified in certain tRNA molecules and postulated to exist in a triple helix. "Polynucleotide" and "oligonucleotide" are used interchangeably in this application.

The term "probe" as used herein refers to a surface-immobilized molecule that can be recognized by a particular target. See U.S. Pat. No. 6,582,908 for an example of arrays having all possible combinations of probes with 10, 12, and more bases. Examples of probes that can be investigated by this invention include, but are not restricted to, agonists and antagonists for cell membrane receptors, toxins and venoms, viral epitopes, hormones (e.g., opioid peptides, steroids), hormone receptors, peptides, enzymes, enzyme substrates, cofactors, drugs, lectins, sugars, oligonucleotides, nucleic acids, oligosaccharides, proteins, and monoclonal antibodies.

The term "primer" as used herein refers to a single-stranded oligonucleotide capable of acting as a point of initiation for template-directed DNA synthesis under suitable conditions e.g., buffer and temperature, in the presence of four different nucleoside triphosphates and an agent for polymerization, such as, for example, DNA or RNA polymerase or reverse transcriptase. The length of the primer, in any given case, depends on, for example, the intended use of the primer, and generally ranges from 15 to 30 nucleotides. Short primer molecules generally require cooler temperatures to form sufficiently stable hybrid complexes with the template. A primer need not reflect the exact sequence of the template but must be sufficiently complementary to hybridize with such template. The primer site is the area of the template to which a primer hybridizes. The primer pair is a set of primers including a 5' upstream primer that hybridizes with the 5' end of the sequence to be amplified and a 3' downstream primer that hybridizes with the complement of the 3' end of the sequence to be amplified.

The term "polymorphism" as used herein refers to the occurrence of two or more genetically determined alternative sequences or alleles in a population. A polymorphic marker or site is the locus at which divergence occurs. Preferred markers have at least two alleles, each occurring at frequency of greater than 1%, and more preferably greater than 10% or 20% of a selected population. A polymorphism may comprise one or more base changes, an insertion, a repeat, or a deletion. A polymorphic locus may be as small as one base pair. Polymorphic markers include restriction fragment length polymorphisms, variable number of tandem repeats (VNTR's), hypervariable regions, minisatellites, dinucleotide repeats, trinucleotide repeats, tetranucleotide repeats, simple sequence repeats, and insertion elements such as Alu. The first identified allelic form is arbitrarily designated as the reference form and other allelic forms are designated as alternative or variant alleles. The allelic form occurring most frequently in a selected population is sometimes referred to as the wildtype form. Diploid organisms may be homozygous or heterozygous for allelic forms. A diallelic polymorphism has two forms. A triallelic polymorphism has three forms. Single nucleotide polymorphisms (SNPs) are included in polymorphisms.

The term "solid support", "support", and "substrate" as used herein are used interchangeably and refer to a material or group of materials having a rigid or semi-rigid surface or surfaces. In many embodiments, at least one surface of the solid support will be substantially flat, although in some embodiments it may be desirable to physically separate synthesis regions for different compounds with, for example, wells, raised regions, pins, etched trenches, or the like. According to other embodiments, the solid support(s) will take the form of beads, resins, gels, microspheres, or other geometric configurations. (See, U.S. Pat. No. 5,744,305 for exemplary substrates).

The term "target" as used herein refers to a molecule that has an affinity for a given probe. Targets may be naturally-occurring or man-made molecules. Also, they can be employed in their unaltered state or as aggregates with other species. Targets may be attached, covalently or noncovalently, to a binding member, either directly or via a specific binding substance. Examples of targets which can be employed by this invention include, but are not restricted to, antibodies, cell membrane receptors, monoclonal antibodies and antisera reactive with specific antigenic determinants (such as on viruses, cells or other materials), drugs, oligonucleotides, nucleic acids, peptides, cofactors, lectins, sugars, polysaccharides, cells, cellular membranes, and organelles. Targets are sometimes referred to in the art as anti-probes. As the term targets is used herein, no difference in meaning is intended. A "Probe Target Pair" is formed when two macromolecules have combined through molecular recognition to form a complex.

A "translocation" or "chromosomal translocation" is a chromosome abnormality caused by rearrangement of parts between nonhomologous chromosomes. It is detected on cytogenetics or a karyotype of affected cells. There are two main types, reciprocal (also known as non-Robertsonian) and Robertsonian. Also, translocations can be balanced (in an even exchange of material with no genetic information extra or missing, and ideally full functionality) or unbalanced (where the exchange of chromosome material is unequal resulting in extra or missing genes).

A karyotype is the observed characteristics (number, type, shape etc) of the chromosomes of an individual or species.

In normal diploid organisms, autosomal chromosomes are present in two identical copies, although polyploid cells have multiple copies of chromosomes and haploid cells have single copies. The chromosomes are arranged and displayed (often on a photo) in a standard format known as an idiogram: in pairs, ordered by size and position of centromere for chromosomes of the same size. Karyotypes are used to study chromosomal aberrations, and may be used to determine other macroscopically visible aspects of an individual's genotype, such as sex. In order to be able to see the chromosomes and determine their size and internal pattern, they are chemically labeled with a dye ("stained"). The pattern of individual chromosomes is called chromosome banding.

Normal human karyotypes contain 22 pairs of autosomal chromosomes and one pair of sex chromosomes. Normal karyotypes for women contain two X chromosomes and are denoted 46,XX; men have both an X and a Y chromosome denoted 46,XY.

A "single-nucleotide polymorphism" (SNP) is a DNA sequence variation occurring when a single nucleotide—A, T, C, or G—in the genome (or other shared sequence) differs between members of a species (or between paired chromosomes in an individual). For example, two sequenced DNA fragments from different individuals, AAGCCTA to AAGCTTA, contain a difference in a single nucleotide. In this case we say that there are two alleles: C and T. Almost all common SNPs have only two alleles.

Loss of Heterozygosity (LOH) represents the loss of normal function of one allele of a gene in which the other allele was already inactivated. In oncology, loss of heterozygosity occurs when the remaining functional allele in a somatic cell of the offspring becomes inactivated by mutation. This results in no normal tumor suppressor being produced and this could result in tumorigenesis. Zygosity is the similarity of genes for a trait (inherited characteristic) in an organism. If both genes are the same, the organism is homozygous for the trait. If both genes are different, the organism is heterozygous for that trait. If one gene is missing, it is hemizygous, and if both genes are missing, it is nullizygous. The DNA sequence of any gene can vary among individuals in the population. The various forms of a gene are called alleles, and diploid organisms generally have two alleles for each gene, one on each of the two homologous chromosomes on which the gene is present. In diploid organisms, the alleles are inherited from the individual's parents, one from the male parent and one from the female. Zygosity in general is a description of whether those two alleles have identical or different DNA sequences. For cytogeneticists, detection of LOH is important because such genetic abnormalities may be associated with genetic disorders.

In particular, a major focus in cytogenetics research is on Uniparental Disomy (UPD) events where a child inherits two copies of chromosomal material from one parent and nothing from the other. These UPD events are known to be linked with recessive disorders and also cause developmental disorders due to gene imprinting. These events occur without associated copy number changes. For instance approximately 30% of Prader-Willi cases are associated with paternal UPD of chromosome 15q, 2-3% of Angelman Syndrome are associated with maternal UPD of 15q, 10-30% of Beckwith-Wiedemann Syndrome are associated with maternal UPD of 11p15, and 5% of Silver-Russell Syndrome are associated with maternal UPD of chromosome 7.

LOH is also known to be associated with consanguinity and inbreeding. The boundary between the two of these genetic events is not always clear. Generally, consanguinity refers to close relation matings producing off-spring, e.g. first cousin pairings. This will tend to result in large blocks of LOH, perhaps on only a few chromosomes. Inbreeding refers to small isolated (perhaps physically or culturally) populations where the degree of genetic variability is low within the population. This may lead to many small blocks of LOH across many chromosomes.

Long Contiguous Stretches of Homozygosity (LCSH) in a genomic region (stretch) indicates a region in which the Copy Number is neutral (two copies) but which displays a Loss of normal heterozygosity, and thus is homozygous for the measured SNP allele information.

The term "copy number" (CN) refers to the number of copies of the particular gene or fragment of a gene being measured or detected in a genetic sample. Normal copy number for organisms is two, i.e. there are two copies of each gene present in every cell. However, most organisms possess a variety of numbers of copies of genes in their cells at any given time. Copy number may be increased in some cancers or diseases, or decreased.

A copy number variation (CNV) is a segment of DNA in which copy number differences have been found by comparison of two or more genomes. The segment may range from one kilobase to several megabases in size. Humans (being normally diploid) ordinarily have two copies of each autosomal region of genetic material, one per chromosome. This may vary for particular genetic regions due to deletion or duplication events. CNVs may either be inherited or caused by de novo mutation. CNVs can be caused by genomic rearrangements such as deletions, duplications, inversions, and translocations.

Low copy repeats (LCRs), which are region-specific repeat sequences, are susceptible to such genomic rearrangements resulting in CNVs. Factors such as size, orientation, percentage similarity and the distance between the gene copies renders them susceptible.

Copy Number Polymorphism (CNP) analysis is a specialized method for determining the copy number state in specific genomic CNP regions. CNP regions are observed to be more variable in copy number state than the genome as a whole. Because the copy number state in CNP regions is more likely to deviate from the normal copy number state of two, previous copy number analysis methods were less accurate when applied to CNP regions. Therefore, a new analysis algorithm called Canary was developed by researchers at the Broad Institute for copy number analysis within CNP regions.

An Annotation track provides information about the genetic code to which it is attached. For instance, an annotation track may provide the user with visual information indicating whether a selected segment of the genome displays LOH, LCSH or any other such genetic characteristic or abnormality.

A Hidden Markov Model (HMM) is a statistical model where the system being modeled is assumed to be a Markov process with unknown parameters, and the challenge is to determine the hidden parameters from the observable parameters. HMM statistical models are used by the disclosed invention software application to determine whether, for instance, there is a change in Copy Number State. The extracted model parameters can then be used to perform further analysis, for example, for pattern recognition applications. A HMM can be considered as the simplest dynamic Bayesian network. In a regular Markov model, the state is directly visible to the observer, and therefore the state transition probabilities are the only parameters. In a hidden Markov model, the state is not directly visible, but variables influenced by the state are visible. Each state has a probability distribution over the possible output values. Therefore the sequence of values generated by an HMM gives some information about the sequence of states, e.g. Copy Number States. Hidden Markov models are especially known for their application in temporal pattern recognition such as speech, handwriting, gesture recognition and bioinformatics. (See, for instance, Lior Pachter and Bernd Sturmfels, "Algebraic Statistics for Computational Biology," Cambridge University Press, 2005, ISBN 0-521-85700-7; Eddy, *Nature Biotechnology*, 22:1315-1316 (2005) and Pavel Pevzner, "Computational Molecular Biology: An Algorithmic Approach," MIT Press, 2000, especially pp. 145-149; see also, Rabiner, L., "A Tutorial on Hidden Markov Models and Selected Applications in Speech Recognition," *Proceedings of the IEEE*, Volume 77, pp 257-86, 1989). A HMM is typically defined by a set of hidden states, a matrix of state transition probabilities and a matrix of emission probabilities. Each hidden state has different statistical properties. (See, U.S. patent application Ser. No. 12/143,754, corresponding to U.S. Patent Application Publication No. 2009/0098547, incorporated herein by reference for purposes). Application of the HMM model to genetic data may yield, for instance, a set of reported probabilities at each defined genetic marker of whether the marker is either normal or abnormal in copy number. Such probabilities may be summarized by the disclosed software application for entire segments.

Basically, the HMM processes data one chromosome at a time; a single chromosome is input, a copy number is assigned to each marker, then the markers are partitioned into contiguous segments. A brief summary of the process may be represented as follows. First, summaries are computed at each pre-defined genetic marker based on the likelihood function of the model. The likelihood-based summary provides the probability of the marker belonging to each of the copy number categories, but ignores the same probabilities at neighboring markers. Second, the HMM combines probabilities of markers by taking into account probabilities of neighboring markers as well as probabilities of copy number state transitions from one marker to the next. The result is a chain of copy number calls, one call at each marker, extending the length of the chromosome. The transition probabilities may be specified ahead of time and act independent of the data. Third, of the many possible chains of copy number calls that could be simultaneously assigned to an entire chromosome of markers, the chain with the highest probability is reported to the user, and later displayed to the user by the software application. Finally, the chain of copy number calls is partitioned into segments such that each copy number segment has an identical copy number call at each marker. End points of segments therefore indicate a change in copy number call.

An Expressed Sequence Tag (EST) is a short sub-sequence of a transcribed cDNA sequence. They may be used to identify gene transcripts, and are instrumental in gene discovery and gene sequence determination. The identification of ESTs has proceeded rapidly, with approximately 52 million ESTs available in public databases as of 2008 (e.g. GenBank, and others).

Mosaicism, is the presence of differing genetic sequences or composition within a specified region of the genome. Copy Number Mosaicism indicates the experimental sample genetic marker in question has a copy number which is not a whole integer, but rather is a fractional number, e.g. the copy number is determined by the software and analysis to not be one or two, but is instead determined empirically from the experimental sample to be, for example, a value of 1.6.

MAPD is the Median Absolute Pairwise Difference statistic. MAPD is defined as the Median of the Absolute values of all Pairwise Differences between log$_2$ ratios for a given probe array. Each pair is defined as adjacent in terms of genomic distance, with SNP markers and CN markers being treated equally. Hence, any two markers that are adjacent in the genomic coordinates are a pair. Except at the beginning and the end of a chromosome, every marker belongs to two pairs as it is adjacent to a marker preceding it and a marker following it on the genome. Formally, if xi: is the log 2 ratio for marker i:

$$MAPD=\mathrm{median}(|x_{i+1}-x_i|, i \text{ ordered by genomic position})$$

MAPD is a per-chip estimate of variability, like standard deviation (SD) or interquartile range (IQR). If the log 2 ratios are distributed normally with a constant SD, then MAPD/0.96 is equal to SD and MAPD*1.41 is equal to IQR. However, unlike SD or IQR, using MAPD is robust against high biological variability in log 2 ratios induced by conditions such as cancer.

MAPD Weight is also a copy number parameter, which is used to add the Median Absolute Pairwise Difference statistic to the dispersion parameter Standard Deviation found in Copy Number Parameters:HMM Parameters:Priors. If the MAPD weight is increased from the default, it makes sense to decrease the Standard Deviation.

Mean is a copy number parameter which lists the expected values of the log base 2 ratios with respect to the reference sample corresponding to each copy number state. It is best to have the means as accurate as possible, however, it is difficult to estimate the copy number means of any sample from within the sample.

Standard Deviation is a copy number parameter that lists the corresponding expected standard deviations in the log$_2$ ratio data corresponding to each copy number state. Note that MAPD is computed for each sample and added to these standard deviations after MAPD is multiplied by the MAPD weight.

Smoothing as used herein refers to a process, performed by a computer software program, of manipulating the data found in user-defined Segments (defined below). For instance, smoothing of Copy Number segments can take place when more than one adjacent segment has an aberrant copy number call. For example, if there is a stretch of twenty markers with copy number three, followed by a stretch of five markers with copy number four, followed by a stretch of ten markers with copy number three. These three segments that are together are an uninterrupted copy number gain. The three segments can be smoothed into one, in which case. Smoothing only takes place over stretches that are entirely a gain or entirely a loss. As another example, consider a set of data having a contiguous set of segments with gain values (for instance, of CNState values of three and four), with no markers of copy number two or lower. Without smoothing, these segments will be treated and represented by the software application as a series of individual gain segments. The same rules apply to a set of segments with loss values of 0 or 1. If within the data there is present a contiguous set of markers with gain values of three and four, with no intervening markers of copy number two or lower, then these data will be consolidated into a single gain segment with smoothing applied. It is important to note that smoothing is only a visual aid to the user and does not affect the actual values (data file, like a .chp file) used as the input in the HMM process. The actual values remain unchanged in the data file for later use.

Joining is also an optional manipulation of genetic data that can be performed on the Copy Number Segment data. Joining can occur when two or more otherwise contiguous aberrant copy number segments of the same copy number are interrupted by a normal copy number segment. For example, if there is a stretch of 15 markers with copy number 3 is interrupted by 5 markers called as normal, followed by 25 markers with copy number 3. The 3 segments can be joined into one copy number gain by ignoring the short normal stretch. The short ignored stretch is treated as missing. Joining options within the software application allow the user to join segments with the same aberrant CNState that are separated by no more than a user-specified number of normal-state markers, or by no more than a user-specified distance of normal-state data.

Smoothing and Joining are non-destructive mathematical processes that affect the display of Copy Number segments in software programs. Smoothing and Joining are performed on the CNState data as it is loaded into the software application, based on settings that the user sets before loading. These processes do not affect the marker data in the .cnchp/.cychp files (explained in further detail below).

Generally, confidence parameter values are generated during scanning of the probe array and included in the .cychp data file. This parameter indicates the length of the segment and the number of markers per unit length. The confidence parameter therefore is a measure of the likelihood that the segment represents a real change in the sequence of the genome as compared with a standard or normal or control sample. This confidence score may need to be recalculated during segment detection based on various mathematical algorithm applications, such as smoothing or joining.

The methods may be combined with other methods of genome analysis and complexity reduction. Other methods of complexity reduction include, for example, AFLP, see U.S. Pat. No. 6,045,994, which is incorporated herein by reference, and arbitrarily primed-PCR (AP-PCR) see McClelland and Welsh, in *PCR Primer: A laboratory Manual*, (1995) eds. C. Dieffenbach and G. Dveksler, Cold Spring Harbor Lab Press, for example, at p 203, which is incorporated herein by reference in its entirety. Additional methods of sample preparation and techniques for reducing the complexity of a nucleic sample are described in Dong et al., *Genome Research* 11, 1418 (2001), in U.S. Pat. Nos. 6,361,947, 6,391,592, 6,458,530 6,872,529, 6,958,225, and 6,632,611 and U.S. Patent Pub. Nos. 20030039069, 2004-0067493 and 2004-0067493, which are incorporated herein by reference in their entireties.

The design and use of allele-specific probes for analyzing polymorphisms is described by e.g., Saiki et al., *Nature* 324, 163-166 (1986); Dattagupta, EP 235,726, Saiki, and WO 89/11548. Allele-specific probes can be designed that hybridize to a segment of target DNA from one individual but do not hybridize to the corresponding segment from another individual due to the presence of different polymorphic forms in the respective segments from the two individuals. Hybridization conditions should be sufficiently stringent that there is a significant difference in hybridization intensity between alleles, and preferably an essentially binary response, whereby a probe hybridizes to only one of the alleles.

The term "covariate" is generally a statistical or mathematical term meaning a variable which is possibly predictive of the outcome under study. A covariate variable may be thought of as an independent variable, as used in regression analysis. Covariate values may impact the outcome or interpretation of data.

The term "covariate adjustor" means a computer software program which is capable of manipulating a set of data so that a covariate value either has little or no impact on the final adjusted data set or has more of an impact to better reflect reality or what is actually being detected. For instance, in hybridizing a labeled genetic sample to a DNA microarray, many variables exist which interfere with interpretation of the data derived from scanning the array and reading the fluorescent intensity signals. The manner in which the genetic sample was prepared, using PCR or other amplification processes, may favor amplification of a particular kind of gene fragment over others, resulting in an increased intensity of that fragment even though in the cells in which the genetic sample originated, i.e. in reality, the gene on that fragment is in fact not present in higher proportions than normal. This is a non-limiting and simple example of a covariate value which would need adjustment in the final analysis and interpretation of the data. Covariate adjusters may also be thought of as removing "noise" or interference from non-experiment-related factors, which may normally be removed in an experimental model by various well-designed controls. Covariate adjustors mathematically remove these variables in a controlled manner such that the data ultimately reflect reality, i.e. what is actually present inside the genetic sample. Covariate adjusters can remove spurious artifacts unrelated to the genes being detected in the genetic sample.

Below are provided various embodiments explaining generally how the invention may work and may be implemented or applied to the study of genetic information. Though these embodiments may be very specific, it is understood by one of skill in the art that many modifications may be made of these specifications to achieve the same general outcome. All of these generally known and acknowledged alternative embodiments are incorporated herein within the scope of this disclosed invention.

III. Systems Useful in Analysis of Microarrays

This invention relates to software that accepts, analyzes and visually presents data obtained from nucleic acid probe microarrays, such as AFFYMETRIX® GENECHIP® probe arrays, and spotted probe arrays, as described above. The data obtained from such microarray experiments is typically a number of signal intensity values obtained from scans of the microarrays hybridized with labeled genetic test samples. These microarrays have been used to generate unprecedented amounts of information about biological systems and diseases. For example, the Affymetrix Genome-Wide Human SNP Array 6.0 and CytoScan HD Array, available from Affymetrix, Inc. of Santa Clara, Calif., contains millions of oligonucleotides probes on a single microarray and represents the most advanced microarray of its kind in the market. Analysis of expression and genotype data from such microarrays may lead to the development of new drugs and new diagnostic tools.

Various array configurations and machines are available which enable interrogation and analysis of labeled genomic samples hybridized to microarrays. (See, for instance, U.S. Pat. Nos. 5,445,934; 5,744,305; 5,945,334; 6,140,044; 6,261,776; 6,291,183; 6,346,413; 6,399,365; 6,420,169; 6,551,817; 6,610,482; 6,733,977; 6,955,915; D430,024; 5,445,934; 5,744,305; 6,261,776; 6,291,183; 6,346,413; 6,399,365; 6,610,482; 6,733,977 concerning various arrays; U.S. Pat. Nos. 6,114,122; 6,287,850; 6,391,623; and 6,422,249 concerning various fluidics stations; U.S. Pat. Nos. 5,578,832; 5,631,734; 5,834,758; 5,936,324; 5,981,956; 6,025,601; 6,141,096; 6,171,793; 6,185,030; 6,201,639; 6,207,960; 6,218,803; 6,225,625; 6,252,236; 6,335,824; 6,403,320; 6,407,858; 6,472,671; 6,490,533; 6,650,411; 6,643,015; 6,813,567; 6,141,096, 6,262,838; 6,294,327; 6,403,320; 6,407,858; 6,597,000; and 7,406,391 concerning various scanners; U.S. Pat. Nos. 6,511,277; 6,604,902; 6,705,754; and 7,108,472 concerning various auto-loading devices useful with the instrumentation and software of the present invention; all incorporated herein by reference for all purposes in their entirety).

Various techniques and technologies may be used for synthesizing dense arrays of biological materials on or in a substrate or support. For example, the Affymetrix GENECHIP™ arrays are synthesized in accordance with techniques sometimes referred to as VLSPS™ (Very Large Scale Immobilized Polymer Synthesis) technologies. Some aspects of VLSPS™ and other microarray manufacturing technologies are described in U.S. Pat. Nos. 5,424,186; 5,143,854; 5,445,934; 5,744,305; 5,831,070; 5,837,832; 6,022,963; 6,083,697; 6,291,183; 6,309,831; and 6,310,189, all of which are hereby incorporated by reference in their entireties for all purposes. The probes of these arrays in some implementations consist of nucleic acids that are synthesized by methods including the steps of activating regions of a substrate and then contacting the substrate with a selected monomer solution. As used herein, nucleic acids may include any polymer or oligomer of nucleosides or nucleotides (polynucleotides or oligonucleotides) that include pyrimidine and/or purine bases, preferably cytosine, thymine, and uracil, and adenine and guanine, respectively. Nucleic acids may include any deoxyribonucleotide, ribonucleotide, and/or peptide nucleic acid component, and/or any chemical variants thereof such as LNAs, methylated, hydroxymethylated or glucosylated forms of these bases, and the like. The polymers or oligomers may be heterogeneous or homogeneous in composition, and may be isolated from naturally-occurring sources or may be artificially or synthetically produced. In addition, the nucleic acids may be DNA or RNA, or a mixture thereof, and may exist permanently or transitionally in single-stranded or double-stranded form, including homoduplex, heteroduplex, and hybrid states. Probes of other biological materials, such as peptides or polysaccharides as non-limiting examples, may also be formed. For more details regarding possible implementations, see U.S. Pat. No. 6,156,501, which is hereby incorporated by reference herein in its entirety for all purposes.

A system and method for efficiently synthesizing probe arrays using masks is described in U.S. Pat. No. 6,949,638, which is hereby incorporated by reference herein in its entirety for all purposes. A system and method for a rapid and flexible microarray manufacturing and online ordering system is described in U.S. Provisional Patent Application Ser. No. 60/265,103 (now expired), filed Jan. 29, 2001, which also is hereby incorporated herein by reference in its entirety for all purposes. Systems and methods for optical photolithography without masks are described in U.S. Pat. No. 6,271,957 and in U.S. patent application Ser. No. 09/683,374 filed Dec. 19, 2001 (now abandoned), both of which are hereby incorporated by reference herein in their entireties for all purposes.

Other techniques exist for depositing probes on a substrate or support. For example, "spotted arrays" are commercially fabricated, typically on microscope slides. Aspects of these and other spot arrayers are described in U.S. Pat. Nos. 6,040,193 and 6,136,269, in U.S. Pat. No. 6,955,788, and in International Patent Application No. PCT/US99/00730 (International Publication Number WO 99/36760), all of which are hereby incorporated by reference in their entireties for all purposes. Other techniques for generating spotted arrays also exist. For example, U.S. Pat. No. 6,040,193 to Winkler, et al., is directed to processes for dispensing drops to generate spotted arrays.

Labeled targets in hybridized probe arrays may be detected using various commercial devices, sometimes referred to as scanners. For example, a scanning system for use with a fluorescent label is described in U.S. Pat. No. 5,143,854, incorporated by reference above. Other scanners or scanning systems are described in U.S. Pat. Nos. 5,578,832, 5,631,734, 5,834,758, 5,936,324, 5,981,956, 6,025,601, 6,141,096, 6,185,030, 6,490,533, 6,650,411, 6,643,015 and 6,201,639, in International Patent Application PCT/US99/06097 (published as WO99/47964), in U.S. patent application Ser. Nos. 09/682,837 (abandoned), and in U.S. Provisional Patent Application Ser. Nos. 60/364,731, 60/396,457, and 60/435,178, each of which patent and patent application is hereby incorporated by reference in its entirety for all purposes.

Examples of probe arrays and associated cartridges or housings may be found in U.S. Pat. Nos. 5,945,334, 6,287,850, 6,399,365, and 6,551,817, each of which is also hereby incorporated by reference in its entirety for all purposes. In addition, some embodiments of the probe array may be associated with pegs or posts, where for instance probe array 140 may be affixed via gluing, welding, or other means known in the related art to the peg or post that may be operatively coupled to a tray, strip or other type of similar substrate. Examples with embodiments of the probe array associated with pegs or posts may be found in U.S. patent application Ser. No. 10/826,577 (abandoned).

Labeled targets hybridized to probe arrays may be detected using various devices, sometimes referred to as scanners, as described above with respect to methods and apparatus for signal detection. For example, scanners image the targets by detecting fluorescent or other emissions from labels associated with target molecules, or by detecting transmitted, reflected, or scattered radiation. A typical scheme employs optical and other elements to provide excitation light and to selectively collect the emissions.

For example, array scanners provide a signal representing the intensities (and possibly other characteristics, such as color that may be associated with a detected wavelength) of the detected emissions or reflected wavelengths of light, as well as the locations on the substrate where the emissions or reflected wavelengths were detected. Typically, the signal includes intensity information corresponding to elemental sub-areas of the scanned substrate. The term "elemental" in this context means that the intensities, and/or other characteristics, of the emissions or reflected wavelengths from this area each are represented by a single value. When displayed as an image for viewing or processing, elemental picture elements, or pixels, often represent this information. Thus, in the present example, a pixel may have a single value representing the intensity of the elemental sub-area of the substrate from which the emissions or reflected wavelengths were scanned. The pixel may also have another value representing another characteristic, such as color, positive or negative image, or other type of image representation. The size of a pixel may vary in different embodiments and could include a 2.5 µm, 1.5 µm, 1.0 µm, or sub-micron pixel size. Two examples where the signal may be incorporated into data are data files in the form *.dat or *.tif as generated respectively by Affymetrix Microarray Suite (described in U.S. Pat. No. 7,031,846) based on images scanned from GeneChip® arrays. Examples of scanner systems that may be implemented with embodiments of the invention include U.S. patent application Ser. No. 10/389,194 (allowed), and Ser. No. 11/260,617 (allowed), and U.S. Pat. Nos. 7,148,492 and 7,317,415, each of which are incorporated by reference above.

Examples of autoloaders and probe array storage instruments are described in U.S. patent application Ser. No. 10/389,194 (allowed) and Ser. No. 10/684,160 (abandoned); and U.S. Pat. Nos. 6,511,277 and 6,604,902 each of which are hereby incorporated by reference in their entireties for all purposes.

Examples of fluid handling elements and methods for mixing fluids in a chamber are provided in U.S. patent application Ser. No. 11/017,095 (abandoned), which is hereby incorporated by reference herein in its entirety for all purposes.

Additional examples of hybridization and other type of probe array processing instruments are described in U.S. patent application Ser. Nos. 10/684,160 and 10/712,860, both of which are hereby incorporated by reference herein in their entireties for all purposes.

It will be understood by those of ordinary skill in the relevant art that there are many possible configurations of the components of the aforementioned systems including computers which may be employed in the present methods. Processors may be commercially available or it may be one or more different processors that are or will become available. Some embodiments of processors may also include what are referred to as multi-core processors and/or be enabled to employ parallel processing technology in a single or multi-core configuration. System memory may be any of a variety of known or future memory storage devices. Examples include any commonly available random access memory (RAM), magnetic medium such as a resident hard disk or tape, an optical medium such as a read and write compact disc, or other memory storage device. Memory storage devices may be any of a variety of known or future devices, including a compact disk drive, a tape drive, a removable hard disk drive, USB or flash drive, or a diskette drive. Such types of memory storage devices typically read from, and/or write to, a program storage medium (not shown) such as, respectively, a compact disk, magnetic tape, removable hard disk, USB or flash drive, or floppy diskette. Any of these program storage media, or others now in use or that may later be developed, may be considered a computer program product. As will be appreciated, these program storage media typically store a computer software program, such as the programs described in more detail below, and/or data. Computer software programs, also called computer control logic, typically may be stored in system memory and/or the program storage device used in conjunction with a memory storage device.

In some embodiments, a computer program product is described comprising a computer usable medium having control logic (computer software program, including program code) stored therein. The control logic, when executed by a processor, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Input-output controllers could include any of a variety of known devices for accepting and processing information from a user, whether a human or a machine, whether local or remote. Such devices include, for example, modem cards, wireless cards, network interface cards, sound cards, or other types of controllers for any of a variety of known input devices. Output controllers of input-output controllers could include controllers for any of a variety of known display devices for presenting information to a user, whether a human or a machine, whether local or remote. Functional elements of a computer communicate with each other via a system bus. Some of these communications may be accomplished in alternative embodiments using network or other types of remote communications.

As will be evident to those skilled in the relevant art, an instrument control and image processing application, such as for instance an implementation of instrument control and image processing applications, if implemented in software, may be loaded into and executed from system memory and/or a memory storage device. All or portions of the instrument control and image processing applications may also reside in a read-only memory or similar device of memory storage device, such devices not requiring that the instrument control and image processing applications first be loaded through input-output controllers. It will be understood by those skilled in the relevant art that the instrument control and image processing applications, or portions of it, may be loaded by a processor in a known manner into system memory, or cache memory, or both, as advantageous for execution. Library files, experiment data, and internet client may be stored in system memory. For example, experiment data could include data related to one or more experiments or assays such as excitation wavelength ranges, emission wavelength ranges, extinction coefficients and/or associated excitation power level values, or other values associated with one or more fluorescent labels. One of skill in the art is aware that there are various gene or genome annotation sites on the internet which may be accessible using software, such as the application described above, and whose information may be displayed by the software for the user's consideration.

Instrument control and image processing applications may comprise any of a variety of known or future image processing applications. Some examples of known instrument control and image processing applications include the Affymetrix Microarray Suite, and Affymetrix GENECHIP® Operating Software (hereafter referred to as GCOS) applications. Typically, embodiments of applications may be loaded into system memory and/or a memory storage device through one of any number of available input devices.

The presently disclosed applications may, in the present implementation, provide one or more interactive graphical user interfaces (GUI) that allows a user to make selections based upon information presented in an embodiment of a GUI. Those of ordinary skill will recognize that GUI embodiments may be coded in various language formats such as an HTML, XHTML, XML, javascript, Jscript, or other language known to those of ordinary skill in the art used for the creation of enhancement of viewable Web Pages.

Examples of instrument control via a GUI or other interface is provided in U.S. patent application Ser. No. 10/764,663 (abandoned), which is hereby incorporated by reference herein in its entirety for all purposes.

IV. Specific Embodiments—Data Analysis and Application of Covariate Adjusters Disclosed herein are methods, systems, software and related articles pertaining to software applications and algorithms available therein which aid in the identification, analysis, manipulation and display of large amounts of complex genetic data. Detection in a genetic microarray experiment, by scanning of the intensities of fluorescent signals on a probe array, typically generates a data file containing signal intensity data, referred to as a ".CEL" file which is saved on a computer which runs the system performing the scanning. The .CEL files may be converted into .cnchp or .cychp files (types of .chp files) which represent normalized intensity values obtained from the probe array during a hybridization experiment. The values are normalized by obtaining a ratio of the value with respect to a baseline reference set of normal samples. Other algorithmic manipulations may be applied to further normalize and correct the data for spurious artifacts.

An exemplary experimental flow of the data analysis for the disclosed system and process may proceed as follows. First, intensity values may be obtained from the probe array by a scanner connected within the system. The intensity values may then be collected in the memory device of a controlling computer in a .dat file (or multiple such files). Then, the .dat file may be converted to a .CEL file as explained above. Third, an HMM algorithm, or similar mathematical analysis algorithm, may be employed by software to convert the data into normalized data, exported as a .cychp file, or a .cnchp file, for instance. These .cychp and/or .cnchp data files contain information utilized by application browsers to display the information in multiple colors and a variety of windows, showing various segments of genomic sequence information to the user for visual inspection and analysis.

The display of the data may be in color and may be interactive, allowing the user to define various functionalities and various segments of genome being investigated by the experiment. For instance, the application may contain programming that allows the display of a map of the entire genome of the animal, bacteria, plant or other entity of interest. The genome may be human, mouse, insect, plant, bacterial or any other type of genome. The genetic map displayed to the user may be in color and particularly may make use of various colors to signify different functionalities or characteristics of the genetic data. Furthermore, the application may enable a user to interface directly with the genomic map obtained from the data, which may display, for instance, the identities of the various SNP sequences identified by the genetic experiment(s). The genetic map may be depicted in the form of chromosomes, or shapes which mimic or reflect traditional depictions of chromosome shapes as seen by, for instance, a cytogenetecist examining chromosomes through a microscope. See, for instance, U.S. Patent Application Publication Number 2011/02578, incorporated herein by reference for all purposes.

Various other concepts of organization and presentation of SNP data, copy number calls and segmentation analysis may be found in U.S. patent application Ser. No. 12/986,986, filed on Jan. 7, 2011 and entitled "Differential Filtering of Genetic Data," the entirety of which is incorporated herein by reference for all purposes. The '986 application provides much greater detail on various embodiments of acquisition of such data and the display of such data for user analysis and manipulation. The '986 application provides various exemplary embodiments which can be used to display the data after manipulation by application of the various algorithms and methods disclosed herein. That is, the present methods and algorithms provide means by which microarray experimental data may be normalized, corrected, analyzed and generally made more consistent from experiment to experiment across arrays, more robust and more dependable, by removal of various independent variables and by better display of the data. Upon execution of these methods, the data upon which the present methods operate may be displayed in various forms and formats by, for instance, the software applications disclosed in the '986 application.

The Affymetrix Chromosome Analysis Suite (ChAS, available from Affymetrix, Inc., Santa Clara, Calif.) is a non-limiting example of such computer programs or software. The various possible features that may be presented in the software program display are disclosed in exemplary embodiments in the ChAS software. The ChAS User Manual, which is available and freely downloadable in .pdf form from the Affymetrix website, is specifically incorporated herein by reference in its entirety for all purposes.

The intensity values detected emanating from the microarray are empirically determined by a scanning laser which detects signals from, for instance, the hybridization of a labeled genetic sample to the probe array, as explained above. These intensity values may be compared in silico to the values in a reference, which may be a reference model, e.g. an ideal model of the predicted or expected or average outcome of the experiment, or it may be another .CEL data file or .rmf file. This comparison is made by determining a ratio of the experimentally determined intensity values in a .CEL file with the reference. Such a ratio is generated in silico by the software application as a $\log_2$ ratio.

Thus, the $\log_2$ ratio is the normalized intensity data obtained from the probe array. This ratio also represents the copy number of the experimental genetic material represented by the probes on a probe by probe localization basis. In other words, the ratio value generated by the software application represents the number of copies of a given SNP or other non-polymorphic marker, detected within the experimental gene sample, with respect to the reference. In this manner, the user may obtain what is commonly referred to as the copy number of a gene or SNP or marker. The $\log_2$ ratio is most commonly the $\log_2$ of the ratio of measured signal intensity value (for any given marker) divided by median reference signal intensity value.

In general, the present specific embodiments are related to the manipulation of intensity value data so as to achieve more robust and higher quality data which is more reproducible in the field of microarray assays in general. For instance, covariate adjustors may be employed to make corrections in array data based on orthogonal known characteristics. Types of covariate adjusters which a user may generically apply to a given set of intensity value data include, but are not limited to, adjusters for GC content (Super GC covariate adjuster), etc. A user of the type of software program, such as ChAS described above, could manually select one or more different kinds of covariate adjusters to apply to a particular data set, depending on the needs and the character of the data produced by the particular experiment.

Additionally, high pass filters may be employed for signal processing to manipulate image data obtained from the microarray experiment. The image used in this high pass filter may be, for instance, a pseudo image which is generated using a $\log_2$ ratio value of intensities rather than simply using and/or displaying to the user the raw image data obtained from DAT or CEL files. Transforming the image data by the $\log_2$ ratio uncovers important gradients in the images that can only be seen with this method and therefore can only then be corrected using this method.

Finally, the data may also be manipulated and improved upon through signal restoration algorithms. Such signal restoration algorithms may employee Bayes wavelet shrinkage methods used on $\log_2$ ratio data.

The following is a high level overview of how copy number (CN) calls are generated within software. The copy number workflow starts with the intensities on the array, include normalization and scaling, reference set ratios, $\log_2$ transformation, CN state segmentation, and how CN segment calls are made. (See, FIG. 1).

Microarrays are scanned and processed by scanners available in the art and programs run by computers in the scanning system. Commonly used and available software, such as AGCC scanner software package available from Affymetrix, Inc., Santa Clara, Calif., aligns a grid on the .DAT file (the original scanned image) to identify each microarray feature and calculates the signal from each feature. This process uses the .DAT file, containing the raw signal, and creates a .CEL file, which contains a single signal intensity for each feature. The .CEL file is used for all downstream analyses.

Beginning with the raw signal data in the .CEL file, a series of steps may be implemented that perform probe set summarization, normalization, removal of variation caused by known properties and residual variation, and completing with calling genotypes, copy number segments and LOH segments. The complete detail of exemplary steps performed in the exemplary workflow is shown in FIG. 1 and each step is briefly described in the subsequent text. The first level of covariate adjustors operates on the raw signal.

Signal Level Covariate Adjusters

The Fragment Adapter Covariate Adjustor: After restriction digest of the genomic sample, an restriction enzyme-specific adaptor may be ligated onto the cohesive end termini. For example, a restriction enzyme such as Nsp I, commonly employed in sample processing for microarray experiments, may be added to the sample genomic material to break down the long strands of DNA into shorter strands that are easier to manipulate for the purposes of performing the microarray experiment. Since Nsp I is a 6-nucleotide cutter with degenerate sites, meaning that they contain one or more base pairs that are not specifically defined, these ends are of various sequences and the ligated adaptors are a variety of sequences. The exact sequences of the cut site and ligation adaptor have an effect on the overall efficiency of ligation and subsequent PCR amplification. The Adaptor Covariate Adjustor is able to correct for these differences by normalizing the signals for each adaptor/cut site sequence class to an overall median.

Fragment Length Covariate Adjustor: The length of each fragment impacts the efficiency of PCR amplification and therefore the signal. Fragments of 300-500 bp are amplified with the highest efficiency and the degree of amplification tapers off as the fragments get longer. The Length Covariate Adjustor corrects for these differences by normalizing the signals for a series of fragment size bins to an overall median.

Dual Quantile Normalization

Dual quantile normalization is a two-phase process where probes used for copy number detection and probes used for SNP genotype detection are normalized separately. In both cases, a normalization sketch is built using the autosomal probes in the reference set. The normalization sketch is the prototype distribution of probe intensities that defines what this distribution looks like for all arrays. The single sample autosomal probes are fit to the sketch and the X and Y probes are interpolated into the distribution.

Quantile normalization makes the assumption that the distribution of probes on the array is fairly consistent from array to array. Since the X-chromosome is one of the largest chromosomes (155 Mbp, ~5% of the genome), differences between males and females would stretch this assumption. That is why the quantile normalization focuses on creating an autosomal sketch and normalizing the autosome to it. The X and Y chromosome probes are then handled in a special way. Each of them is matched to the closest pre-normalization signal value. Based on that match, their normalized signal should be close to the signal for the very same autosomal probe. So the normalized values for X and Y probes are simply "looked-up" in the pre-normalization autosomal sketch, and transformed to the post-normalization value.

Copy Number Work Flow

A general exemplary workflow for processing raw image intensity data obtained from a microarray experiment may be as follows. The following explanation makes reference to the left side of the flowchart of FIG. 1, which pertains to the various steps involved in manipulation of signal intensity data for the purpose of determining copy number (CN).

$\log_2$ ratios for each marker are calculated relative to the reference signal profile. The log 2 ratio is simply $\log_2(\text{sample}_m) - \log_2(\text{reference}_m)$, for each marker, "m".

After the $\log_2$ ratio calculation is made, optionally a high pass filter image correction step may be employed (explained in more detail below). Since most probes map to genomic markers associated with a normal copy number, most $\log_2$ ratios should be centered at a value of zero. Also, since markers from any genomic region are scattered across the surface of the microarray, regions of altered copy number will not appear as regional changes on the microarray image.

Some samples do reveal spatial trends away from zero that are gradual and this spatial bias when scattered back across the genome exhibits itself as added noise in the log 2 ratios. The High Pass Filter Image Correction identifies these gradual spatial trends and adjusts log 2 ratios to remove the spatial bias and lower the level of noise.

Log 2 Ratio-Level Covariate Adjustors

The Super GC Covariate Adjuster

It is well known that the nucleotides G and C hybridize with each other much stronger than A and T. Thus, when a fragment of DNA contains a disproportionate amount of the nucleotides G and C, and this fragment is either used as a probe on a microarray or is part of a labeled fragment to be hybridized to a microarray, spurious events can occur in many steps of the experiment. For instance, the GC content of genomic DNA sequences impacts probe signal dose-response and therefore probe $\log_2$ ratios. In other words, when the sample is amplified it takes less GC labeled fragments to hybridize to the microarray and provide a good signal than fragments containing more A and T nucleotides, due to the differences in hybridization strength. This may make it appear as though there are more fragments containing the over-abundance of G and C nucleotides than other fragments, and lead to an artifact in the determination of copy number.

In addition, the genomic GC content of the fragments and the 500 kbp surrounding the probe (local GC) impacts the efficiency of target preparation in the genomic region of each probe. It is well known that when PCR is performed to amplify the genetic sample material, polymerase enzymes tend to have differences in enzymatic efficiency when amplifying GC rich segments of DNA as compared to AT rich segments of DNA. Thus, polymerase enzymes may artificially over-amplify AT-rich fragments of DNA as compared to GC-rich fragments. The subsequent labeling of these fragments and hybridization to a microarray can again lead to spurious results, i.e. an artificially enhanced signal for AT-rich sequences over GC-rich sequences in the genomic sample.

Each one of these independent variables can be individually controlled by separate covariate adjusters. A specific algorithmic adjuster may be applied to adjust for local GC (GC content/concentration within a specific window of length across the probe or fragment), fragment GC and probe GC. However, in doing so, one would find that upon adjustment of the intensity data for one variable, one of the other two variables would need re-adjustment, and so on. In other words, because all three variables concern GC content in the sample or probes, all three are interdependent. A solution to this problem presents itself in the form of a complex algorithmic calculation wherein all three variables are simultaneously adjusted by one "master" covariate adjuster. This is what the present invention accomplishes. Though it seems like perhaps a simple solution, it is not simple. An algorithm must be designed, operating in three-dimensional space, which simultaneously analyzes all the data produced by a scan of an entire microarray, and adjust for multiple variables to arrive at a single, well-defined, well-controlled solution which eliminates much of the spurious and artifactual variability introduced by such independent variables. We hereinafter refer to this "master" covariate adjuster for GC content as the "Super GC Covariate Adjuster."

The Super GC Covariate Adjustor combines the probe GC content, the fragment GC content and the local GC content into one covariate that corrects for log 2 ratio differences based on the combination of GC contents associated with each probe.

Reference Intensity Covariate Adjustor

As explained above, covariate adjusters in the present application operate by first placing various intensity values into bins. Artificial, numerical bins are constructed comprising specific ranges of intensity values. All intensity values from a particular microarray experiment are placed into their respective bin. Then, all values in those bins are simultaneously adjusted in the same direction and in the same quantity, so they are all treated identically to remove and account for the independent variable introduced into the data. Of course, if one were to construct bins such that there is a single bin for every value, every single value in the experiment would be individually adjusted or adjustable. This would lead to nonsensical results since no value would be true to the experiment as quantified by the scanner. However, too few bins into which wide ranges of values are placed would lead to under-correction of the data and less than desirable results. Thus, choosing the appropriate number of bins for each microarray experiment is required.

Probes in different intensity categories have different dose responses in $\log_2$ ratio space. Using Reference Set probes to define bins based on probe intensity, the single sample probes are binned and the median of the distribution of $\log_2$ ratios within each bin is adjusted to the median log 2 ratio of the corresponding bin from the reference set.

Marker Type Covariate Adjustor

Polymorphic probes mounted onto microarrays may be designed for SNP detection and other, non-polymorphic, probes may be designed for copy number detection. These two types of probes have different properties and different dose responses, i.e. they produce different levels of signal depending on the quantity of labeled sample present when it is hybridized to the microarray. The Marker Type Covariate Adjustor normalizes the median $\log_2$ ratios of SNP and CN markers to account for differences in $\log_2$ ratios between these two kinds of probes.

Median Autosome Normalization

This final level of normalization simply shifts the median $\log_2$ ratio of the autosomes to a copy-number state equal to 2, i.e. a $\log_2$ ratio of 0, which represents a "normal" sample since in most organisms studied thus far, it has been consistently found that each organisms has exactly two copies of every gene, unless there has been an event which adversely impacts the chromosome or genome to either amplify or reduce that normal copy number of 2.

Systematic Residual Variability Removal

Even after all of the Covariate Adjusters are applied to the data, there are some residual variations with unknown origins. The Systematic Residual Variability Removal step matches sample variability to the residual variability of the reference set, and when matched, corrects the data to remove the residual variable that was matched, i.e. if the variable consistently appears in both the reference set and the experimental data, it can safely be assumed that the variable arose due to some independent factor impacting every experiment from the system.

Remaining Steps in FIG. 1

The Signal Restoration step, as outlined in the left side of the flow diagram of FIG. 1, is explained in more detail below. Segmentation, Smoothing/Joining and Visualization are disclosed in, for instance, U.S. patent application Ser. No. 12/986,986, filed on Jan. 7, 2011 and entitled "Differential Filtering of Genetic Data," the entirety of which is incorporated herein by reference for all purposes. While the right side of FIG. 1 is not expressly discussed herein, it is to be understood that other covariate adjusters may be developed and applied to the determination of SNP sequence in the same manner as explained above for Copy Number variations.

Within the exemplary sample analysis and data gathering work flow presented above, methods and systems are disclosed herein for using covariate information to adjust signal and $\log_2$ ratio information in the analysis of intensity values obtained from microarray experiments. The methodology proposed is intended to be generic so that any covariate may be used in this framework. There may be numerous covariate adjusters that are associated with each probe/marker on a microarray, and for every step in the sample preparation process, and for every flaw or bias that may be found in the system used to detect the signals—such as the scanner or the chip or the scanning arm, for instance. Some of these covariate adjusters can reasonably be assumed to not be directly associated with biologically meaningful copy number differences. Furthermore, it is possible to observe that between different runs of the same sample, variation in the signal (or $\log_2$ response) as a function of these covariates differs. Various methods for removing covariate related differences are provided herein.

Covariate adjusters may be applied in many methodologies to account and correct for many different types of independent variables, such as, but not limited to: fragment adaptor type, fragment length, fragment GC content, probe GC content, and local (regional) GC content.

Development and Application of Covariate Adjusters to Microarray Data

Disclosed are methodologies for adjusting signal information relative to a covariate. To begin with, signal intensities (which may be, for instance, reflectance off of the array and/or fluorescence emanating from labeled sample hybridized to the array) may be binned based on their values as discussed above. Binning of values is a method of sorting such experimental values or measured quantities based on a value range.

Figure 2:
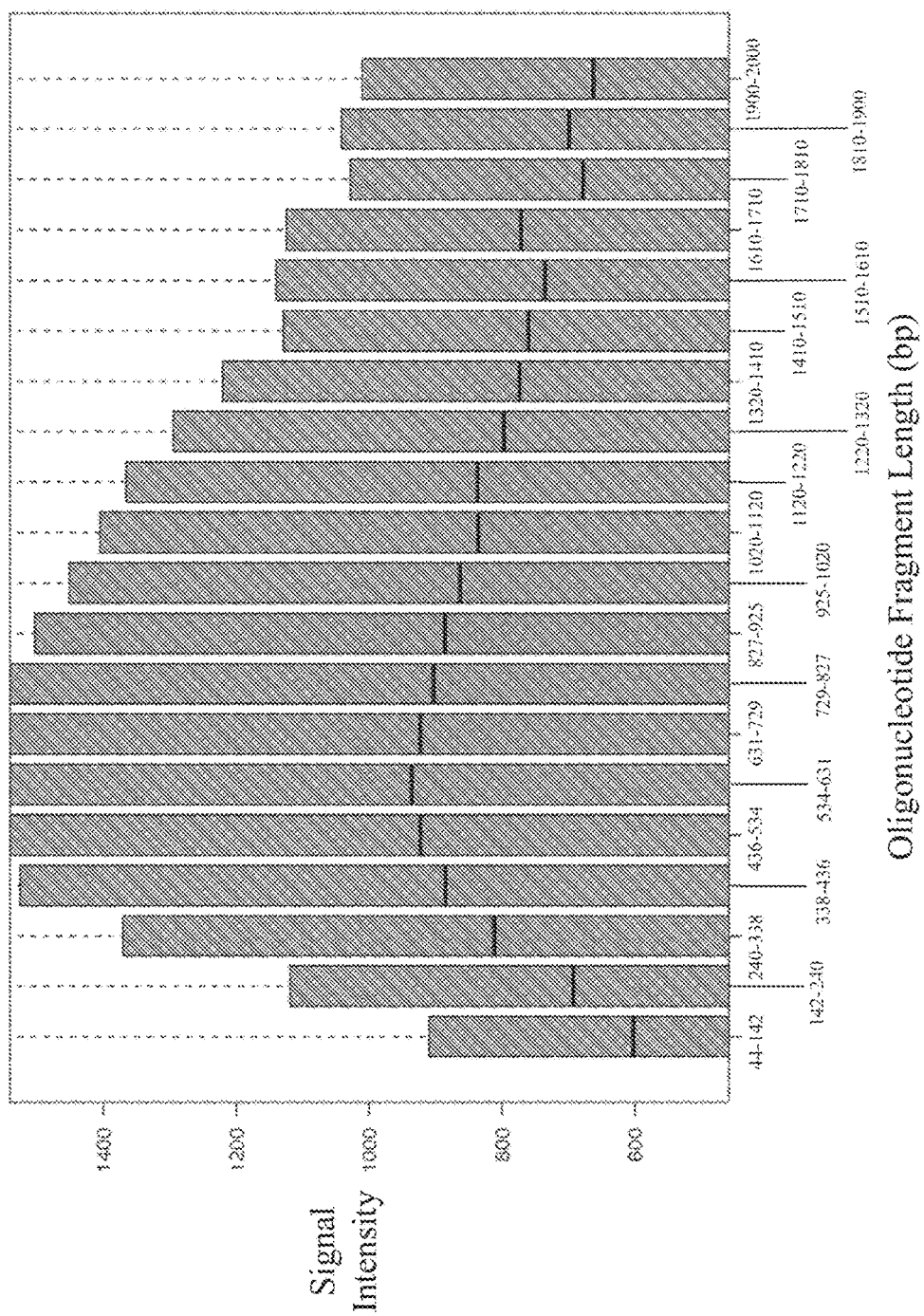
FIG. 2 is a boxplot, displaying various value bins of intensity, with the center of each box summarizing the relationship between signal and covariate. The x-axis plots fragment length in base pairs (bp) and the y axis plots signal intensity in relative intensity units.

One way to examine data stratified this way is using boxplots as shown in FIG. 2. FIG. 2 represents the binning of fragment length. As explained above, in a standard microarray experiment, the genetic material must first be prepared by digestion (fragmentation, typically using a restriction enzyme, such as NspI) and then amplification, followed typically by further digestion with Dnase and then labeling. Thus, in the preparation of genetic samples, many different fragment lengths of sample may be generated, as reflected in FIG. 2. The fragment lengths portrayed in this figure and later figures relates to the length of the fragments of DNA that result from the restriction enzyme digestion step of the non-amplified genetic material. However, one could develop a covariate adjuster which also may address any bias inherent in the length of amplified fragments of DNA resulting from Dnase digestion. Furthermore, it has been found that fragment length can have a detrimental, or favorable, impact on the hybridization of that labeled sample fragment to the microarray. For instance, if the fragment is too long, it may not hybridize well to the microarray-bound probe due to steric issues or other physical strain or stress present during the assay. Likewise, shorter fragments may have trouble hybridizing to their respective probes on the microarray because there may not be enough nucleotides to form a stable hybridization complex that can withstand the washing and other steps which form part of the assay. Each bar on the graph in FIG. 2 represents the measured intensity values for sample fragments which fall within the fragment length range defined in base pairs (bp) by the boxes on the x-axis of the box plot. The center of each box summarizes the relationship between signal and the covariate. The values being binned in FIG. 2 are fragment length.

Figure 3:
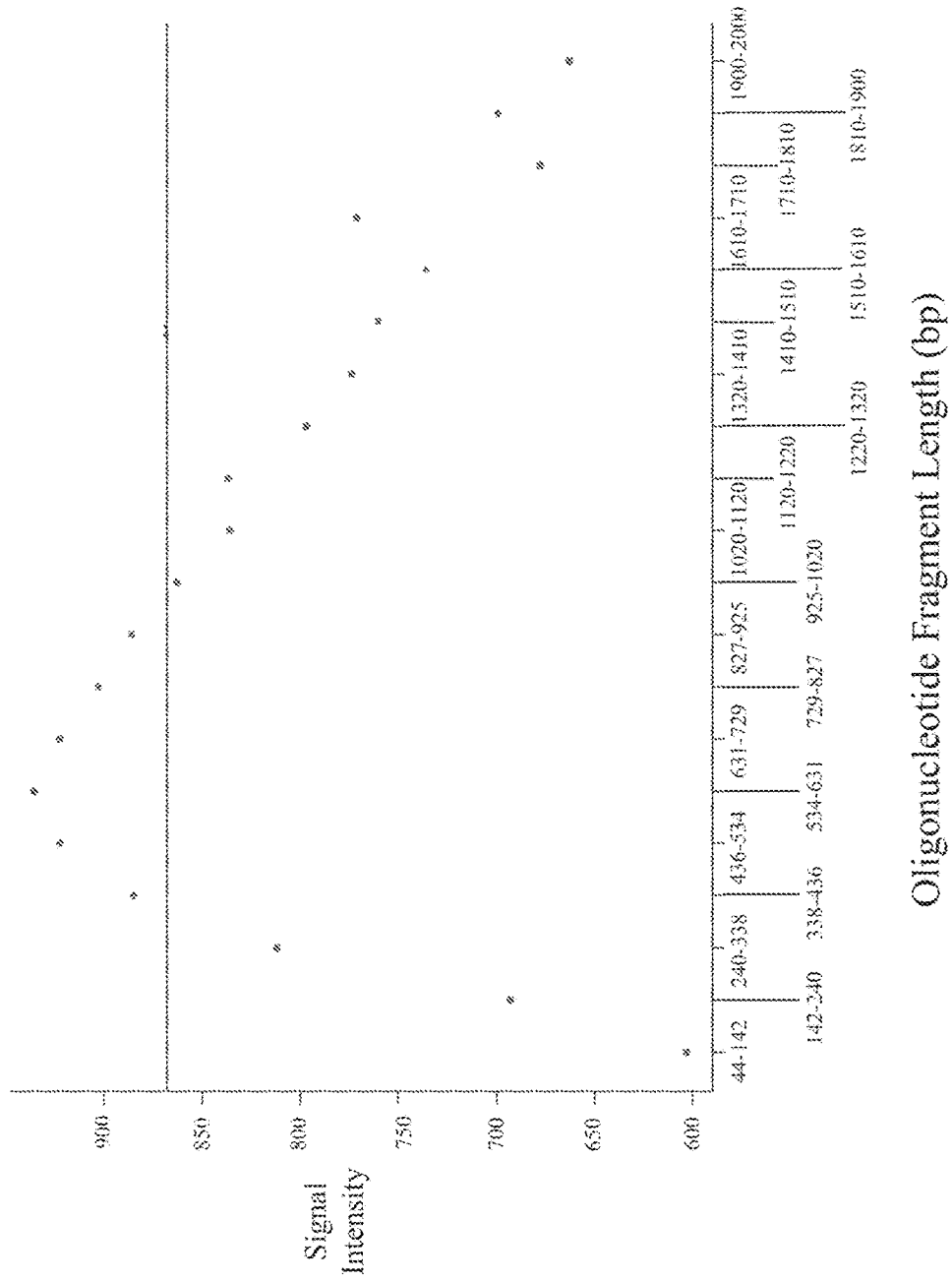
FIG. 3 is a plot summarizing the signal intensity measurement using the overall median. The x-axis plots fragment length in base pairs (bp) and the y axis plots signal intensity in relative intensity units. The line across the middle represents the target overall median intensity.
Figure 4:
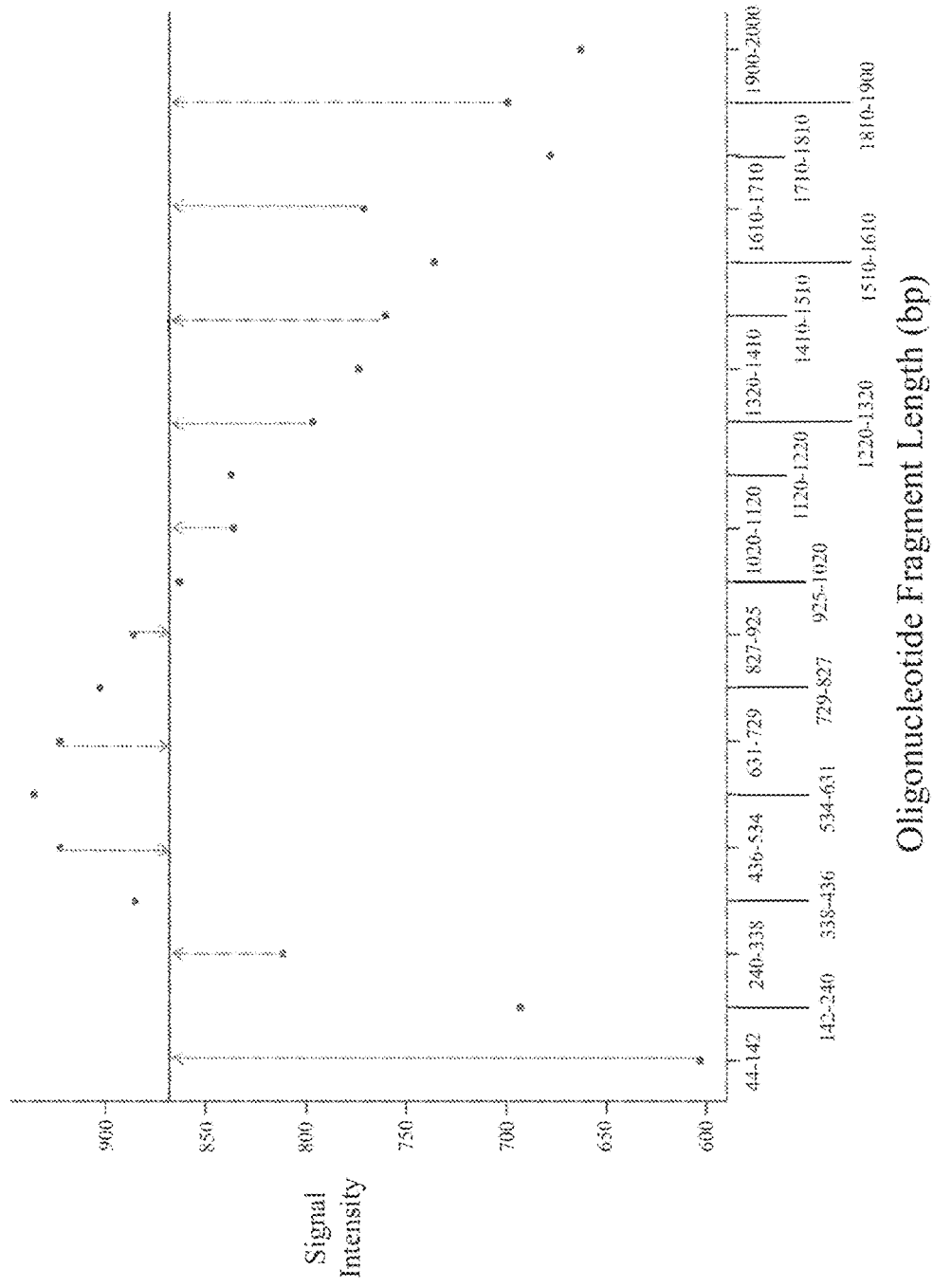
FIG. 4 is a plot showing how the signal intensity measurement for each value within each bin is manipulated to fall at the level of the overall median. The x-axis plots fragment length in base pairs (bp) and the y axis plots signal intensity in relative intensity units. The line across the middle represents the target overall median intensity.

The signal may also be summarized irrespective of the level of the covariate by using the overall median of the intensity values as depicted in FIG. 3. The approach reflected in FIG. 3 is to adjust the median of each box to fall at the level of the overall median. A scaling transformation may be used to achieve this result as visually depicted in FIG. 4.

Figure 5:
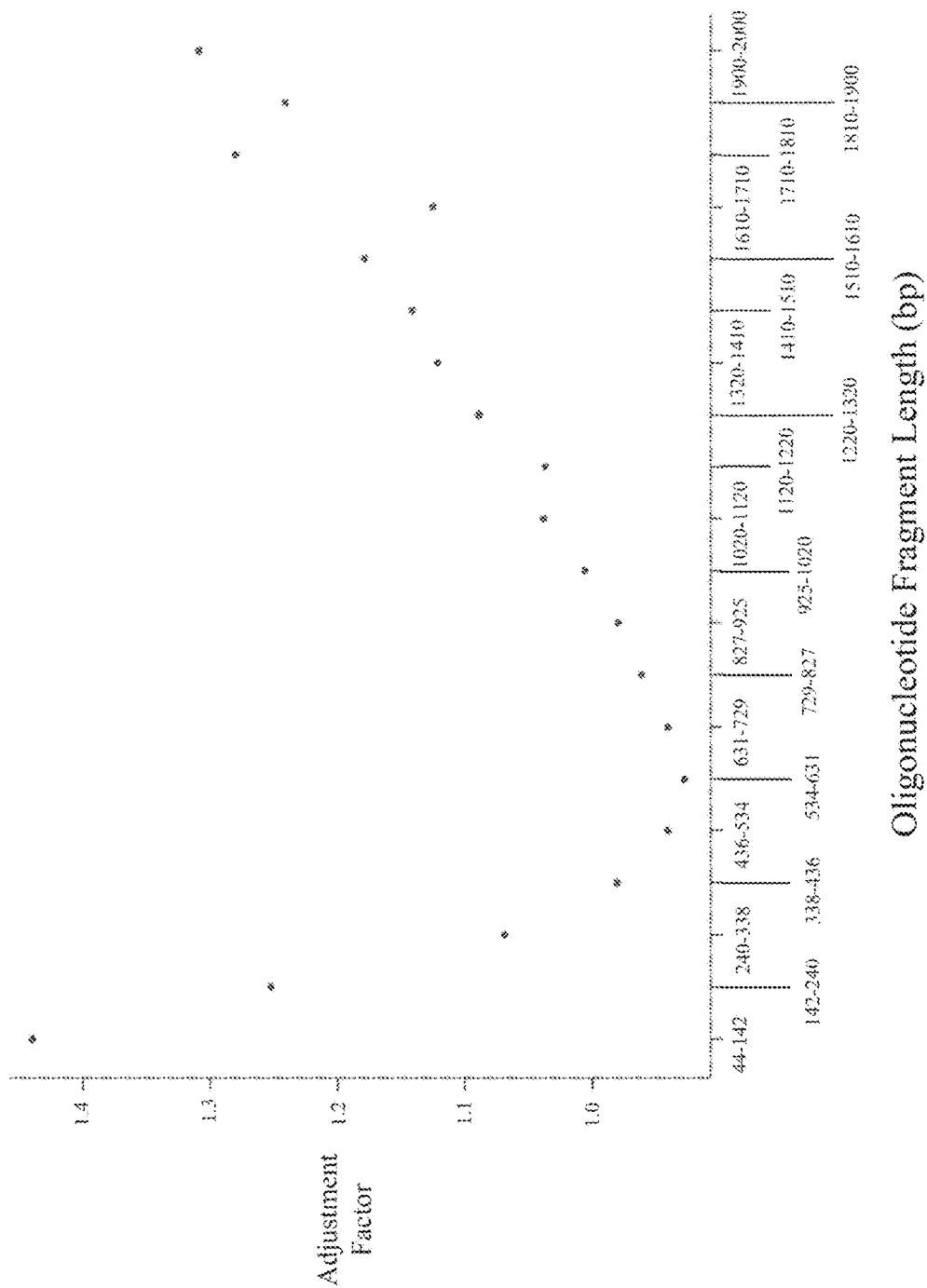
FIG. 5 is a plot showing the individual adjustment factors for each bin of signal intensity value. The x-axis plots fragment length in base pairs (bp) and the y axis plots the relative adjustment made to each bin in relative units.
Figure 6:
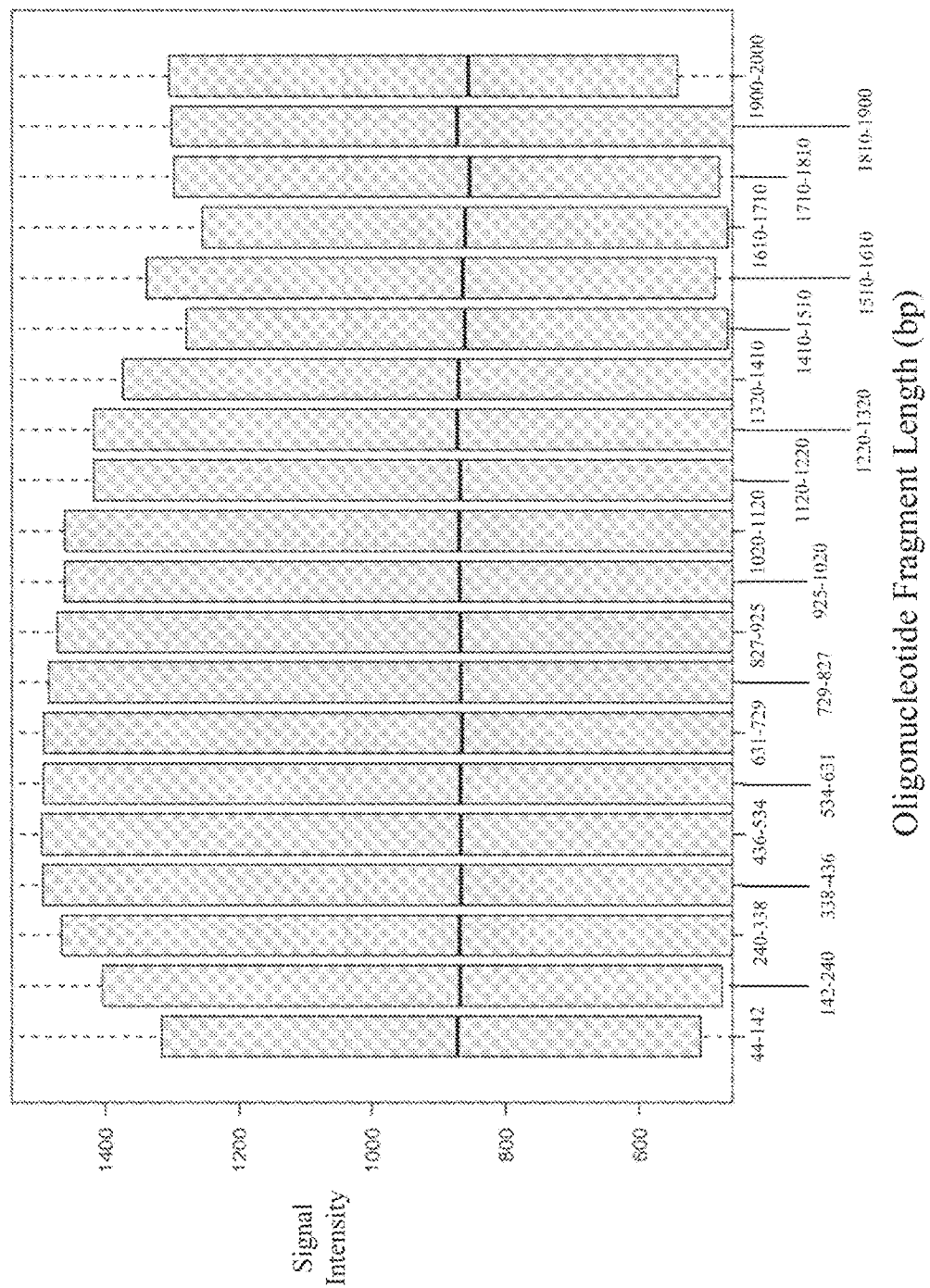
FIG. 6 visually depicts the post-adjustment result of signal intensities scaled using the computed scale factor of FIG. 5 on the signal intensities of FIG. 2. The x-axis plots fragment length in base pairs (bp) and the y axis plots signal intensity in relative intensity units.
Figure 7:
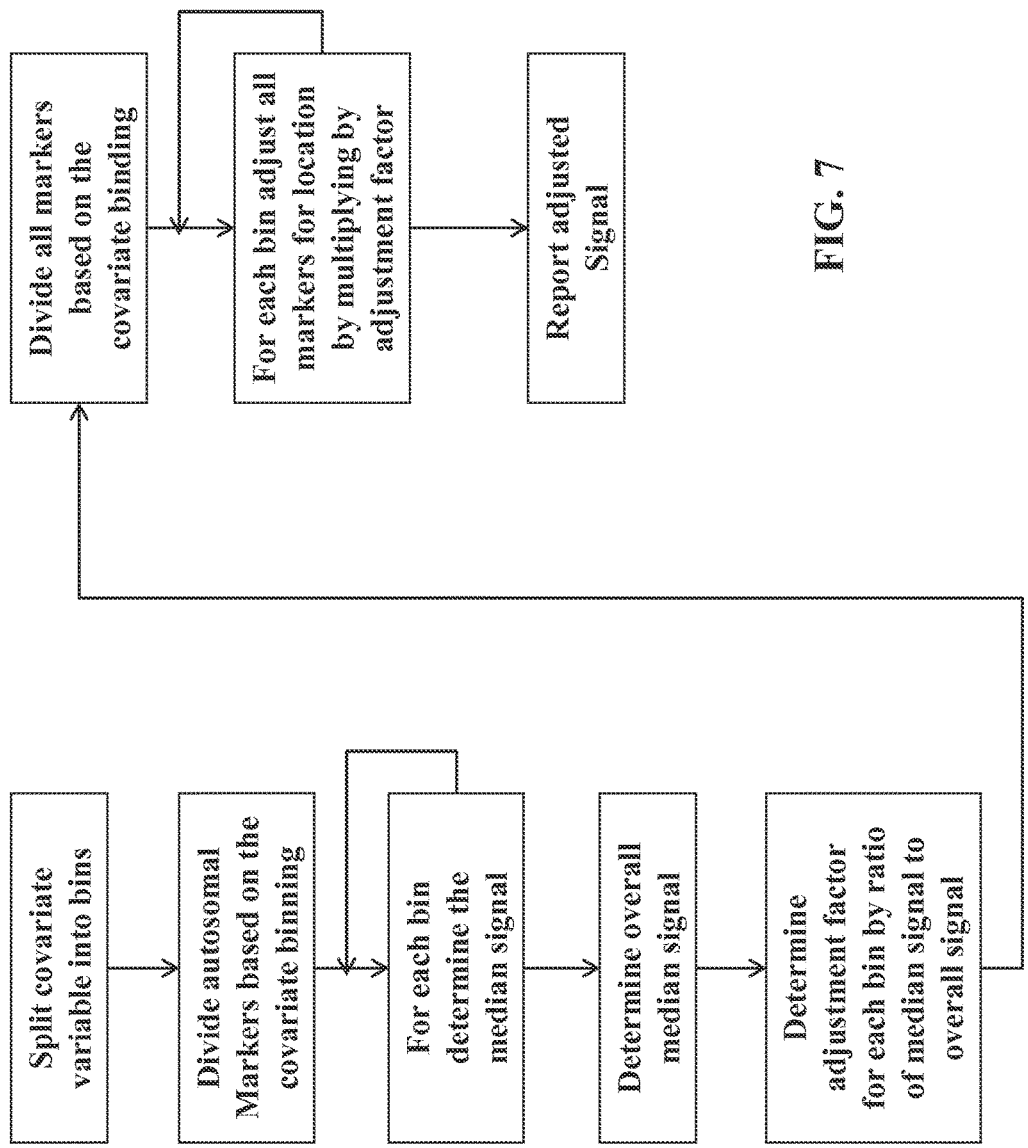
FIG. 7 is a flow chart depicting an exemplary procedure for applying the covariates and algorithms of the present methods and systems.

Specifically, the scaling factor for each covariate bin median is given by the ratio of the overall median to the median for that bin. So for bin the scaling factor is $M/M_i$ where M is the overall median and $M_i$ is the median for that bin, for instance as visually depicted in FIG. 5. For each bin shown in FIG. 2, all signal intensities are then scaled using the same computed scale factor (covariate adjustment) to arrive at the result visually depicted in FIG. 6. The flow diagram of FIG. 7 provides an example of how the algorithmic analysis may proceed.

It is noted that chromosome X and Y probe signals are not used to determine the scaling factors in human samples, though they may be rescaled based on which covariate bin they fall in. Additionally, it is noted that in a typical use case, different marker classes should be adjusted separately (here CN and SNP are the primary classes expected). Thus, one would bin SNP marker probes in a separate covariate adjustment analysis and a CN probe in another, separate, covariate adjustment analysis since each of these probe types experience different independent variables which impact the performance of these probes. Further, multiple covariate values may be adjusted, one by one, in sequence or in parallel, in whatever order is most appropriate for the specific use intended. Software may be designed such that the user may indicate which covariate adjusters to apply and in what order and quantity, depending on the type of experiment being performed, the type of equipment or system or system components being used, type of microarray used and the like.

Figure 8:
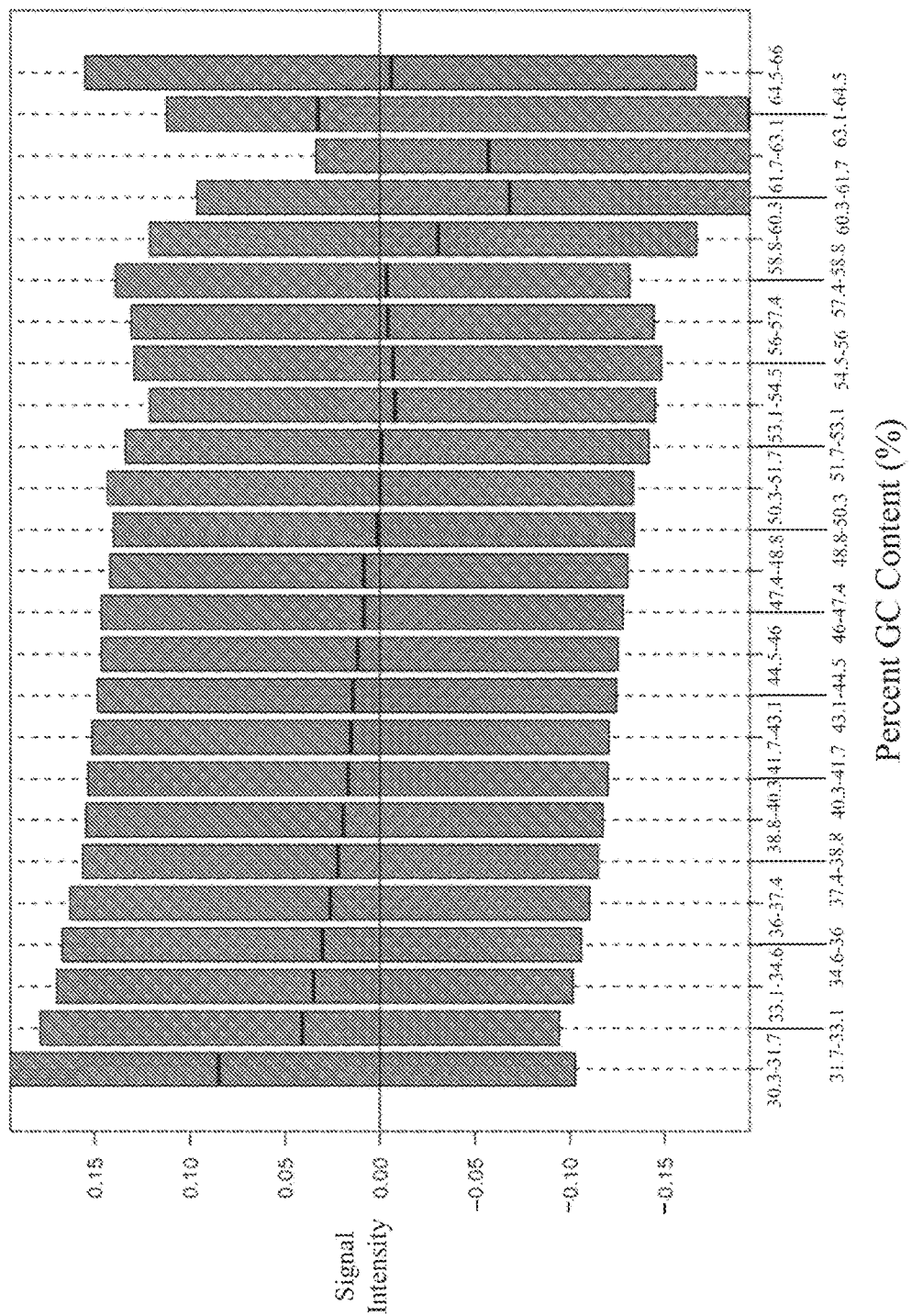
FIG. 8 depicts a pre-adjustment (before application of covariate) plot of $\log_2$ ratio for binned signal intensities, binned by percent GC content. The x-axis plots GC content in percentages (% per oligonucleotide fragment) and the y axis plots signal intensity in relative intensity units. The line across the middle represents the target overall median intensity.

The methodology proposed for adjusting $\log_2$ ratios, or for any of the covariate adjusters mentioned in this application, may also basically follow the generic analysis scheme discussed above and depicted in FIGS. 2-7. More specifically, $\log_2$ ratios may be binned by their covariate values, such as is shown in the boxplots of FIG. 8. FIG. 8 depicts a pre-adjustment (before application of covariate) plot of $\log_2$ ratio for binned signal intensities, binned by percent GC content. The x-axis plots GC content in percentages (% per oligonucleotide fragment) and the y axis plots signal intensity in relative intensity units. The line across the middle represents the target overall median intensity.

Figure 9:
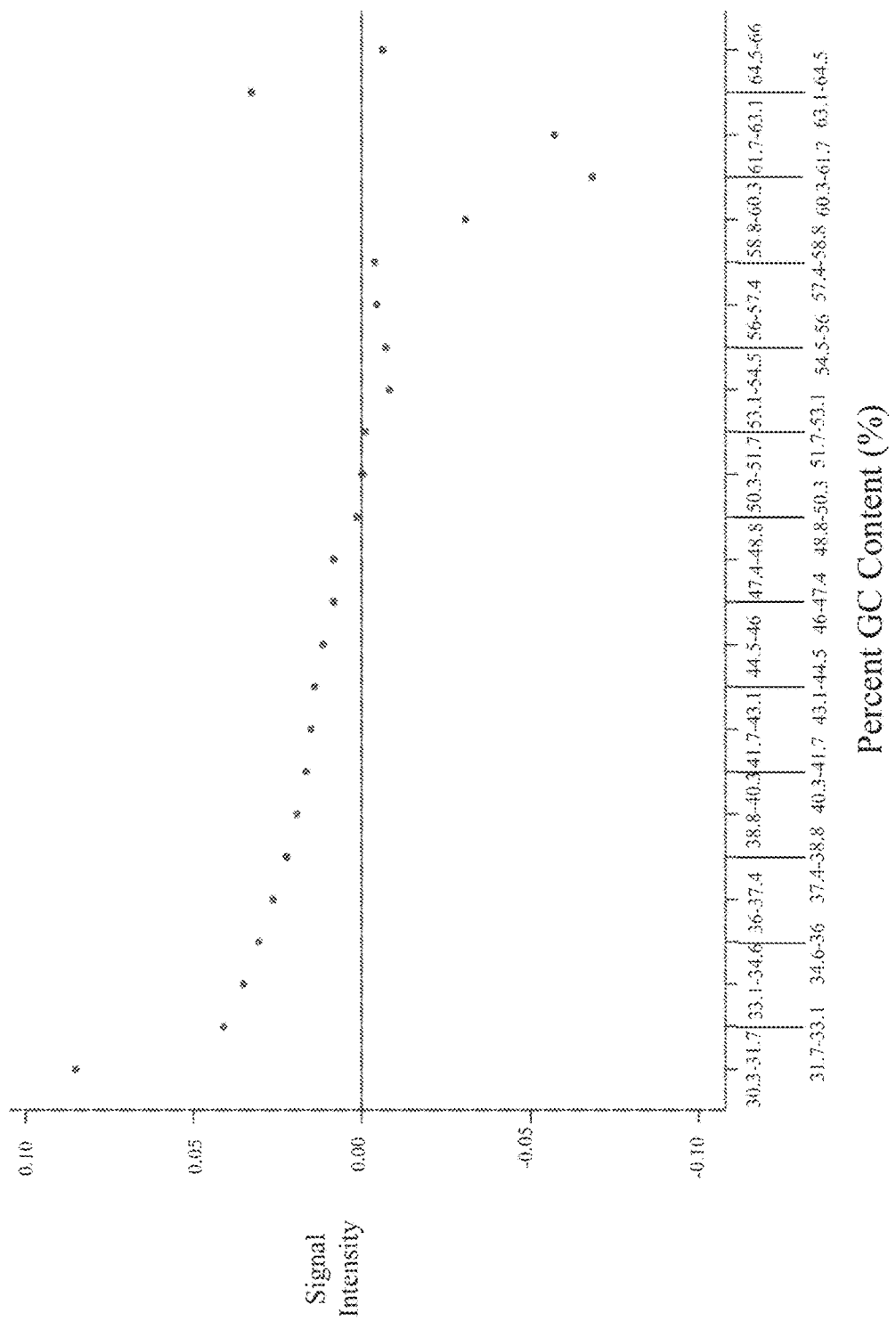
FIG. 9 shows the bins summarized based on their corresponding median log 2 ratios. The x-axis plots GC content in percentages (% per oligonucleotide fragment) and the y axis plots signal intensity in relative intensity units. The line across the middle represents the target overall median intensity.
Figure 10:
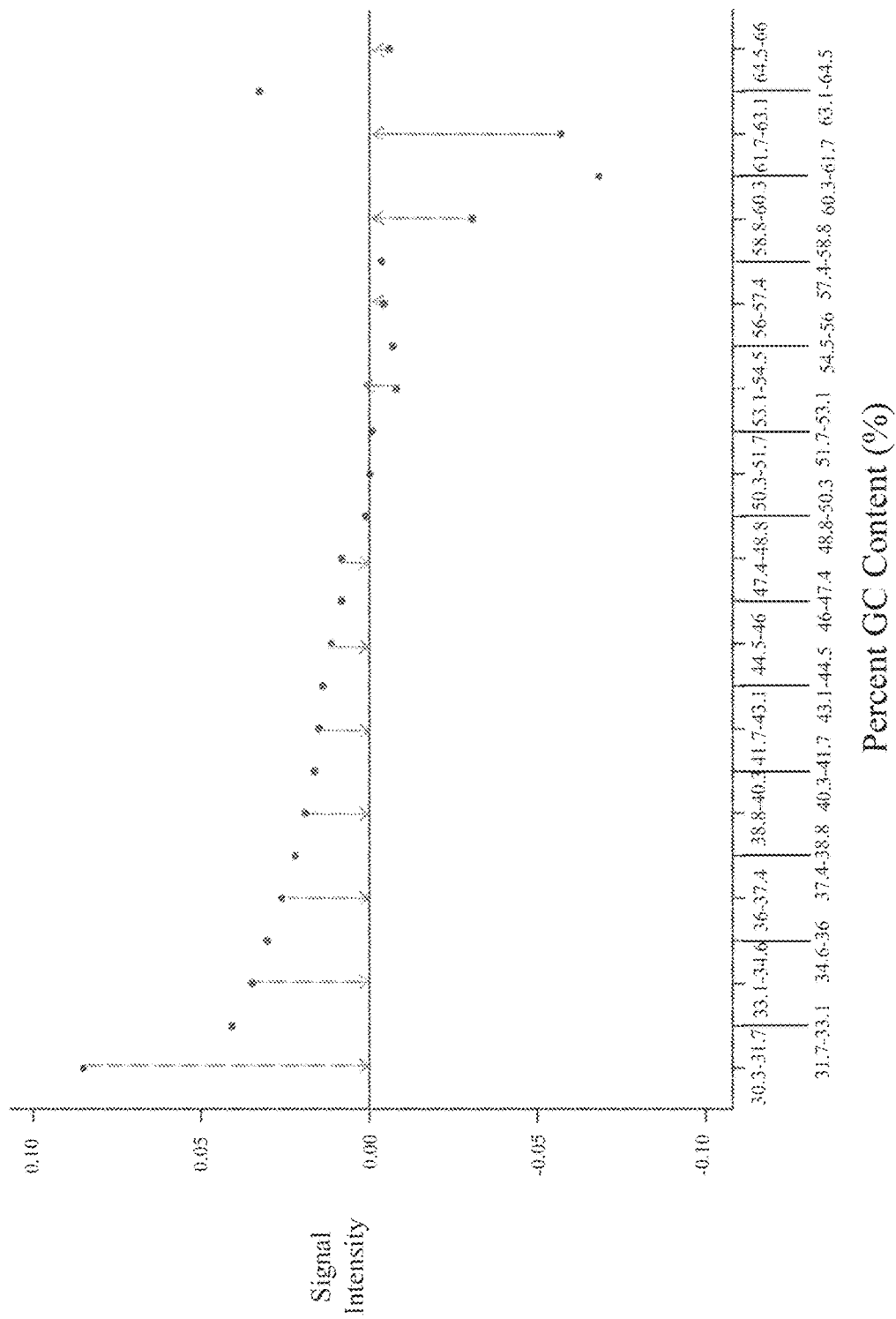
FIG. 10 shows how the differences for each bin are eliminated by shifting each median to the value of zero. The x-axis plots GC content in percentages (% per oligonucleotide fragment) and the y axis plots signal intensity in relative intensity units. The line across the middle represents the target overall median intensity.
Figure 11:
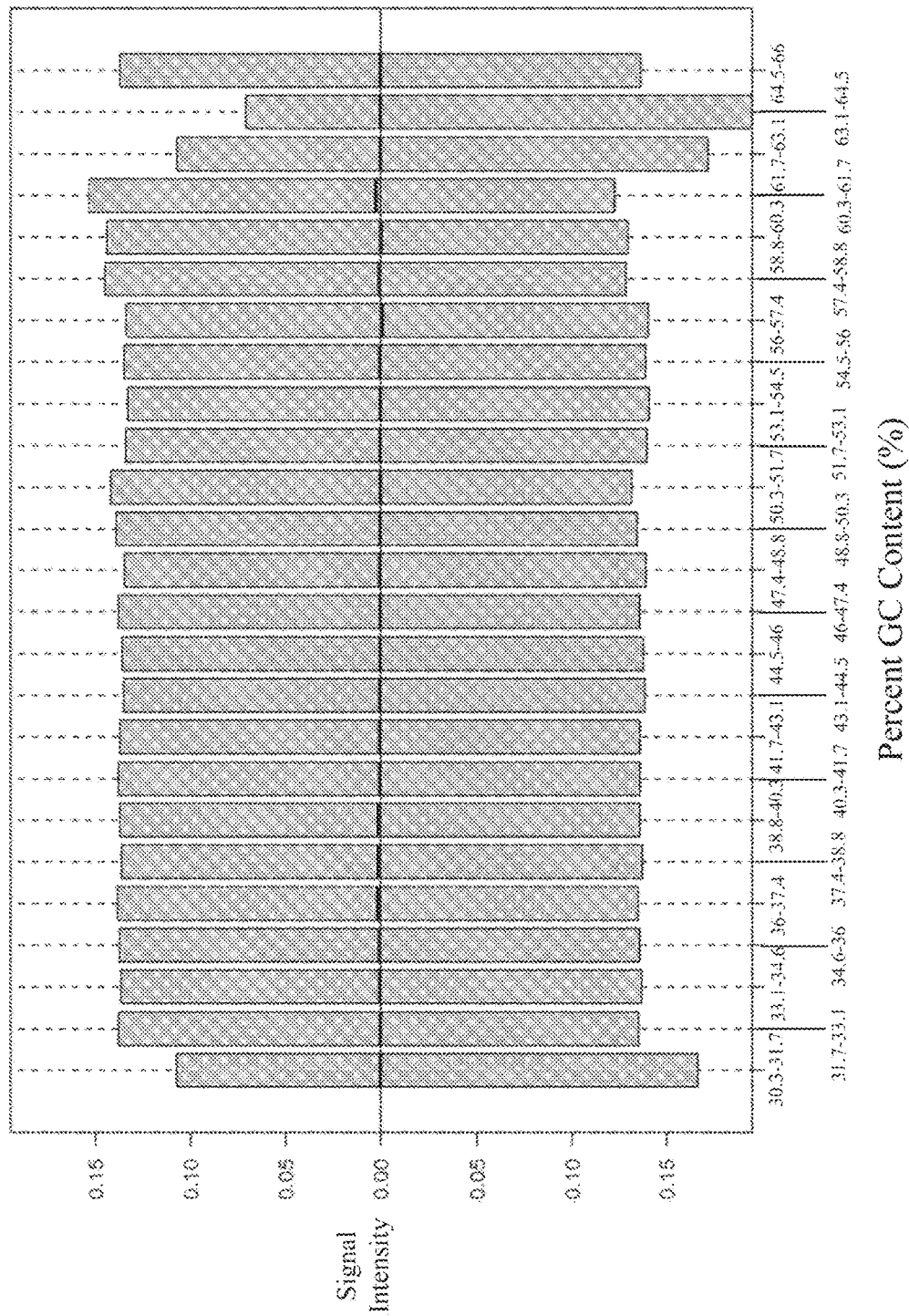
FIG. 11 provides the finalized boxplot of log 2 ratio values adjusted by subtraction of the median value that corresponds to each covariate bin for each bin. The x-axis plots GC content in percentages (% per oligonucleotide fragment) and the y axis plots signal intensity in relative intensity units. The line across the middle represents the target overall median intensity.

Each bin may be summarized based on the median $\log_2$ ratio, as shown in FIG. 9. To eliminate differences the goal of the present methods is to shift every median towards 0, i.e. no change, as depicted in FIG. 10. To eliminate differences the goal is to shift every median towards 0, i.e. no change, which is accomplished by subtracting the median value for each. Each log 2 ratio is adjusted by subtracting the median value that corresponds to the covariate bin within which it falls. The final result is depicted in FIG. 11.

Figure 12:
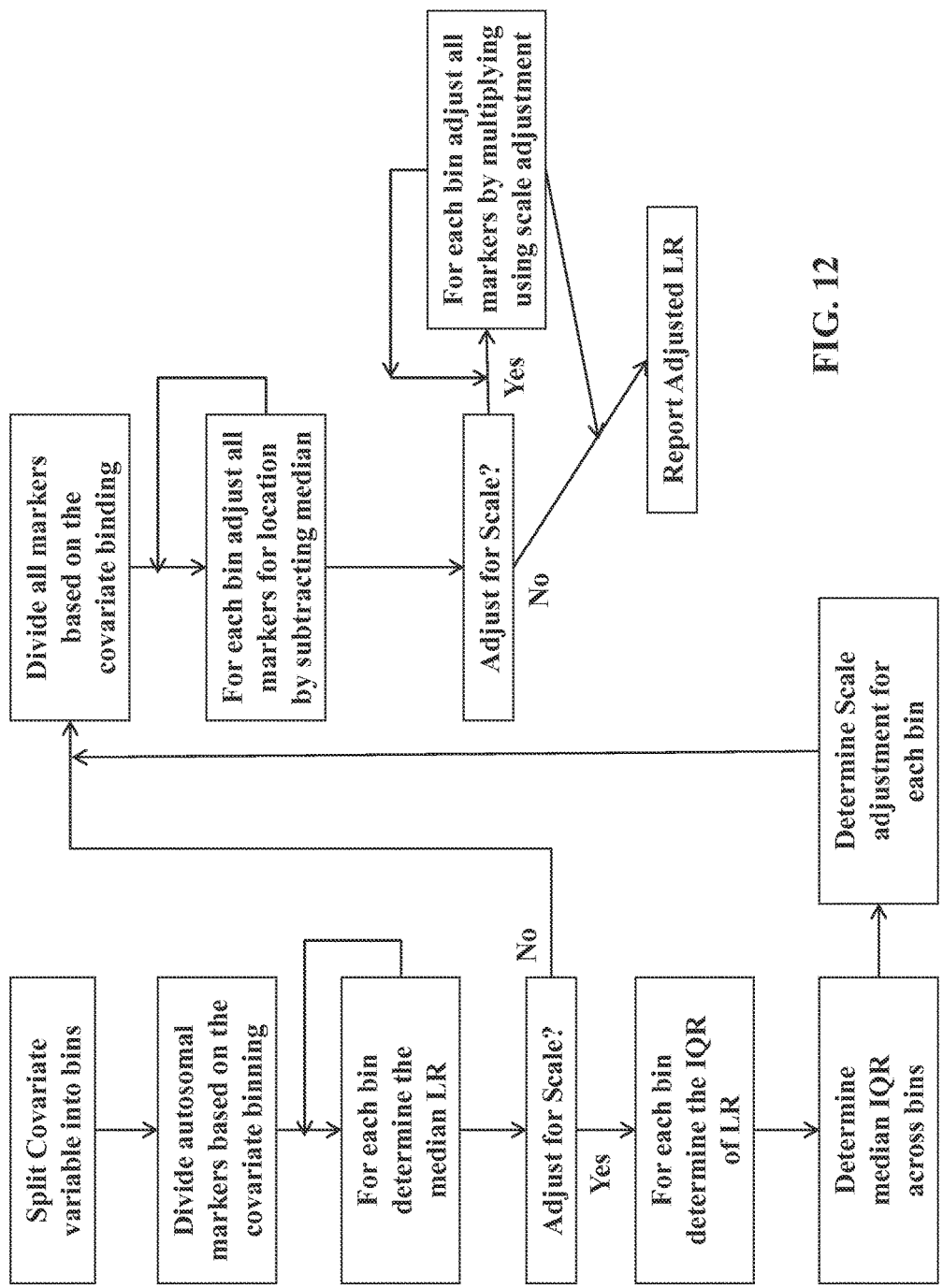
FIG. 12 is an exemplary log 2 ratio adjustment flow chart.

The flow chart of FIG. 12 provides an exemplary outline of the steps of the algorithm-based analysis as they may be employed in the presently disclosed methods and systems. It should be noted that chromosome X and Y may be excluded when determining the adjustment medians for each bin, though they are adjusted. Additionally, for some covariates it may make sense to adjust both location (via the median) and scale. This second adjustment is done on the interquartile range (IQR) by multiplying by a relevant scale factor. The IQR is the difference between the $75^{th}$ percentile and $25^{th}$ percentile. Additionally, as mentioned above, different marker classes could be adjusted separately (here CN and SNP are the primary classes expected). Further, multiple covariate values can be adjusted, one by one, in sequence, or in parallel, whichever appears most appropriate or relevant for the specific application.

Binning Covariates

The disclosed algorithms is that covariates are to be treated as discrete variables. Covariates that are continuous are turned into discrete variables by means of binning. There are multiple ways in which this can be accomplished. For example, one may employ equal spacing, which means that the spaces between the cut points are set as equal in measurements of the covariate. (See, FIG. 13). Depending on the distribution of the covariate across the available marker set, this can lead to wildly different numbers of probes in each bin. This also means that low frequency bins could yield radical results because they are based on just a small number of data points, i.e. markers. Another example is to use bins where each bin is defined such that each has the same number of probes or data points therein. This will result in bins which are uneven in the spacing. FIG. 13 illustrates these two exemplary alternatives for binning of a covariate.

Figure 14:
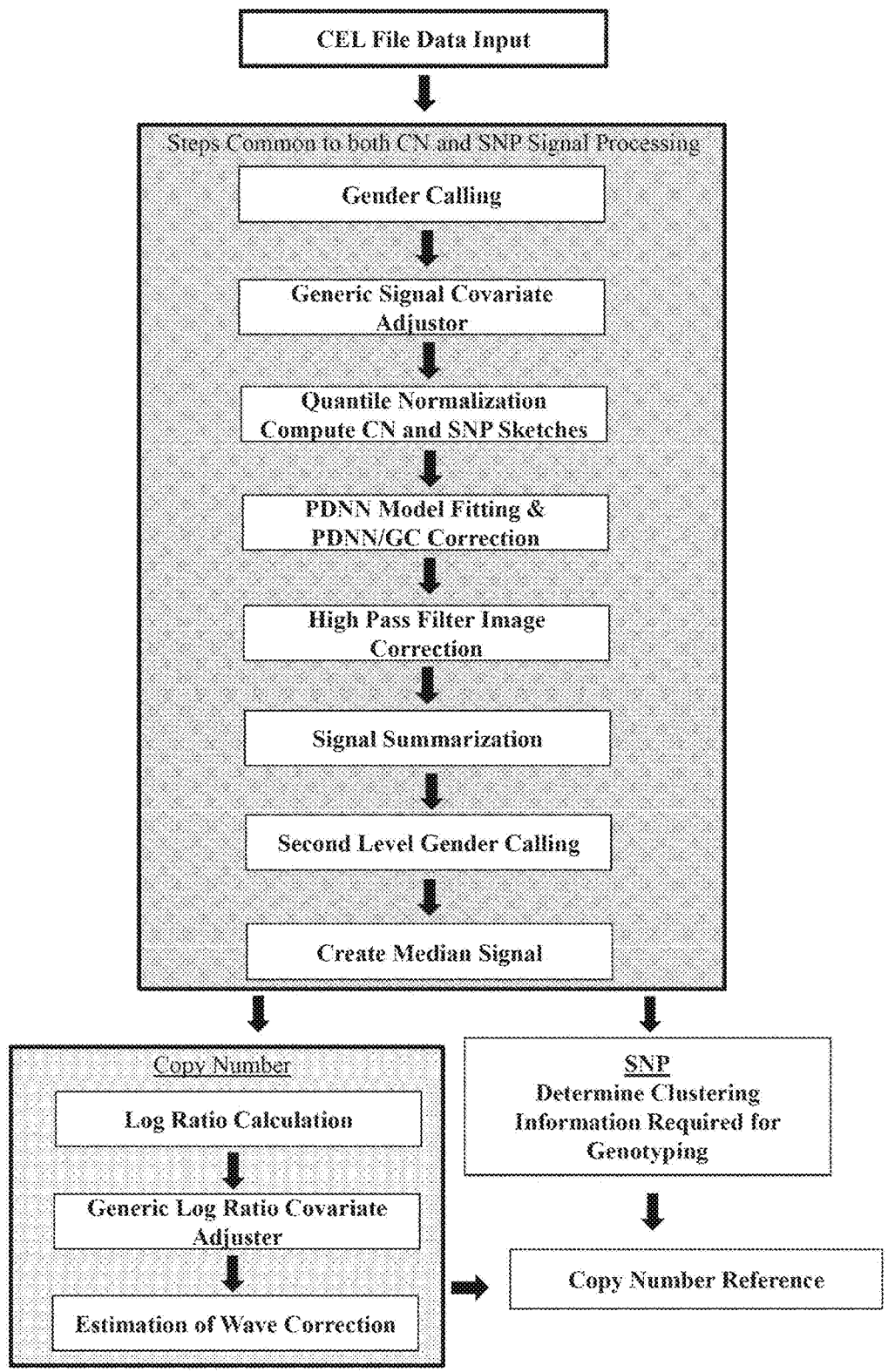
FIG. 14 is an exemplary flow chart which could be used for building reference copy number values in single sample assay (SSA) mode. The flowchart shows where algorithms of the present methods and systems may be employed in the determination of a reference copy number in a standard microarray experiment. The input is standard CEL file data and the output is the final determination of copy number reference values.
Figure 15:
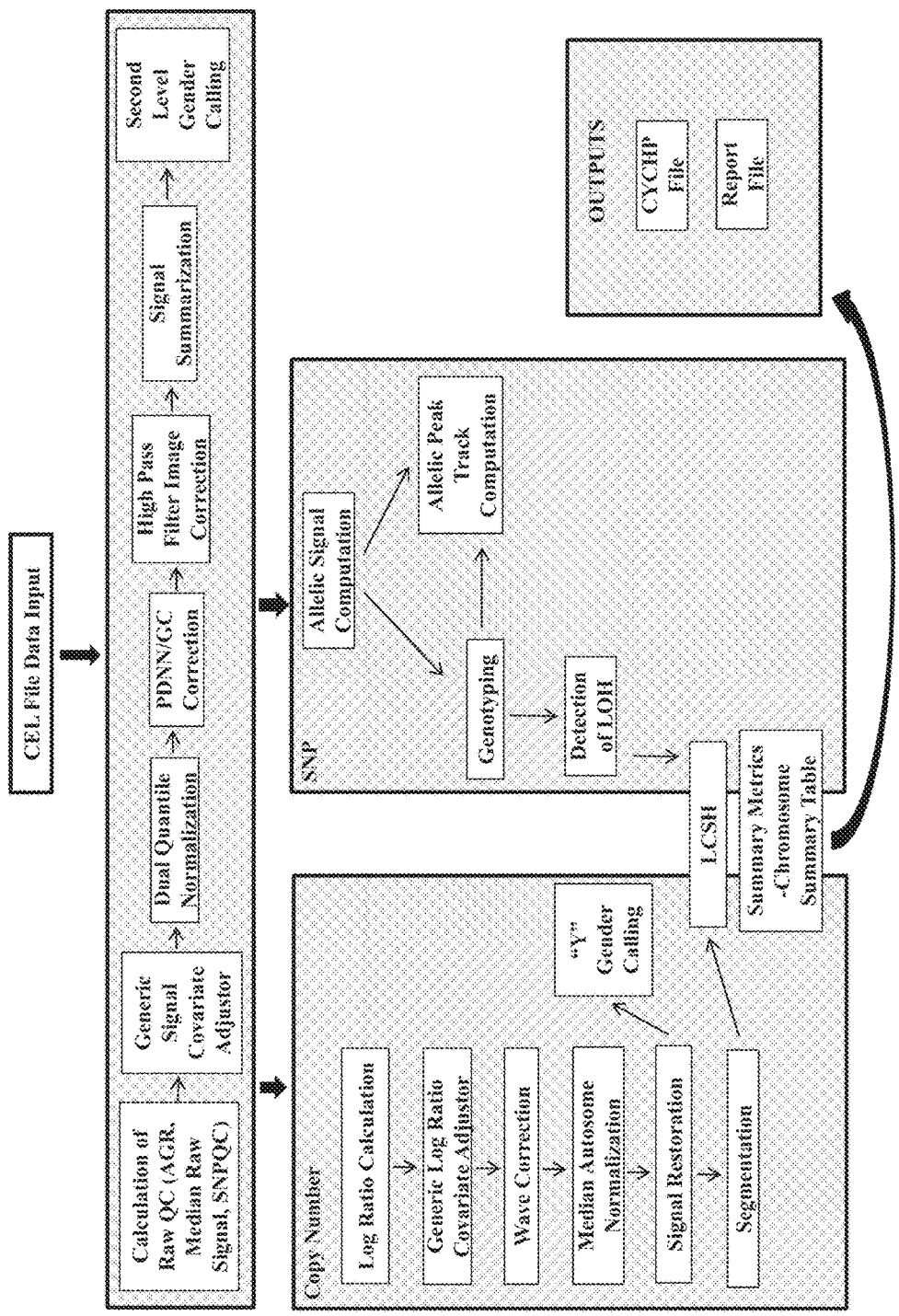
FIG. 15 is an exemplary single sample analysis flow chart showing where algorithms of the present methods and systems may be employed in the sample processing of a microarray experiment. Copy number specific manipulations are provided in the lefthand box while SNP specific data processing steps are provided in the middle box. Outputs in the righthand box include a CYCHP file and a report file, commonly employed in contemporary software applications used to sort, analyze and visualize such microarray experimental data.

These two exemplary algorithms may be placed in the processing pipeline for both reference building and single sample analysis. The ideal place to have the signal adjustment stage is before the dual quantile normalization. The preferred embodiment provides for the $\log_2$ ratio adjustment to occur after computation of the $\log_2$ ratios and before any subsequent adjustments. In reference mode, the goal is that waves are determined around residual unexplained variability. Similarly, the wave correction ("estimation of wave correction") in single sample analysis (SSA) mode is applied after all covariate based signal and $\log_2$ ratio adjustment has occurred (see FIGS. 14 and 15).

These methods will be able to handle any ordering of covariates, and the order in which they are to be used can be specified by the user. Further, the usage of the same covariate for both signal and $\log_2$ ratio correction stages is possible and methods employing the same covariate multiple times with different settings at the same adjustment step are also possible. The sequential nature of application of the various covariate adjusters disclosed herein assumes that there is no interaction effect among potential covariates. However, if such an interaction does exist, the appropriate way to deal with it in this framework is to create a new discrete covariate to adjust both covariates simultaneously. Markers for which information is missing for a given covariate could be tagged to undergo no correction. Covariate information is typically, but not necessarily, stored in the annotation file associated with the particular data set being analyzed.

An exemplary implementation of a $\log_2$ ratio algorithm generic adjuster is as follows below. Though the code below is drafted in a specific computer language, the same steps may be implemented in other computer languages known in the art:

```
LR - log ratio
covariate - covariate
markerclass - categorical variable.
continuous - TRUE/FALSE
nbins - Bin variable into no more than this number of bins (has no effect if variable is not continuous)
Adjuster <- function(LR, chromosome, covariate, markerclass, continuous=TRUE, nbins=25, even.quantile=FALSE,standarize.spread=FALSE){
    bin.function <- function(covariate, continuous=TRUE, nbins=25, even.quantile=FALSE){
        if (!continuous){
            ## do not do any re-binning
            if (is.factor(covariate)){
                return(covariate)
            } else {
                return(as.factor(covariate))
            }
        } else {
            if (!even.quantile){
                tentative.cutting <- cut(covariate,nbins)
            } else {
                tentative.cutting <- cut(covariate,quantile(covariate,seq(0,1,length=nbins+1)),include.lowest=TRUE)
            }
            return(tentative.cutting)
        }
    }
    for (cur.type in unique(markerclass)){
        # determine the adjustment using autosomal markers only
        cur.LR <- LR[markerclass==cur.type]
        cur.covariate <- covariate[markerclass==cur.type]
        cur.chromosome <- chromosome[markerclass==cur.type]
        cur.bins <- bin.function(cur.covariate, continuous, nbins, even.quantile)
        adj <- lapply(split(cur.LR[is.element(cur.chromosome,1:22)],cur.bins[is.element(cur.chromosome,1:22)]),median)
        if (standarize.spread){
            adj.IQR <- lapply(split(cur.LR[is.element(cur.chromosome,1:22)],cur.bins[is.element(cur.chromosome,1:22)]),IQR)
            med.IQR <- median(do.call("c",adj.IQR))
            for (i in 1:length(adj.IQR)){
                adj.IQR[[i]] <- med.IQR/adj.IQR[[i]]
            }
        }
        # apply it to all markers irrespective of chromosome
        for (bin in levels(cur.bins)){
            cur.adj <- adj[[bin]]
            if (!standarize.spread){
                cur.LR[cur.bins == bin] <- cur.LR[cur.bins == bin] - cur.adj
            } else {
                cur.LR[cur.bins == bin] <- (cur.LR[cur.bins == bin] - cur.adj)*adj.IQR[[bin]]
            }
        }
    }
```

```
    # now reassign the corrected value back
    LR[markerclass==cur.type] <- cur.LR
  }
  LR
}
              An exemplary implementation of a signal adjuster algorithm is as follows:
Signal - Probe signal
covariate - covariate
markerclass - categorical variable.
continuous - TRUE/FALSE classification of covariate variable
nbins - Bin variable into no more than this number of bins (has no effect if variable is not
continuous)
even.quantile - should binning be done by splitting covariate
Adjuster <- function(Signal, chromosome, covariate, markerclass, continuous=TRUE, nbins=25,
even.quantile=FALSE){
    bin.function <- function(covariate, continuous=TRUE, nbins=25, even.quantile=FALSE){
        if (!continuous){
            ## do not do any re-binning
            return(as.factor(covariate))
        } else {
            if (!even.quantile){
                tentative.cutting <- cut(covariate,nbins)
            } else {
                tentative.cutting <-
cut(covariate,quantile(covariate,seq(0,1,length=nbins+1)),include.lowest=TRUE)
            }
            return(tentative.cutting)
        }
    }
    for (cur.type in unique(markerclass)){
        cur.signal <- Signal[markerclass==cur.type]
        cur.covariate <- covariate[markerclass==cur.type]
        cur.chromosome <- chromosome[markerclass==cur.type]
        cur.bins <- bin.function(cur.covariate, continuous, nbins, even.quantile)
        ## Base adjustment on autosomal markers
        ## We preserve the current median intensity in this transformation
        cur.target <- median(cur.signal[is.element(cur.chromosome,1:22)])
        adj.median <- lapply(split(cur.signal[is.element(cur.chromosome,1:22)],
cur.bins[is.element(cur.chromosome,1:22)]),median)
        ## apply it to all markers irrespective of chromosome
        for (bin in levels(cur.bins)){
            cur.adj <- cur.target/adj.median[[bin]]
            cur.signal[cur.bins == bin] <- cur.signal[cur.bins == bin]*cur.adj
        }
        ## now reassign the corrected value back
        Signal[markerclass==cur.type] <- cur.signal
    }
    Signal
}
```

There are multiple types of generic covariate adjusters that may be employed in the present methods and systems. Furthermore, these generic covariates (GC) can be employed in different ways, i.e. at different points during data analysis in a microarray experiment. Three basic exemplary generic covariate adjusters include, but are not limited to, fragment GC, local GC and probe GC. All of these covariate adjusters adjust for the percent of the sequence that is either of the two nucleotides G and C. As discussed above, an above-average amount of G and C nucleotides can impact how that sequence behaves in a standard hybridization-based microarray assay. Fragment GC is employed to correct for variables associated with sample preparation, i.e. fragmentation of the original genetic sample by use of various restriction enzymes, which may have a bias in the manner in which they cleave large genetic samples. Local GC adjusters address the variability observed in the genetic content, or sequence, of the sample, i.e. the amount or percent of G and C nucleotides found within a specified window of base pairs within the fragment, centered about a genetic marker (SNP or other characteristic sequence) being measured. The window of base pairs being considered for covariant correction may be any window size chosen by the user. A standard window size for CN and/or SNP analysis would be, for instance, 500 base pairs. However, the window may be as small as 50, 100, 150, 200, 250, 300, 350, 400 or 450 base pairs, or even as large as 550, 600, 650, 700, 750, 800, 850, 900, 950 or even 1000 base pairs (1 kb). In some cases the window chosen for the local GC covariate adjuster may be even larger, for instance 1.5 kb, 2 kb, 2.5 kb, 3 kb, 3.5 b, 4 kb, 4.5 kb or even 5 kb. The local GC covariate length window may even be 50 kb, 100 kb, 150 kb, 200 kb, 300 kb, 400 kb, 500 kb, 600 kb, 700 kb, 800 kb, 900 kb, 1 mb, 2 mb, 3 mb or longer. The probe GC covariate adjuster adjusts for variables associated with the percent of G and C nucleotides contained in the sequence of the probe mounted to the microarray, to which the genetic sample hybridizes.

These three exemplary GCs interact with each other in ways that also introduce further bias. The three covariate adjusters and their covariates are interrelated in that adjustment of the data set for one covariate will sometimes require further adjustment of the other covariates. That is, if a user intends to apply multiple covariate adjusters on one set of data, the problem is that each individual covariate adjustment may require the data set to be again adjusted by the other covariate adjusters the user intends to employ. This iterative process could go on indefinitely until a final solution is found. To address this cyclical problem, one can combine all of the needed covariate adjusters into one "Super GC" covariate adjuster that simultaneously adjusts the data to eliminate all biases and independent variables in one step. This multi-parallel process will thus eliminate the need to keep doing iterative adjustments, making data analysis much more efficient and less resource intensive.

Figure 16:
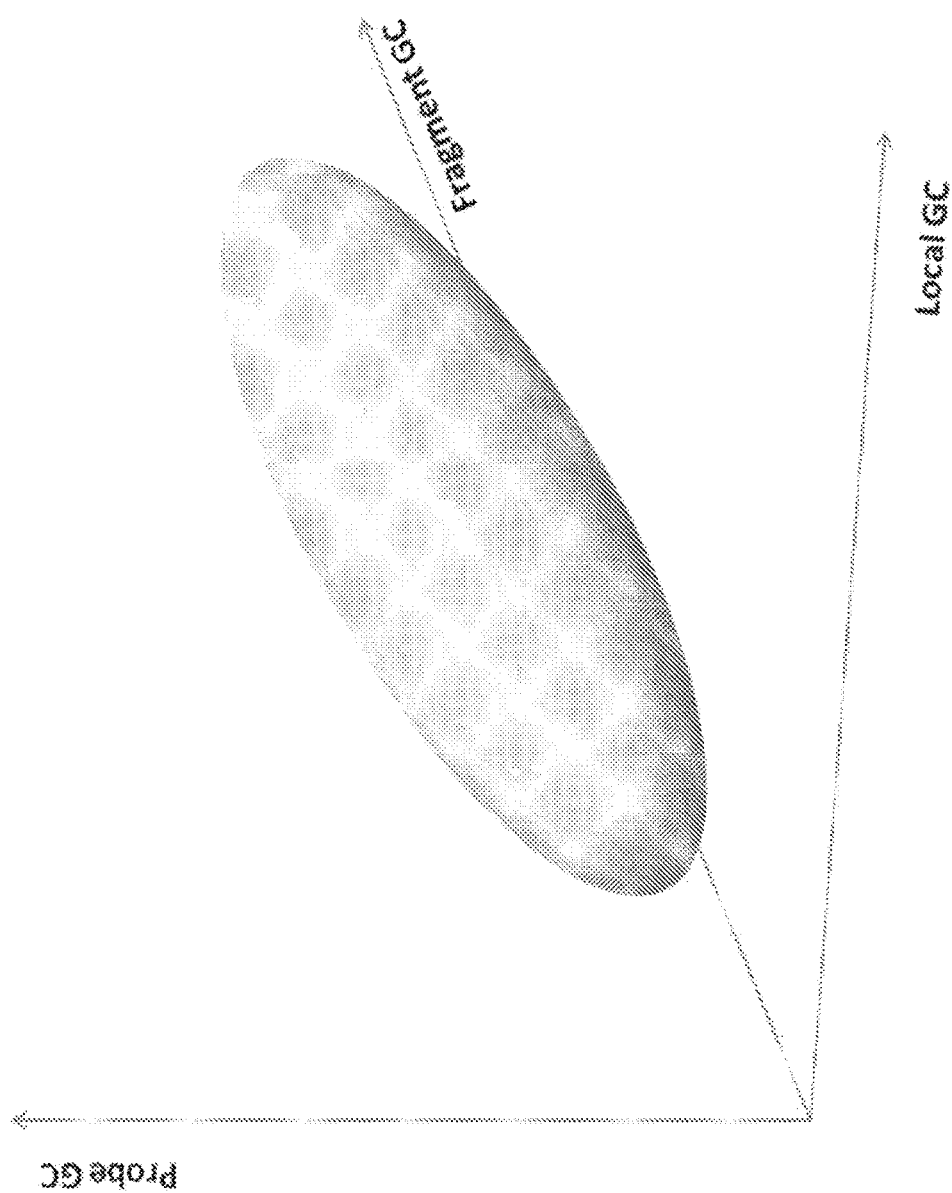
FIG. 16 represents discretization of three different generic covariates, with each marker being represented as a point in three-dimensional space.

The Super GC covariate is a discretization of multiple covariate space. For instance, the fragment GC-local GC-probe GC space may be combined as reflected in FIG. 16, where every marker has its own fragment GC, local GC and probe GC and can be represented as a point in the three-dimensional space.

The goal of the discretization is to collect markers of similar covariates together, and then adjust these markers altogether and simultaneously as a group. Of course there are many methods by which this partitioning of the space could be implemented, with each method having its own advantages and disadvantages. For instance, one method for implementing this partitioning of space is to place more emphasis on optimizing the partitioning in the local GC and fragment GC dimensions, though ultimately all three dimensions are partitioned. Additionally the partitioning may be performed in a linear manner (by using perpendicular planes), rather than using non-flat surfaces. SNP markers and CN markers may be partitioned separately.

Figure 17:
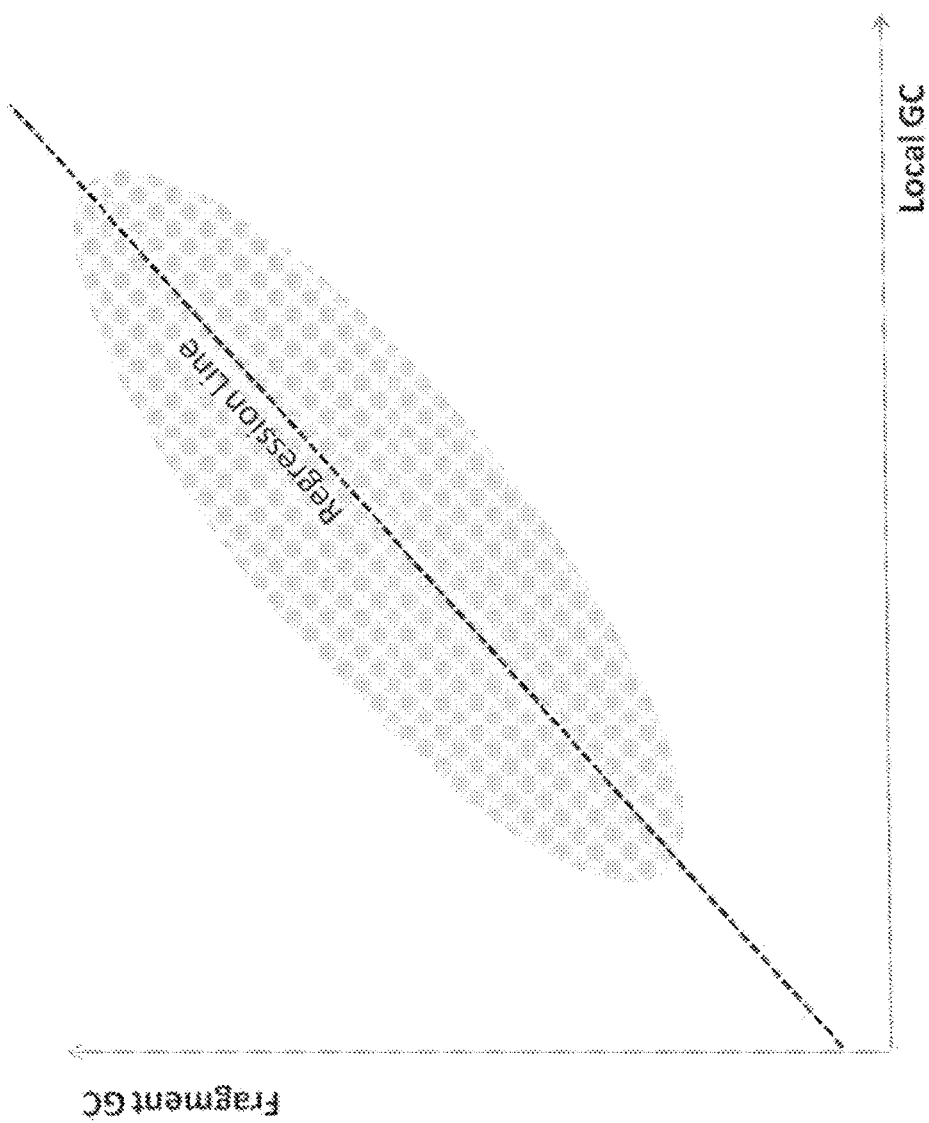
FIG. 17 provides the first step in a method embodiment in which just two generic covariate markers are depicted for analysis.
Figure 18:
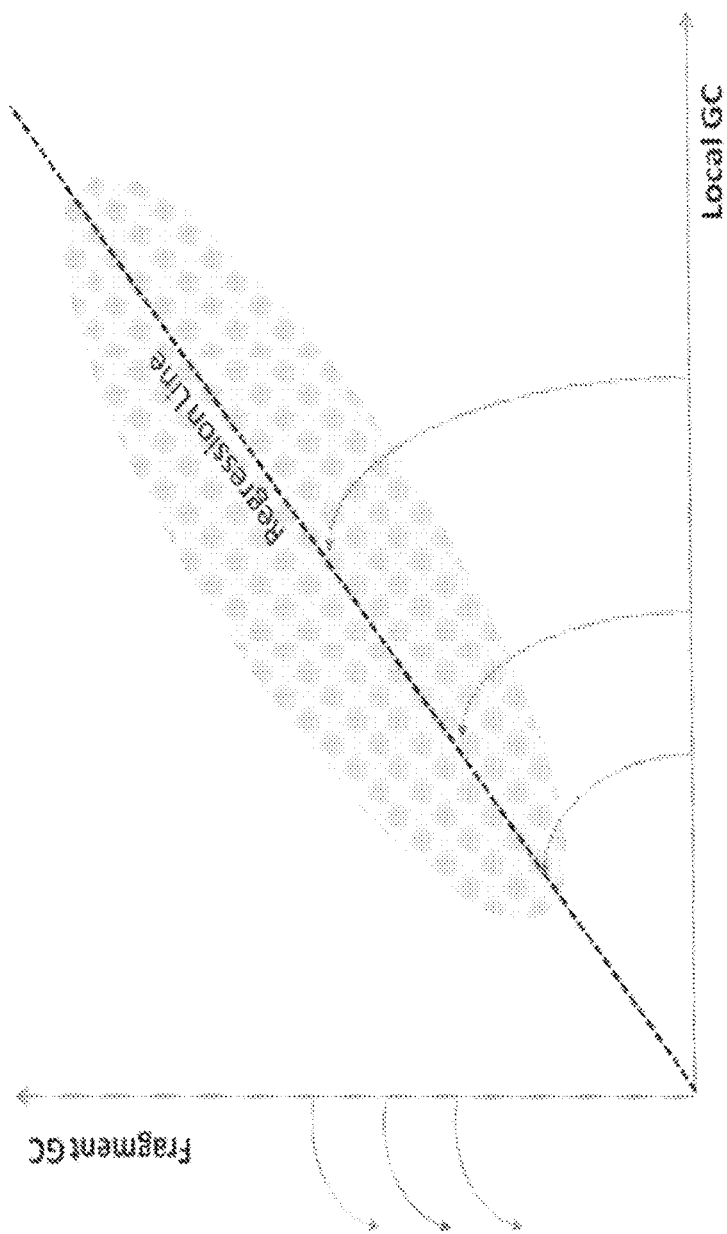
FIG. 18 provide subsequent steps to the two dimensional depiction of the markers for two generic covariates, in which the intercept of one covariate with another is estimated and subtracted from the other generic covariate and the axes then rotated such that the regression line becomes the new horizontal axis, yielding a new coordinate system.
Figure 19A:
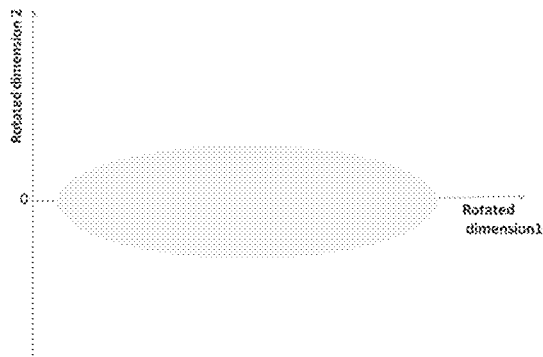
FIGS. 19A-D are visual depictions of the binning or partitioning of the transformed space of the covariate discretization process.
Figure 19B:
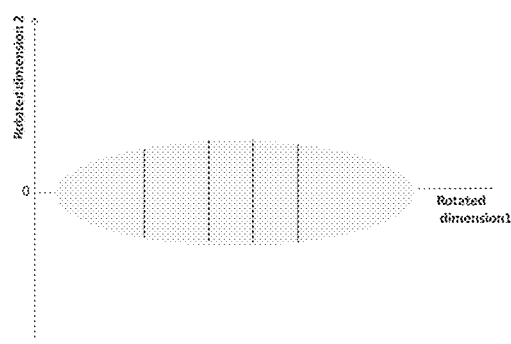
Figure 19C:
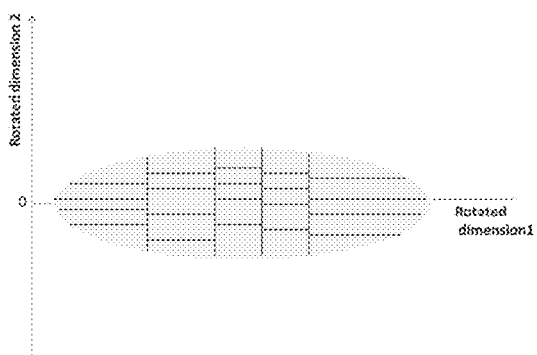
Figure 19D:
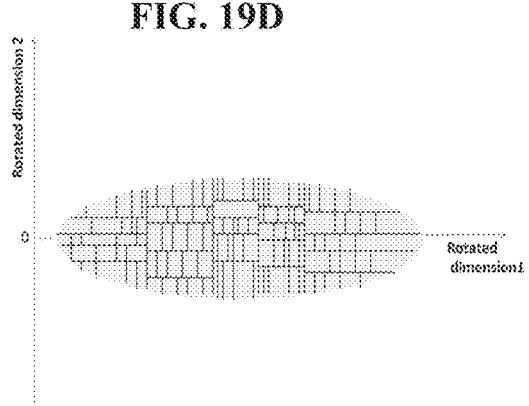

One exemplary procedure for achieving this partitioning is as follows. First, considering just the two dimensions of fragment GC and local GC, a regression line may be fit predicting fragment GC as a function of local GC, as depicted in FIG. 17. The fitted regression line may then be used to perform a transformation of the indicated space. In particular the intercept estimate may be subtracted from the fragment GC for each marker, and then the axes may be rotated such that the regression line becomes the new horizontal axes. The rotation may be performed in polar coordinate space, yielding a new coordinate system (see FIG. 18).

The second step generally would be to partition the space, as in FIG. 19. The space may be divided into equally populated bins by using linear separators (perpendicular to horizontal axis). For instance, the binning may be into five equal portions (each containing 20% of the data). Then, each of those bins is further divided, but this time in the second dimension. Again, each bin is designed to be equally populated, with five bins. A further round of partitioning is carried out in the first dimension. Finally, there may be one more partitioning in the second dimension (not shown). Ultimately this exemplary method of partitioning, or binning, yields 625 distinct groupings in the transformed space (and thus also in the fragment GC/local GC space).

Figure 20:
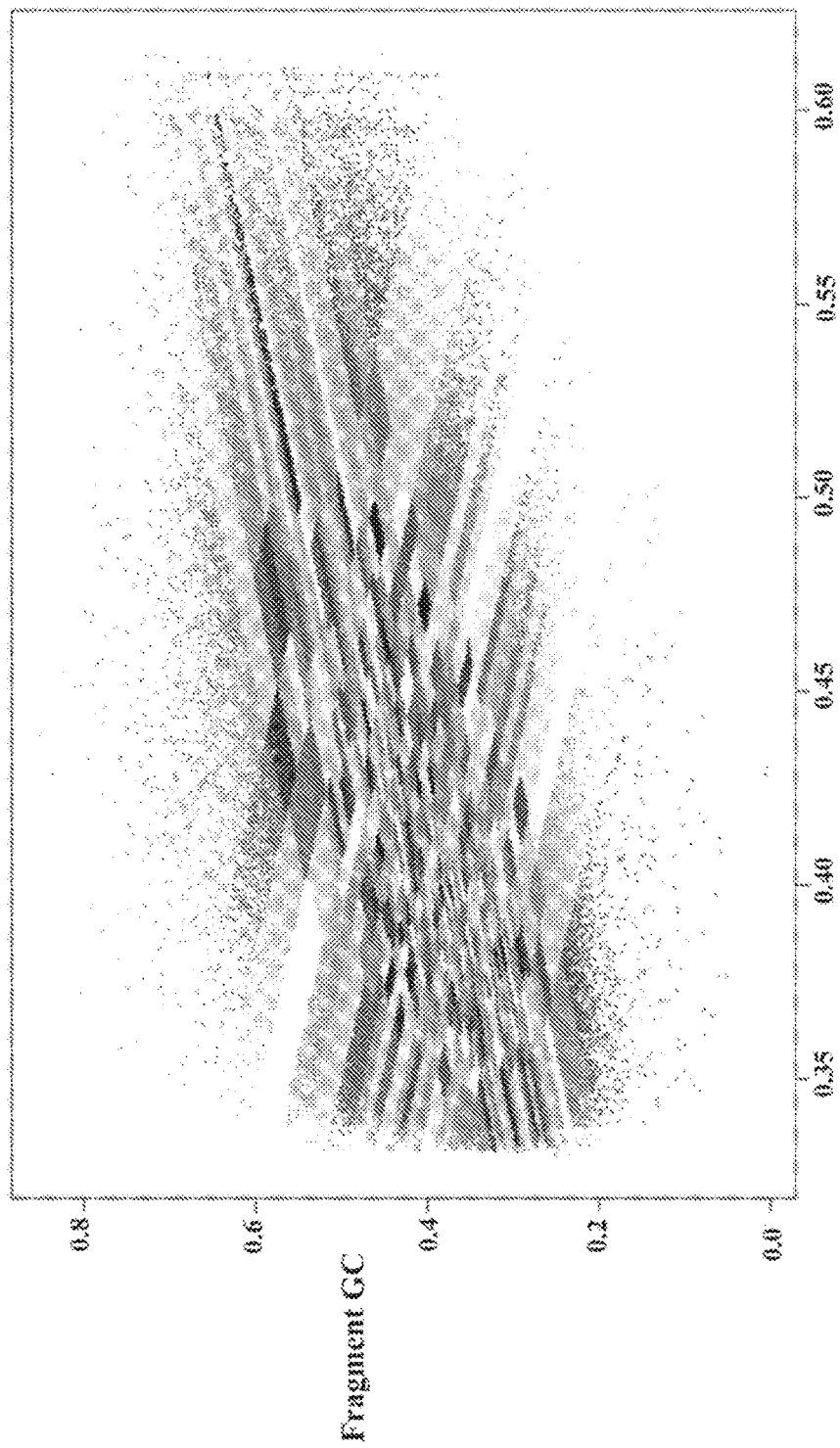
FIG. 20 depicts the 625 distinct bins in the exemplary fragment GC and local GC space.
Figure 21A:
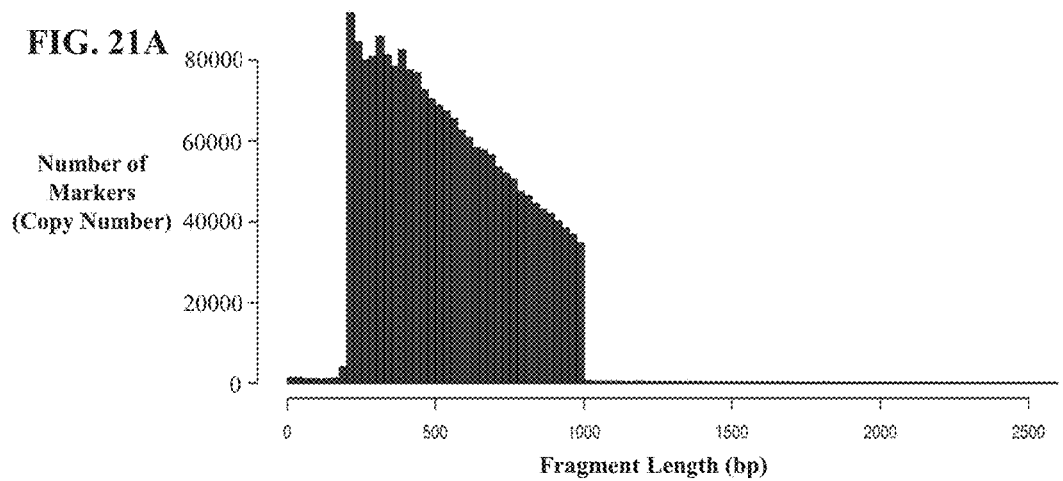
FIGS. 21A-D provide exemplary values of a fragment length covariate, broken down by CN or SNP marker and also by chromosome.
Figure 21B:
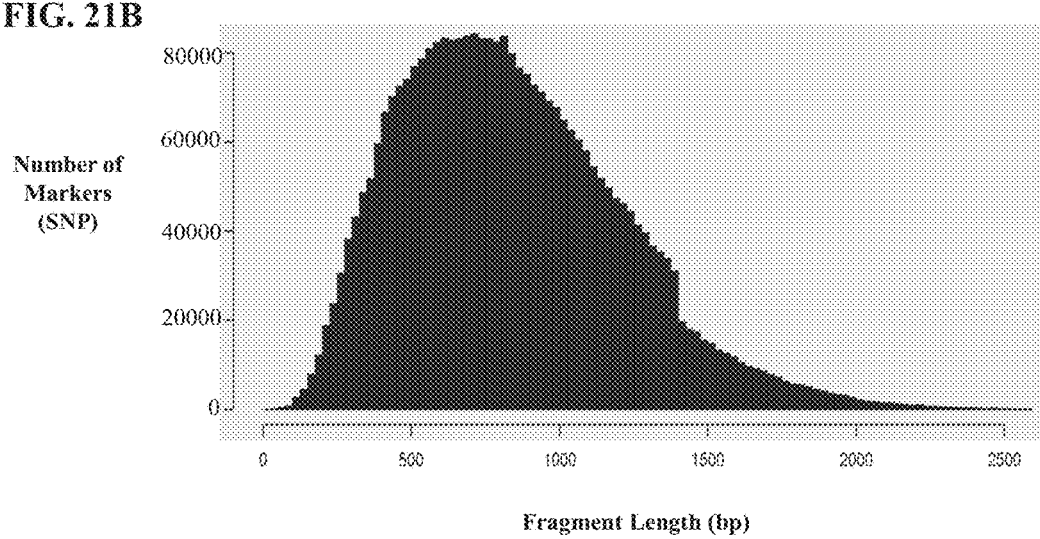
Figure 21C:
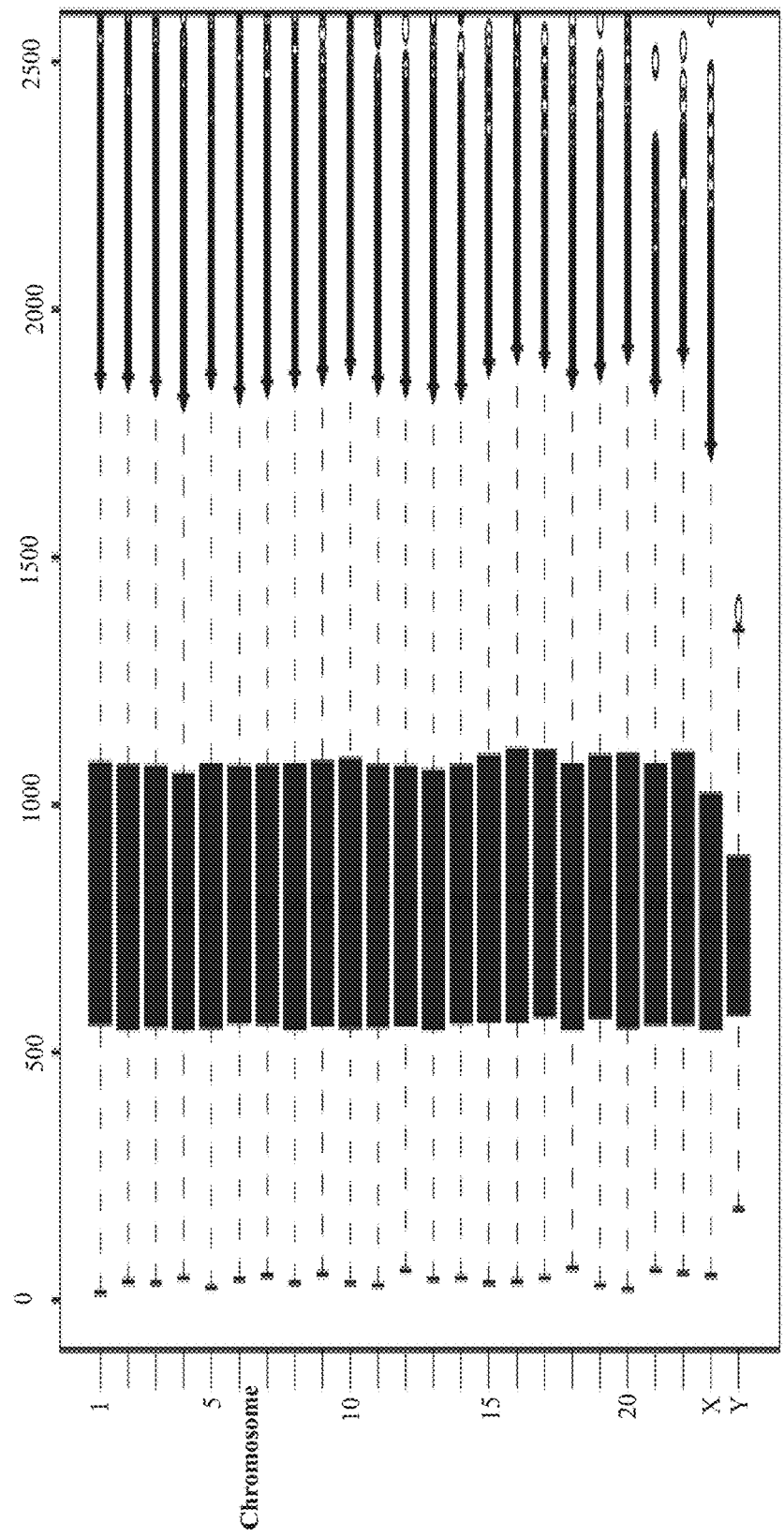
Figure 21D:
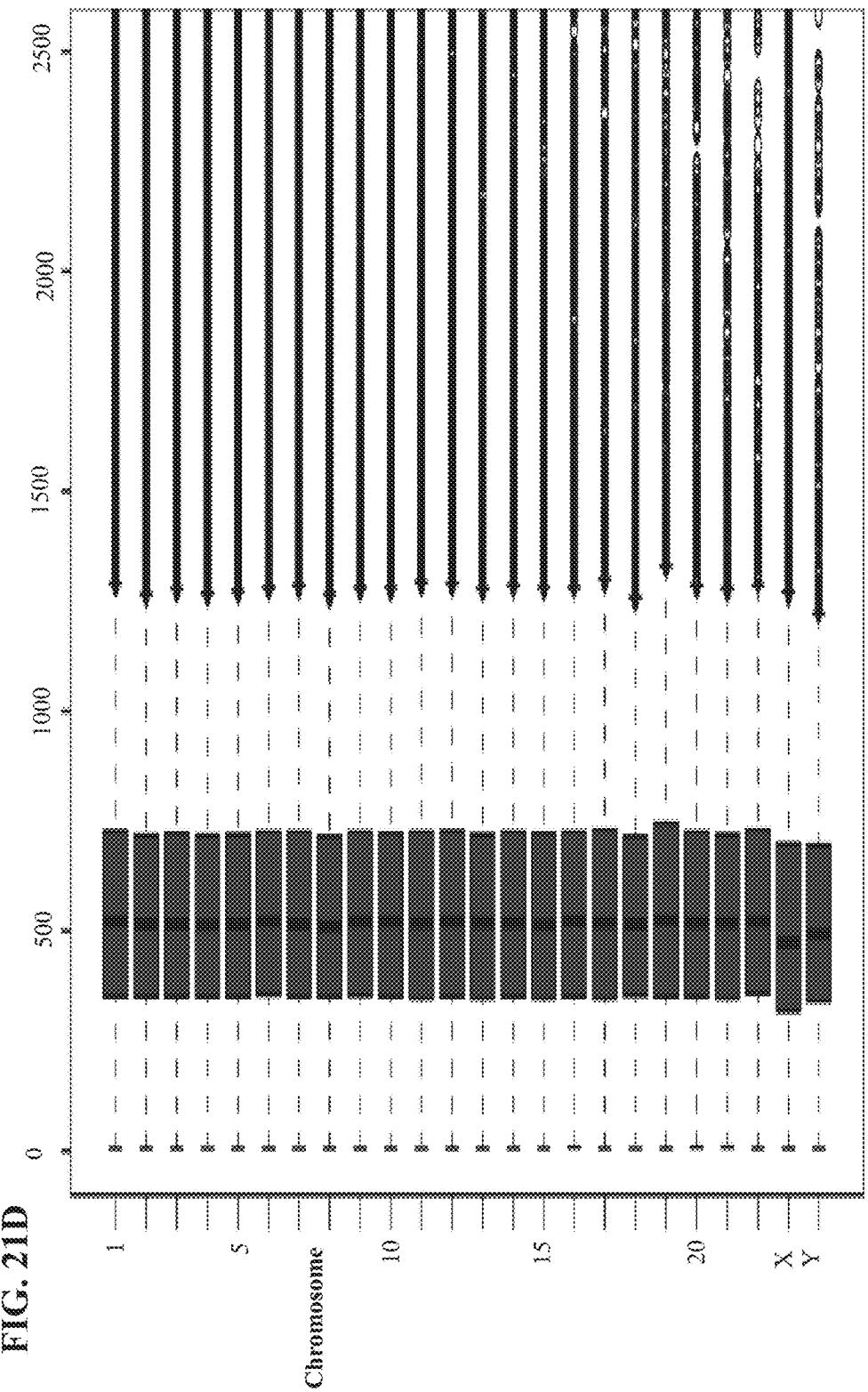
Figure 24C:
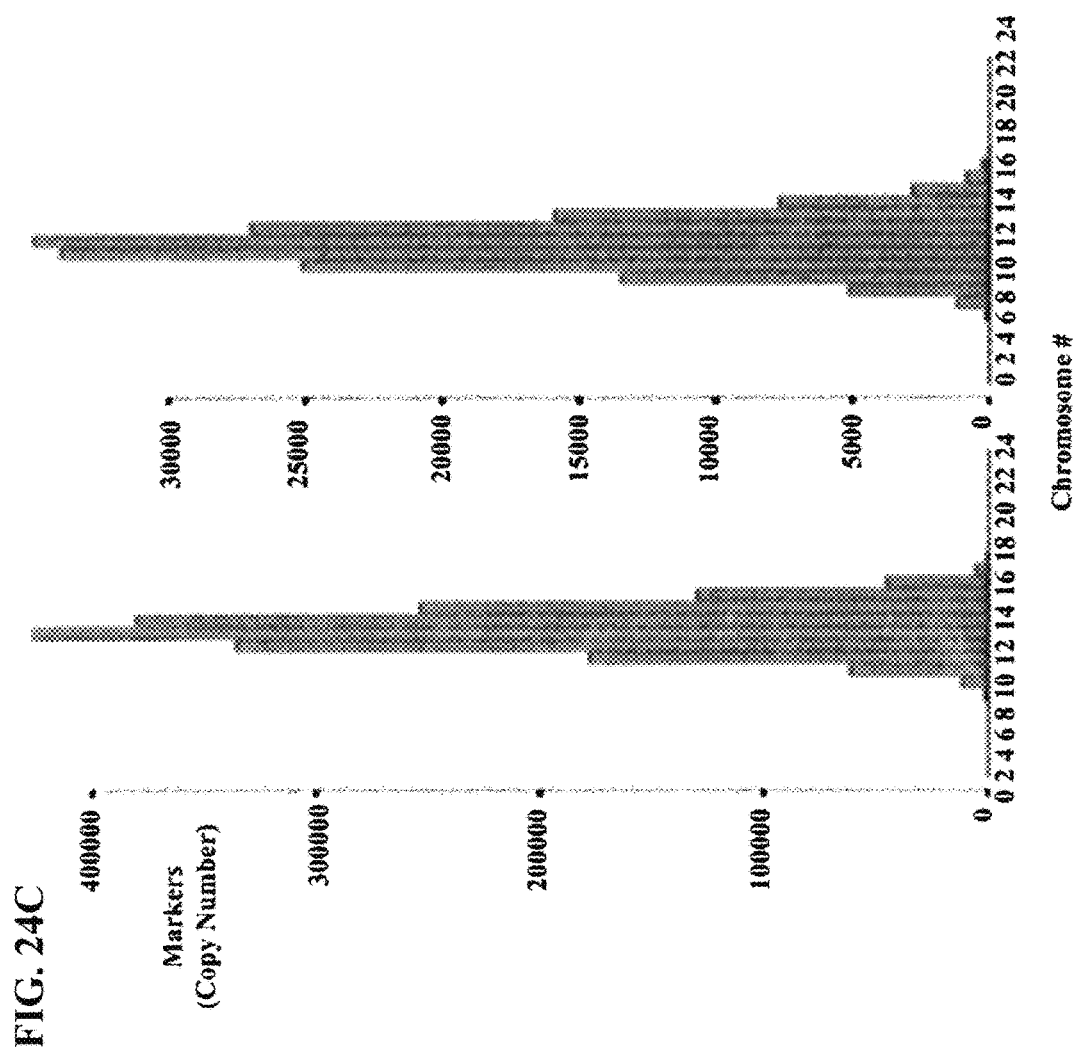
Figure 24D:
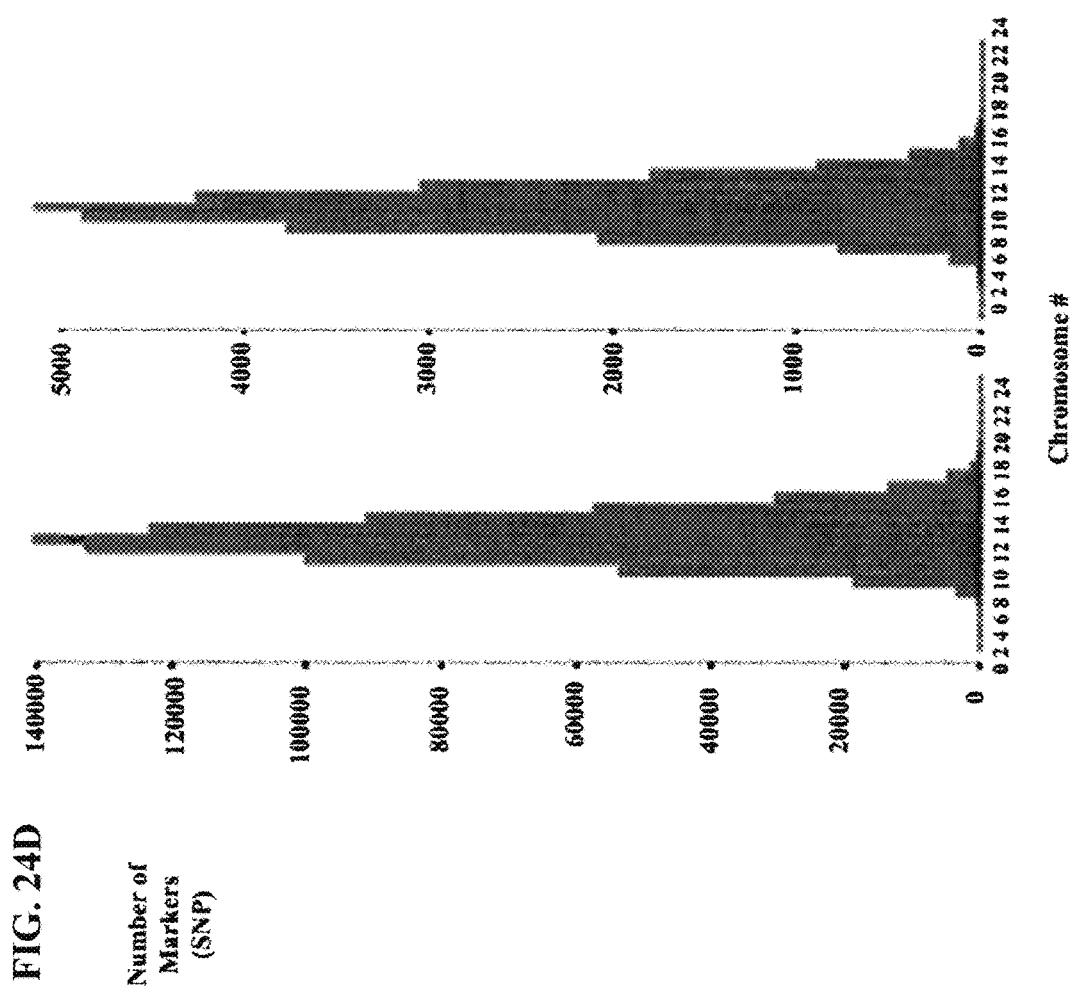
Figure 26A:
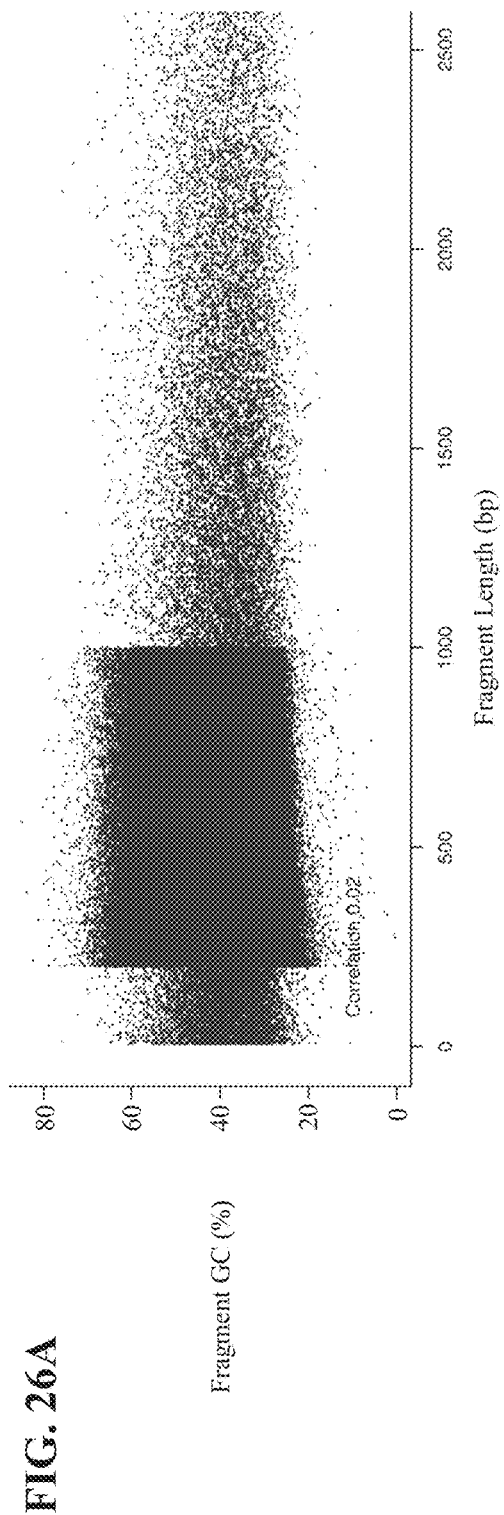
FIGS. 26A-B show pair-wise comparison of fragment GC and fragment length covariate adjusters.
Figure 26B:
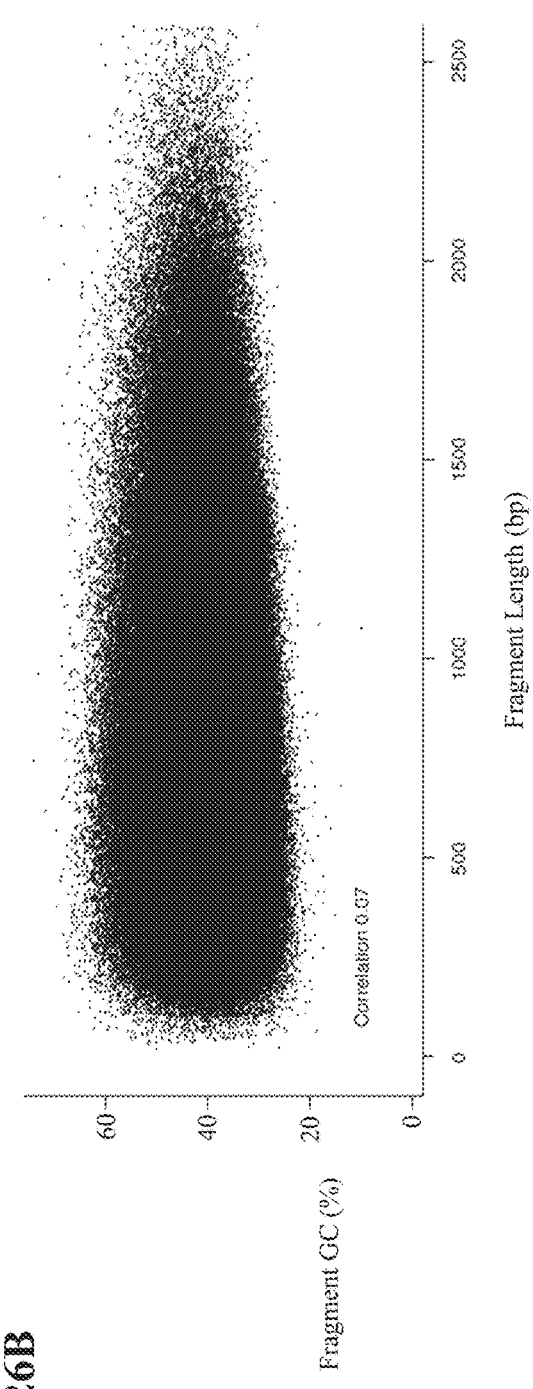
Figure 28A:
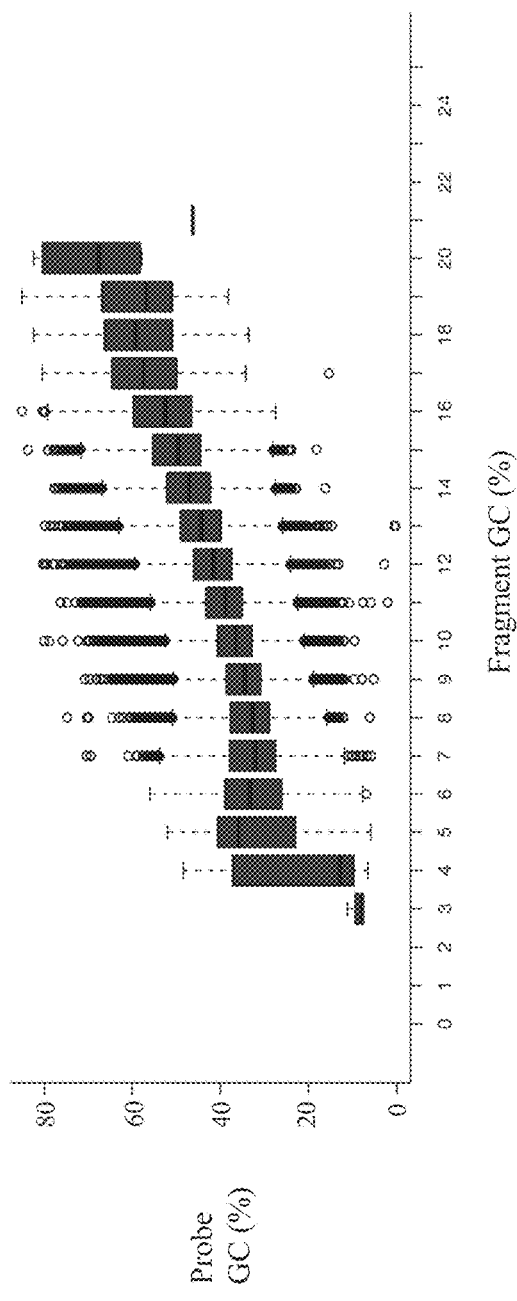
FIGS. 28A-B show pair-wise comparison of fragment GC and probe GC covariate adjusters.
Figure 28B:
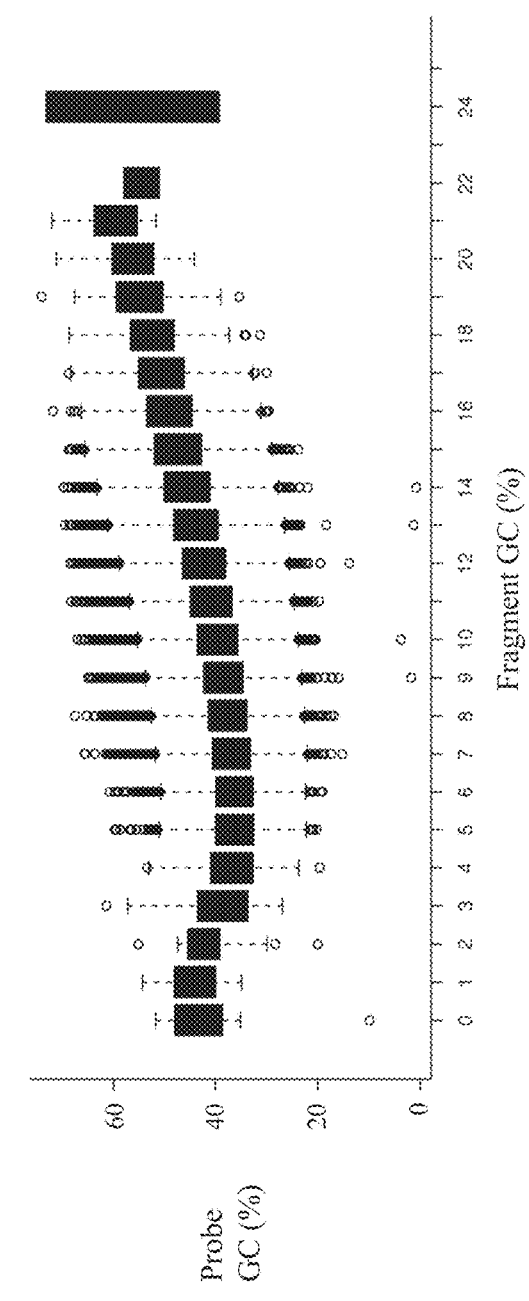
Figures 29A, 29B:
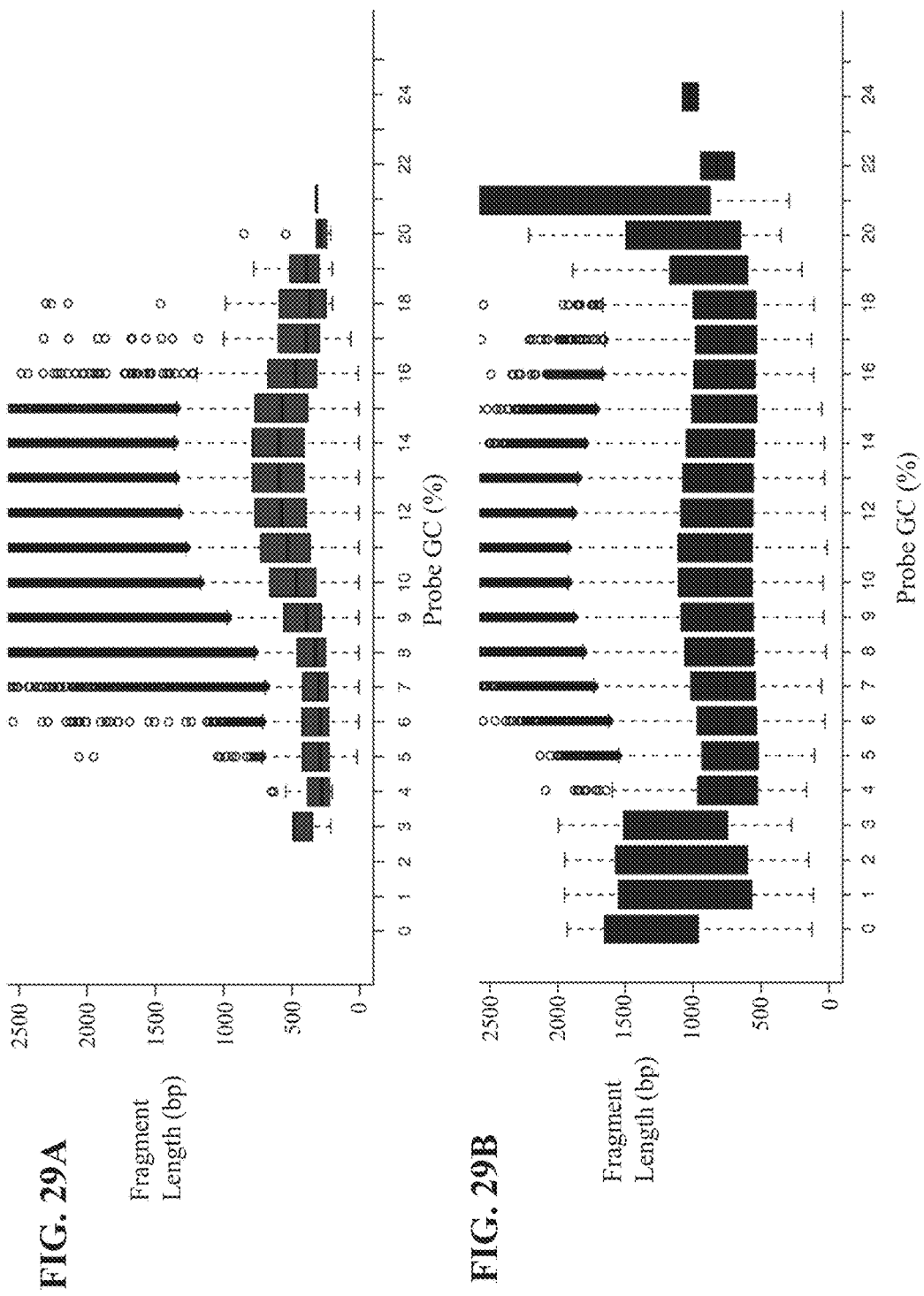
FIGS. 29A-B show pair-wise fragment length and probe GC covariate adjusters.

FIG. 20 shows the 625 distinct bins in the exemplary fragment GC and local GC space. For each bin, one round of partitioning is carried out in the Probe GC dimension (also five bins). This results in 3125 distinctly unique bins. An index value is assigned to each bin and this becomes the discrete covariate known as the Super GC.

Various other covariate adjusters may be employed in a similar matter as exemplified by the Super GC discussed above. However, some assumptions must usually be made when employing covariate adjusters to analyze microarray data. For instance, common assumptions may be one or more of the following non-limiting examples: (1) assume that the covariate does not correlate directly with real, biologically meaningful copy number changes in the genetic sample being tested, (2) assume that covariate behavior on chromosomes X and Y is not materially different than on the autosomes, and (3) assume that there is no interaction between covariates, i.e. if the data is adjusted by covariate A and then by B, the effect of A remains removed.

Another category of covariate adjusters is annotation-based covariates. There are a number of different annotation-based covariates that could be employed in the presently disclosed systems and methods. FIG. 21 depicts an example of the values of the covariates, broken down by CN or SNP marker and also by chromosome. Distinct differences may be visible in microarray genetic experiment data, between the CN and SNP markers, for fragment length and other covariates, as shown. Thus, in one embodiment, separate covariate adjustments may be made for CN determination and SNP detection. Furthermore, it is observed that there is not much evidence of differences between chromosome X and Y and autosomes.

Pair-wise comparison of some of the covariates demonstrate that there is correlational structure, particularly in the case of the various flavors of GC (see, for example, FIGS. 26-29).

Another annotation based covariate that could be explored is the marker type, i.e. describing whether a marker is a copy number (non-polymorphic) or SNP (polymorphic) marker.

Signal Based Covariates

The intent of employing covariate adjusters is to remove technical variability in signal intensity values and variability in the $\log_2$ ratio values which may vary on a sample-by-sample basis. These differences in signal intensity values would be directly related to real copy number change, which is one of the assumptions of the presently disclosed covariate adjuster methodology. Therefore, it may appear illogical to employ a covariate based on a signal measurement. However, there is one signal quantity that is assumed to be, and mostly constructed by design to be, unrelated to copy number change. This is the median reference intensity value stored in a standard reference file which typically accompanies microarray experimental data files in .CEL format, etc. Using this as a covariate allows for the correction of intensity biases that may not be addressed by other covariates.

Due to the way content is typically selected for microarrays, marker intensities on chromosome X may be dimmer than those for the autosomes. There may also be differences for chromosome Y marker intensities as compared to autosomal marker intensities. Because of these differences, it may not be useful to apply the median reference intensity covariate to markers on chromosomes X and Y.

Figure 30:
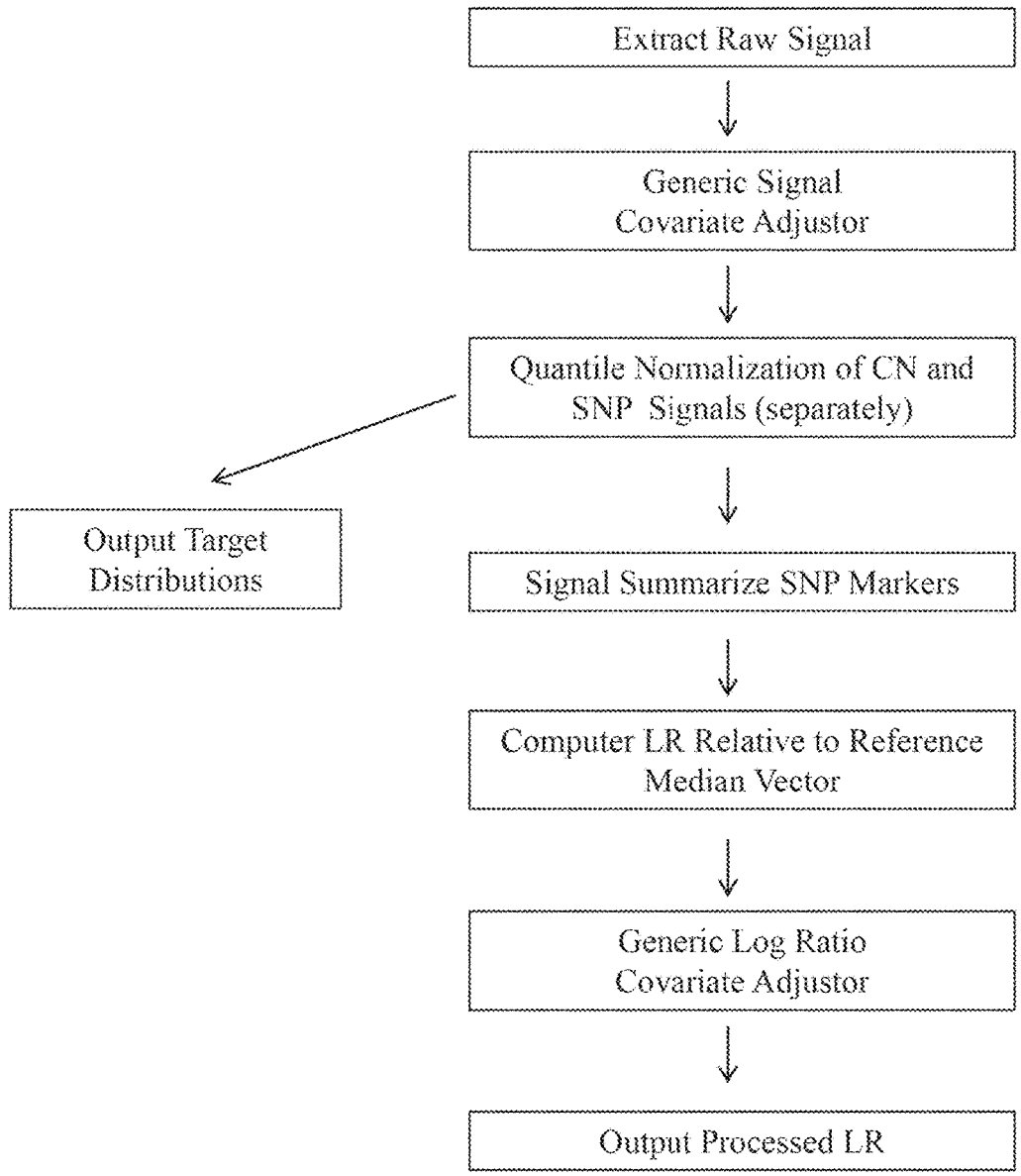
FIG. 30 depicts an exemplary flowchart for use of the covariate adjusters in the methods of the present invention for building a prototype reference.
Figure 31:
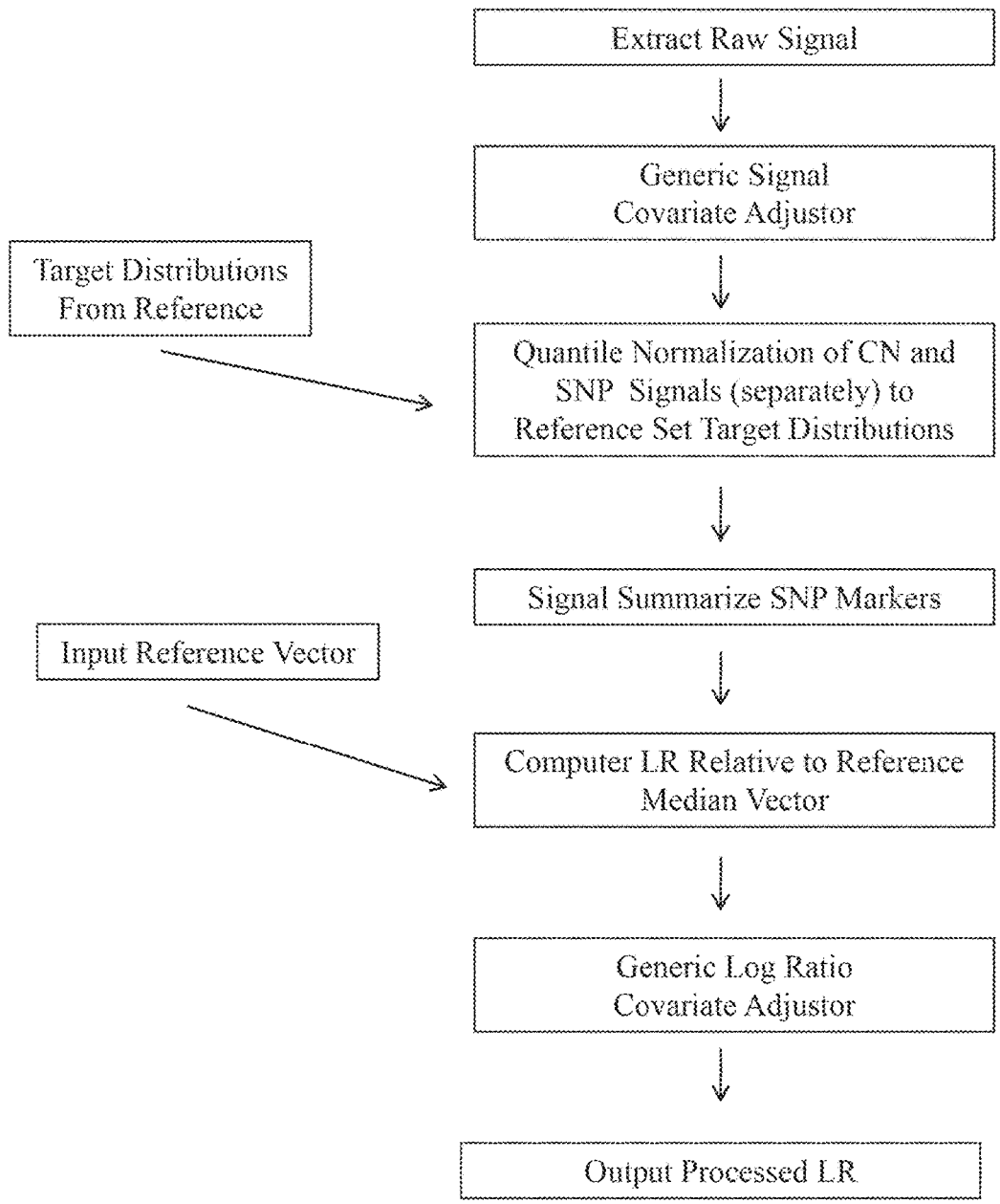
FIG. 31 depicts an exemplary flowchart for single sample processing employing the presently disclosed covariate adjusters.

Using R, a pipeline may be built that incorporates these types of covariate adjusters discussed above. As depicted in FIG. 30 and FIG. 31, included may optionally be both reference building mode and single sample analysis mode. However, such a pipeline does not necessarily have to have wave correction implementations.

A large number of combinations of different covariate adjustments may be explored utilizing the presently disclosed systems and methods. A reference file may be generated for each explored combination, and then a series of experimental samples may be processed via SSA.

To simplify testing, the parametrization for each covariate adjuster may be determined beforehand. Covariates may optionally be tested as both signal and $\log_2$ ratio corrections to determine which provides the most optimal results in terms of the final adjusted data.

Signal Restoration

Signal restoration is an application of Bayes wavelet shrinkage to the $\log_2$ ratio values (described above) associated with genetic markers found on probes and/or genetic sample fragments. For instance, see "Multivariate Bayes Wavelet Shrinkage and Applications," by Gabriel Huerta, *J. Applied Statistics*, 32(5):529-542, 2005 (incorporated herein by reference in its entirety for all purposes). The term wavelet shrinkage refers to a class of methods that use wavelets to estimate densities or denoise data. The result of this transformation is an overall reduction in variation with respect to the local mean of $\log_2$ ratios. In this context, "local" means a region consisting of a small set of markers upstream and downstream from a given marker. The resulting data can be viewed as the Weighted $\log_e$ Ratio in a genome browser program, such as the Chromosome Analysis Suite (Affymetrix, Inc., Santa Clara, Calif.) and serves as the input to the segmentation algorithm. The wavelet shrinkage method is augmented by a reduction of influence of outliers when local means are computed.

In the following examples, the $\log_2$ ratios are transformed to a Harr wavelet basis and the wavelet coefficients are shrunk. A wavelet is a function that integrates to zero and when squared has a bounded integral. In order to reduce the influence of outliers, the difference between the shrunk values and the observed values are assumed to be distributed student-t with 6.5 degrees of freedom. The $\log_2$ ratios input to the wavelet transform are weighted by the precisions obtained by fitting the residuals to a student-t distribution. Obtaining the precisions requires iteratively computing the wavelet transform, obtaining residuals, then weights. When the vector of precisions converges the inverted transformation produces shrunk $\log_2$ ratios and then the HMM algorithm is employed to make copy number calls that are integers. Here, the vector of copy number calls was segmented into contiguous groups of like integers with a minimum segment size of 5.

The likelihood precisions of the shrinkage estimator were 0.5 for the finest level of the transform and 4.0 for the next to finest. The remaining levels were not shrunk. The precision of the Markov random field used for the prior was 0.5. The Markov random field employed in the process is commonly referred to as a region quadtree. A quadtree is commonly known as a tree data structure in which each internal node has exactly four children. Quadtrees can be commonly employed to partition a two-dimensional space (such as the surface of a microarray) by subdividing the space into four quadrants, and then subdividing each of those four quadrants into four more quadrants, and repeating this process over and over. This process decomposes the space into adaptable cells each having a maximum capacity. A region quadtree splits the space up multiple times into four equal quadrants of space. Each node in the tree then has exactly four children or no children. Each subdivided quadrant of space may have a depth of n and may represent an image of $2^n \times 2^n$ pixels and each pixel may have a value of 0 or 1. If the region does not have a value of 0 or 1, it may be again subdivided into four more subquadrants. By subdividing the space in this way, the calculations may be processed much more quickly and efficiently without expending too much processing power to perform the necessary calculations.

An exemplary summary of operations:
1. Set the precision $\log_2$ ratios at all markers equal
2. Iteratively until convergence
   a. Compute the wavelet transform weighted by precisions
   b. Shrink the wavelet coefficients
   c. Invert the wavelet transform to obtain the shrunk $\log_2$ ratios
   d. Compute the residuals of the observed minus shrunk $\log_2$ ratios
   e. Update the precisions
3. Call the copy number at each marker using the Cyto2 HMM
4. Segment the copy number calls
5. Smooth over any segments with fewer than 5 markers In these analyses the variance of the shrunk $\log_2$ ratios is substantially less than their observed counterparts. The number of short segments is also substantially fewer using the restored signal. Longer segments are almost the same for both inputs with the major differences being along stretches where the $\log_2$ ratios are centered on a value intermediate between two copy numbers.

Algorithmic Details of Wavelet Shrinkage

To execute wavelet shrinkage the $\log_2$ ratios are transformed using a Harr wavelet bases which provides a multi-resolution representation of the data vector through recursive averaging as shown for a series of 8 values $x[1,1], \ldots, x[1,8]$.

The first set of averages are:

$$x[2,1]=(x[1,1]+x[1,2])/2$$

$$x[2,2]=(x[1,3]+x[1,4])/2$$

$$x[2,3]=(x[1,5]+x[1,6])/2$$

$$x[2,4]=(x[1,7]+x[1,8])/2$$

The second set of averages are:

$$x[3,1]=(x[2,1]+x[2,2])/2$$

$$x[3,2]=(x[2,3]+x[2,4])/2$$

The third set of averages are:

$$x[4,1]=(x[3,1]+x[3,2])/2$$

Corresponding to averages are the first set of differences, which are defined as:

$$y[2,1]=x[1,2]-x[1,1]$$

$$y[2,2]=x[1,4]-x[1,3]$$

$$y[2,3]=x[1,6]-x[1,5]$$

$$y[2,4]=x[1,8]-x[1,7]$$

The second set of differences may be as follows:

$$y[3,1]=x[2,2]-x[2,1]$$

$$y[3,2]=x[2,4]-x[2,3]$$

The third set of differences are:

$$y[4,1]=x[3,2]-x[3,1]$$

For any set of values $x[1,1], \ldots, x[1,N]$ where N is a power of 2, the recursion of averages and differences follows the exact same pattern. If N is not a power of 2 the vector of observations can be padded with zeros until a number of elements with a power of 2 is reached. The original data can be recovered from the above transformation as follows:

$$x[1,1]=x[2,1]-y[2,1]/2$$

$$x[1,2]=x[2,1]+y[2,1]/2$$

$$x[1,3]=x[2,2]-y[2,2]/2$$

$$x[1,4]=x[2,2]+y[2,2]/2$$

$$x[1,5]=x[2,3]-y[2,3]/2$$

$x[1,6]=x[2,3]+y[2,3]/2$ $x[1,7]=x[2,4]-y[2,4]/2$ $x[1,8]=x[2,4]+y[2,4]/2$

The values x[2,1], . . . , x[2,4] used above can be recovered likewise as:

$x[2,1]=x[3,1]-y[3,1]/2$ $x[2,2]=x[3,1]+y[3,1]/2$ $x[2,3]=x[3,2]-y[3,2]/2$ $x[2,4]=x[3,2]+y[3,2]/2$

Finally, $x[3,1]=x[4,1]-y[4,1]/2$ $x[3,2]=x[4,1]+y[4,1]/2$

Wavelet shrinkage works on the y values which are often called the details. Let the details at the finest level of resolution be y[2,1], . . . , y[2,j], . . . , y[2,P2] and let their shrunk values be z[2,1], . . . , z[2,j], . . . , z[2,P2]. Let q2 be a constant scalar value greater than zero. Let z[2,j]=(q2(z[2,j−1]+z[2,j+1])/2+y[2,j])/(q2+1). In the equation above z[2,j] is a weighted average of its adjacent neighbors and y[2,j]. Implicit in this formula is that the z values are a priori sampled from a Markov random field. The detail y[2,j] can be computed directly from the data, however, the sequence of values z[2,1], . . . , z[2,p2] is unknown and must be solved iteratively. First a set of values for z[2,1], . . . , z[2,p2] is proposed, then each z[2,j] is computed according to what the current values of its neighbors.

The updating of the sequence is repeated until a convergence criterion has been met. There are a number of sensible criterions to use. The current method is to stop when no z[2,j] changes by more than 0.00001 from one iteration to the next.

This process can be repeated for y[3,1], . . . , y[3,p3] using a weight q3 to generate a sequence z[3,1], . . . , z[3,p3] and so forth down through the recursive decomposition of the data. In practice it is only necessary to do this for the first two levels of the decomposition.

To reconstruct the shrunk signal replace the y values with the z values as follows using the example sequence of eight observations. Let the shrunk reconstructed signal be u[1,1], . . . , u[1,8].

$u[1,1]=u[2,1]-z[2,1]/2$ $u[1,2]=u[2,1]+z[2,1]/2$ $u[1,3]=u[2,2]-z[2,2]/2$ $u[1,4]=u[2,2]+z[2,2]/2$ $u[1,5]=u[2,3]-z[2,3]/2$ $u[1,6]=u[2,3]+z[2,3]/2$ $u[1,7]=u[2,4]-z[2,4]/2$ $u[1,8]=u[2,4]+z[2,4]/2$

The values u[2,1], . . . , u[2,4] used above can be recovered likewise as:

$u[2,1]=u[3,1]-z[3,1]/2$ $u[2,2]=u[3,1]+z[3,1]/2$ $u[2,3]=u[3,2]-z[3,2]/2$ $u[2,4]=u[3,2]+z[3,2]/2$

Finally, $u[3,1]=x[4,1]-y[4,1]/2$ $u[3,2]=x[4,1]+y[4,1]/2$

The new shrunk values u[1,1], . . . , u[1,N] are used in the hidden Markov model. Samples with good quality control metrics produce almost identical patterns of segments with 25 markers or more.

Only one level of resolution is required for describing how outliers are handled so write the sequence of observed values x[1], . . . , x[N] and do the same for corresponding sequences. In the sequence of values x[1], . . . , x[N], large outliers can be present. The outliers are addressed by iteratively downweighting their influence on the final solution of u[1], . . . , u[N] as follows. First u[1], . . . , u[N] are computed from x[1], . . . , x[N] using the wavelet shrinkage method. A vector of errors e[1], . . . , e[N] is computed by taking the difference between the x and u values. Large outliers produce large values in e[1], . . . , e[N]. A weight can be attributed to each error by the following formula w[j]=[(k+1)/(kS+(x[j]−u[j])(x[j]−u[j]))]/wmean.

The variable k is called the degrees of freedom and a value of 6.5 is used in the current implementation. The variable wmean is the mean of all w[j] had then not been divided by wmean. S is a scaling factor set such that the sum $(x[1]-u[1])(x[1]-u[1])+ \ldots +(x[N]-u[N])(x[N]-u[N])=NS$.

Implicit in the above calculations is that the members of the error vector when divided by the square root of S are distributed student-t with 6.5 degrees of freedom. Next a set of values v[1], . . . , v[N] are computed using the formula v[j]=u[j]+w[j]e[j]. The values v[1], . . . , v[N] are now shrunk instead of the values x[1], . . . , x[N] and a new set of errors are computed where e[j]=x[j]−u[j]. Notice the outlier is still computed from the observed value.

This process is ideally repeated until the vector u[1], . . . , u[N] converges but instead the iterations are truncated. The current implementation terminates after 15 iterations by default.

Copy Number High Pass Filter

Many microarrays comprising DNA probes mounted thereon exhibit artifacts which arise during the manufacturing process or after binding of target sample, as discussed above. For instance, microarrays manufactured using a photolithographic process in which single monomers are added to the surface one step at a time require the use of masks in order to shield some areas of the array surface while other areas undergo chemical reaction. Sometimes the manner in which the mask is used or manufactured can introduce various artifacts in how the image of the $\log_2$ ratio of the signal intensity data is generated and displayed. In some instances, there may be horizontal bands which may be apparent to the human eye upon visual inspection. These bands may be somewhat brighter or darker, each band possessing its own hue or degrees of different shades of color. If a microarray is positioned on a flat surface in front of the user, there may be designated theron a top, bottom, left side and a right side to the array when looking down at the array from a vantage point perpendicular to the plane of the array. The horizontal bands may, for instance, be somewhat brighter in shade on the left side of the array than on the right side, or vice versa. The bands may have brighter and darker regions from left to right, independently of other bands above or below it in the array. These types of shading artifacts may be caused inadvertently as a byproduct of the inherent differences in the affinity of various probes on the array for their target and how those probes may be placed, the sequence of the probes, etc. as described in detail with respect to the various covariate adjusters used to minimize these differences.

As already mentioned, above, the present invention may employ solid substrates for microarrays. Methods and techniques applicable to polymer (including protein) array synthesis have been described in U.S. Ser. No. 09/536,841 (abandoned), WO 00/58516, U.S. Pat. Nos. 5,143,854, 5,242,974, 5,252,743, 5,324,633, 5,384,261, 5,405,783, 5,424,186, 5,451,683, 5,482,867, 5,491,074, 5,527,681, 5,550,215, 5,571,639, 5,578,832, 5,593,839, 5,599,695, 5,624,711, 5,631,734, 5,795,716, 5,831,070, 5,837,832, 5,856,101, 5,858,659, 5,936,324, 5,968,740, 5,974,164, 5,981,185, 5,981,956, 6,025,601, 6,033,860, 6,040,193, 6,090,555, 6,136,269, 6,269,846 and 6,428,752, and in PCT Applications Nos. PCT/US99/00730 (International Publication No. WO 99/36760) and PCT/US01/04285 (International Publication No. WO 01/58593), which are all incorporated herein by reference in their entirety for all purposes. Patents that describe synthesis techniques in specific embodiments include U.S. Pat. Nos. 5,412,087, 6,147,205, 6,262,216, 6,310,189, 5,889,165, and 5,959,098. Nucleic acid arrays are described in many of the above patents, but the same techniques are applied to polypeptide arrays and may be applied to other types of arrays utilizing various monomers.

Thus, when using a computer-generated visual image of such microarrays, the problem of variation in shading on the surface of the array from feature to feature may be detected and removed from the experiment in a number of ways, just as the use of covariate adjusters also are able to normalize various inherent properties and performance of the probes and target in a microarray experiment. One way to remove these artifacts from the microarray experiment is to filter the array data to remove these artifacts using software and algorithmic methods. In a general sense, the present methods include constructing a theoretical 2-dimensional plane having no variation in signal intensity, and then looking for intensity values on the array which match the theoretical field. Once such a position or spot is found on the microarray which matches a theoretical plane having no intensity or color variation, the remaining areas of the microarray which do not conform to this theoretical field may be adjusted to be either darker or lighter in shade such that their underlying intensity values are equivalent, or roughly equivalent, to the theoretical field values. These adjustments may then be applied to the experimental data as well, as a negative control removing background noise from the data.

Much research and thought has already been published in statistical methods which may be applied to such problems of color normalization. For instance, see "On the Statistical Analysis of Dirty Pictures," by Julian Besag, *J.R. Statist. Soc. B*, 48(3):259-302, 1986, incorporated herein by reference in its entirety for all purposes. This publication discloses the partitioning of a two-dimensional region into fine rectangular arrays of sites or "pixels" wherein it is assumed that "pixels close together tend to have the same or similar colours." (Id.)

The process of locating on a planar two-dimensional field a region of similar color or intensity and then adjusting all other areas in the field to the same levels as the found region can be referred to as a type of "signal restoration." What one is doing is in fact "restoring" to "normal" the artificially highlighted or depressed colors or signal intensities of various regions of the field (the array surface) so that the entire field is the same, uniform, "normal" color or intensity. Thus, the "normal" signal values, which would have appeared had the manufacturing process been perfect and without variation or flaws, may be restored to the microarray being examined in the experiment.

The presently disclosed data filter methodology applies signal processing techniques to manipulation of image data. In embodiments of the present methodologies, the image manipulated is actually a pseudo-image based on $\log_2$ ratio values, not raw images based on raw data obtained from standard .DAT or .CEL files. Transforming the raw data to $\log_2$ ratio space allows visualization and detection of important signal gradients that can only be seen with this transformation and thereafter corrected.

The model used to achieve this filtering is the following:

$$y_i = z_i + x_i$$

where $y_i$ is the computed $\log_2$ ratio, $z_i$ is the true unobserved $\log_2$ ratio, and $x_i$ is the bias of observed values due to nuisance low-frequency information in the image. This bias is itself a random variable with the expected value of $x_i$ being that of its immediately surrounding region.

Motivation for the model was driven by the observation that residuals from copy number analysis were biased by a gradual spatial trend. When copy number data are compared to a reference data set, the expectation is that in most cases the $\log_2$ ratio is zero. This was clearly not the case. A secondary benefit of this methodology is the decreased consumption of RAM, or computer memory. Consumption of RAM is reduced by analyzing the bands of copy number probes.

In any band of copy number probes there are missing values. On a copy number chip the locations of missing values are always known ahead of time.

Spatial Distribution of Signal

A key assumption in employing the present methodology for high pass filtering of image data is that there is no long range spatial correlation of the true value of the log 2 ratio-corrected copy number signal, Z. This feature only exists in y through x. This assumption, together with the symmetric zero-mean distribution of z, anchors the estimate of the background through the data.

For almost all of the genome z will have an expected value of zero. Because of the pseudo-random spatial allocation of copy number probes, the observed values can be modeled as random. The log transformation renders the $\log_2$ ratios unimodal and nearly symmetric. They are modeled well as zero-mean normal deviates with variance of $\sigma^2$.

Local Estimate of the Background

The background can be modeled without data. Any background element $x_i$ is distributed normal with expected values being a weighted average of surrounding probes. The weights are just precisions. Adjacent probes at the sides with a common edge have a precision of $\tau$. Adjacent probes in the corners have a precision of:

$$\frac{\tau}{\sqrt{2}}$$

The larger the value of τ, the more smooth is the background. Without data, the level of the background is arbitrary. With data, the level of the background becomes anchored.

Estimating Dispersion Parameters

The background forms a type of prior distribution, called a Markov Random Field. One feature of this model is that the likelihood and prior can be written explicitly. Also, all the full conditional distributions are available for computational purposes. It turns out that estimating τ is difficult. Since we are not actually modeling the data, but rather using a model for trend compensation, the product of $\tau\sigma^2$ is instead fixed. A default value of $\tau\sigma^2=8$ produces a smooth background.

Imposing a Hierarchy

Enforcing smooth long term trends with the model above would require the product $\tau\sigma^2$ to be a very large value. Convergence would move at a glacial place. In order to overcome this, a multi-grid approach is employed where each $x_i$ is located in one corner of a block of four. These blocks form a blurred version of the original data at one quarter the size. The observed values are averaged. This can be done recursively until, at the highest level, no more blocks of four exist. The expected value for the background then becomes an average of its neighbors, and the background of the two-by-two block in which it resides. The two-by-two block uses the same smoothing parameters. This is recursive. Increasing the weight of the two-by-two block increases the effect of the hierarchy and likewise the global effect of smoothing.

The hierarchy makes convergence quite rapid.

Blocking the Data for Speed

A modification to make the application faster is to aggregate the observed values into blocks. Essentially, start higher up in the hierarchy under the assumption that the background is basically the same for small blocks. Currently 8×8 blocks are used to speed execution time. This is not to be confused with slow kernel smoothing methods that require blocks to be large in order to obtain long range smoothness with a smaller sized kernel. A 512 by 1024 image with gaussian noise and no missing values is used to evaluate the estimate of the background. Various trends are added to the image to evaluate results.

At the lowest level of the hierarchy set all $x_i$ to 0.

Divide the image into blocks of 4 and average the $z_i$ to form the next level.

Recursively repeat the first two steps at the next level in hierarchy until no more blocks of 4 can be formed.

Using an iterative method, solve for the background at the top level.

Cascade down the hierarchy solving for the background each time

At the bottom level the $z_i$ can now be read off.

It is to be understood that the above description is intended to be illustrative and not restrictive. Many variations of the invention will be apparent to those of skill in the art upon reviewing the above description. The scope of the invention should be determined with reference to the appended claims, along with the full scope of equivalents to which such claims are entitled. All cited references, including patent and non-patent literature, are incorporated herewith by reference in their entireties for all purposes.

What is claimed is:

1. A computer-implemented method of correcting a data set comprising one or more intensity values from a microarray experiment to account for one or more independent variables, the method comprising:

scanning, by a scanning device, a nucleic acid sample hybridized to a nucleic acid probe mounted on a microarray used for the microarray experiment such that a data set comprising one or more intensity values from a microarray experiment is obtained;

defining, by a processor, a plurality of discrete bins for intensity values of the data set, wherein each discrete bin comprises a different range of intensity values with respect to the other discrete bins, and wherein defining the plurality of discrete bins includes selecting a quantity of two or more discrete bins based on one or more independent variables associated with the data set and partitioning the two or more discrete bins according to one or more spatial dimensions defined by the one or more independent variables;

dividing, by the processor, the one or more intensity values from the data set into the plurality of discrete bins;

determining, by the processor, a median value of the one or more intensity values in each of the plurality of discrete bins;

determining, by the processor, an overall median value of the one or more intensity values of the data set;

determining covariate adjustor code for each of the plurality of discrete bins using a processor configured to track a ratio of the overall median value to the median value for a respective bin of the plurality of discrete bins, wherein the covariate adjustor code comprises code for creating or not creating at least one of a fragment GC, local GC, probe GC, and super GC covariate adjuster adjustor for one or more intensity values determined to need correction in the data set obtained, and code for determining whether to tag intensity values to undergo no correction for a given covariate;

adjusting, by the processor, the one or more intensity values in each of the one or more discrete bins by applying a corresponding one of the covariate adjustors such that the median value of the one or more intensity values determined to need correction in each of the plurality of discrete bins is adjusted to a same target median value, thereby generating a corrected data set; and displaying at least a portion of the corrected data set as a graphical presentation within an electronic user interface.

2. The method according to claim 1, wherein the covariate adjustors are applied by executing a computer software program stored on a non-transitory computer-readable medium.

3. The method according to claim 1, wherein the microarray experiment comprises an expression level determination experiment.

4. The method according to claim 1, wherein the microarray experiment comprises a copy number determination experiment.

5. The method according to claim 1, wherein the data set comprises one or more intensity values obtained from a microarray experiment conducted on a human DNA sample.

6. The method according to claim 2, wherein at least two covariate adjustors are applied.

7. The method according to claim 6, wherein the at least two covariate adjustors are applied simultaneously.

8. The method according to claim 1, further comprising: adjusting, by the processor, the corrected data set to account for one or more independent variables.

9. The method according to claim 8, wherein the one or more independent variables comprise one or more generic covariate (GC) variables comprising one or more GC content variables, fragment GC variables, local GC variables, probe GC variables, log 2 GC variables, marker type GC variables, and reference intensity GC variables.

10. The method according to claim 9, further comprising:
receiving, by the user interface, a selection from a user comprising the one or more GC variables.

11. The method according to claim 10, wherein the selection from the user comprises a window size of base pairs for covariate adjustment in the microarray experiment.

12. The method according to claim 10, further comprising:
adjusting, by the processor, the corrected data set based on the selection from the user;
based on the adjustment, generating, by the processor, a microarray image from the corrected data set; and
displaying, by the user interface, the microarray image to the user.

13. The method according to claim 12, further comprising:
detecting, by the processor, one or more shading artifacts in the microarray image; and filtering, by the processor, the corrected data set to remove the one or more shading artifacts in the microarray image.

14. The method according to claim 1, wherein the nucleic acid sample comprises a labeled human DNA sample and the one or more intensity values are obtained by scanning fluorescence intensities of the labeled human DNA sample hybridized to the nucleic acid probes on the microarray.

15. The method according to claim 1, further comprising:
normalizing, by the processor, the one or more intensity values obtained from the microarray experiment by calculating logarithmic ratio values based on one or more reference values stored in a memory, resulting in one or more normalized intensity values.

16. The method according to claim 15, further comprising:
applying, by the processor, a high pass filter to the one or more normalized intensity values to remove spatial bias and noise.

17. The method according to claim 15, further comprising:
applying, by the processor, one or more signal restoration algorithms to the logarithmic ratio values.

18. The method according to claim 17, wherein the one or more signal restoration algorithms comprise Bayes wavelet shrinkage to reduce variations in the logarithmic ratio values.

19. The method according to claim 18, further comprising:
transforming, by the processor, the logarithmic ratio values using a Haar wavelet basis.

20. The method according to claim 19, further comprising:
iteratively computing, by the processor, a wavelet transform weighted by precision parameters;
shrinking, by the processor, coefficients of the wavelet transform;
inverting, by the processor, the wavelet transform to obtain shrunk logarithmic ratio values;
computing, by the processor, residuals of the shrunk logarithmic ratio values; and
updating, by the processor, the precision parameters.

21. The method according to claim 1, wherein each of the a plurality of discrete bins comprises the same number of intensity values.

22. The method according to claim 1, wherein each of the a plurality of discrete bins comprises varying numbers of intensity values.

23. The method according to claim 1, wherein the quantity of discrete bins is determined based on fragment length ranges obtained from the nucleic acid sample in the microarray experiment, and wherein the nucleic acid sample is fragmented to produce sample fragments of different fragment lengths.

24. The method according to claim 1, wherein the adjusting the one or more intensity values further comprises:
determining, by the processor, the target median value.

25. The method according to claim 7, further comprising:
applying, by the processor, at least two of the covariate adjustors simultaneously by representing the at least two covariate adjustors in two-dimensional space; and
transforming, by the processor, the at least two covariate adjustors represented in two-dimensional space by using a regression line, thereby generating a transformed space.

26. The method according to claim 25, further comprising:
partitioning, by the processor, the transformed space by dividing the transformed space into one or more bins.

27. The method according to claim 1, further comprising:
adjusting, by the processor, one or more intensity values for different marker classes separately.

28. The method according to claim 27, wherein the different marker classes comprise copy number variations and single nucleotide polymorphisms.

29. The method according to claim 1, wherein the graphical presentation indicates at least one of expression levels, genotypes, copy numbers, and loss of heterozygosity (LOH) for the microarray experiment based on the corrected data set.

* * * * *

UNITED STATES PATENT AND TRADEMARK OFFICE
CERTIFICATE OF CORRECTION

PATENT NO. : 10,515,447 B2
APPLICATION NO. : 13/689027
DATED : December 24, 2019
INVENTOR(S) : Bolstad et al.

Page 1 of 1

It is certified that error appears in the above-identified patent and that said Letters Patent is hereby corrected as shown below:

In the Claims

Column 46
Line 32, Claim 1 change "covariate adjuster adjustor one or more intensity" to --covariate adjustor for one or more intensity--

Column 47
Line 5, Claim 9 change "probe GC variables, log 2 GC variables, marker type GC" to --probe GC variables, log2 GC variables, marker type GC--

Signed and Sealed this
Thirty-first Day of March, 2020

Andrei Iancu
*Director of the United States Patent and Trademark Office*